United States Patent [19]
Ishii et al.

[11] Patent Number: 5,189,558
[45] Date of Patent: Feb. 23, 1993

[54] VARI-FOCAL SYSTEM HAVING SHORT TOTAL LENGTH

[75] Inventors: Atsujiro Ishii; Tsutomu Uzawa; Shinichi Mihara, all of Tokyo, Japan

[73] Assignee: Olympus Optical Co., Ltd., Tokyo, Japan

[21] Appl. No.: 712,980

[22] Filed: Jun. 10, 1991

[30] Foreign Application Priority Data

Jun. 11, 1990 [JP] Japan .................. 2-149848
Aug. 24, 1990 [JP] Japan .................. 2-220966
Oct. 18, 1990 [JP] Japan .................. 2-279577

[51] Int. Cl.$^5$ .................................. G02B 15/14
[52] U.S. Cl. ................................. 359/687; 359/708
[58] Field of Search ............... 350/423, 427, 432–435; 359/687, 708

[56] References Cited

U.S. PATENT DOCUMENTS 4,859,042 8/1989 Tanaka ................................. 359/687
4,906,079 3/1990 Mihara et al. ................... 359/687 X

FOREIGN PATENT DOCUMENTS 60-186818 9/1985 Japan .
62-24213 2/1987 Japan .
62-178917 8/1987 Japan .
62-215225 9/1987 Japan .
63-29718 2/1988 Japan .
63-123009 5/1988 Japan .

Primary Examiner—Scott J. Sugarman
Attorney, Agent, or Firm—Cushman, Darby & Cushman

[57] ABSTRACT

A vari-focal lens system having short total length comprising, in the order from the object side, a vari-focal subsystem consisting of a first lens unit having a positive refractive power and a second lens unit having a negative refractive power; and an imaging subsystem consisting of a third lens unit having a positive refractive power and always kept stationary, and a fourth lens unit having a positive refractive power and movable for correcting deviation of image point; said third lens unit being composed of four or a smaller number of lens elements including a positive lens element which is arranged on the object side in the third lens unit and has a convex surface on the object side, and a negative lens element, and said imaging subsystem comprising at least one aspherical surface.

20 Claims, 49 Drawing Sheets

FIG. 15
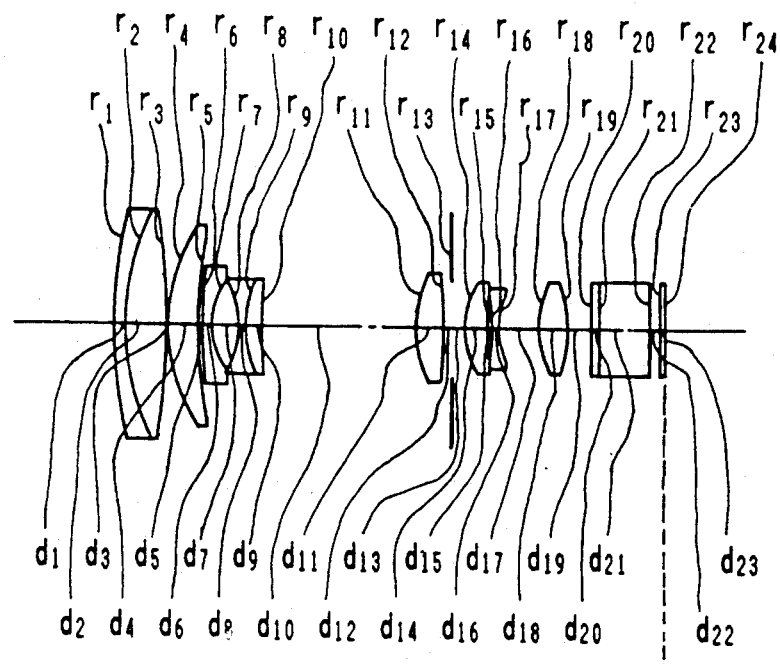
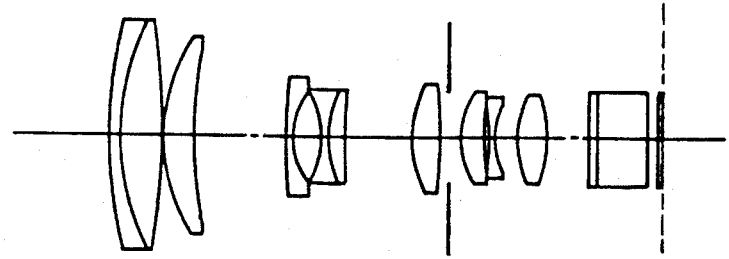
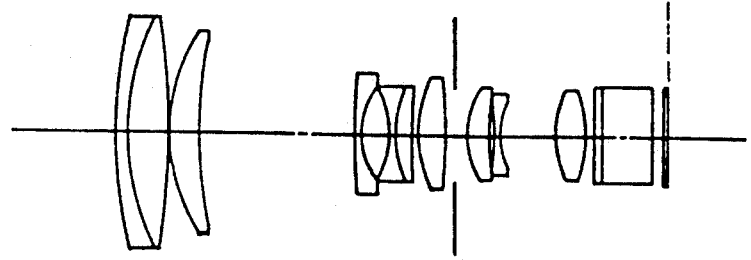

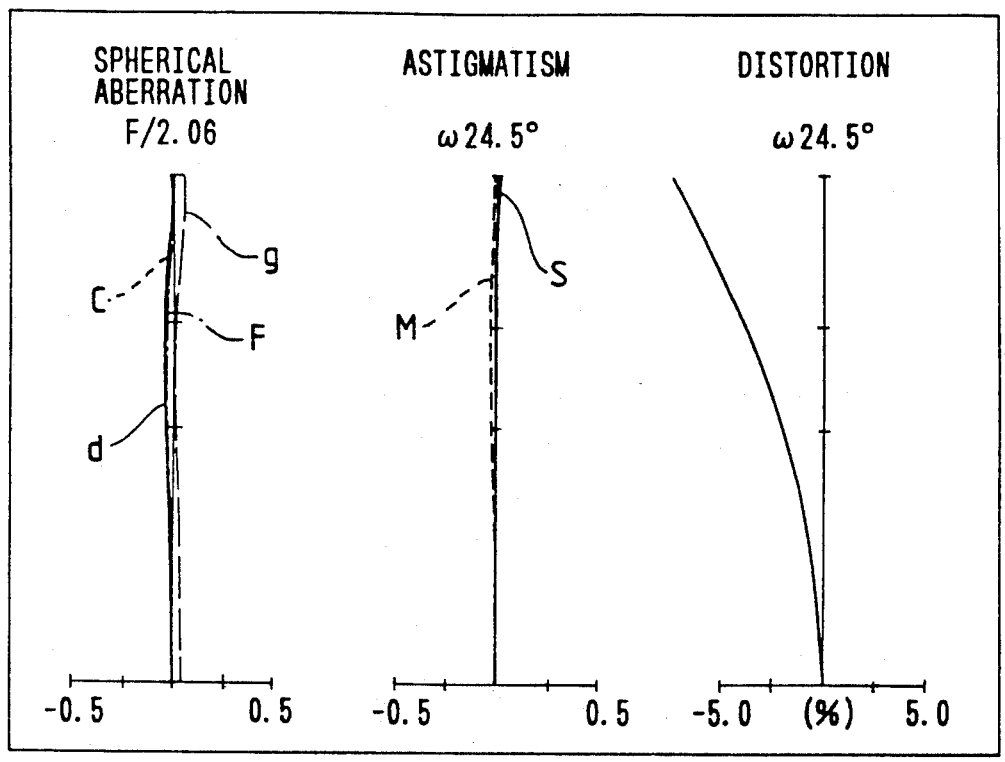
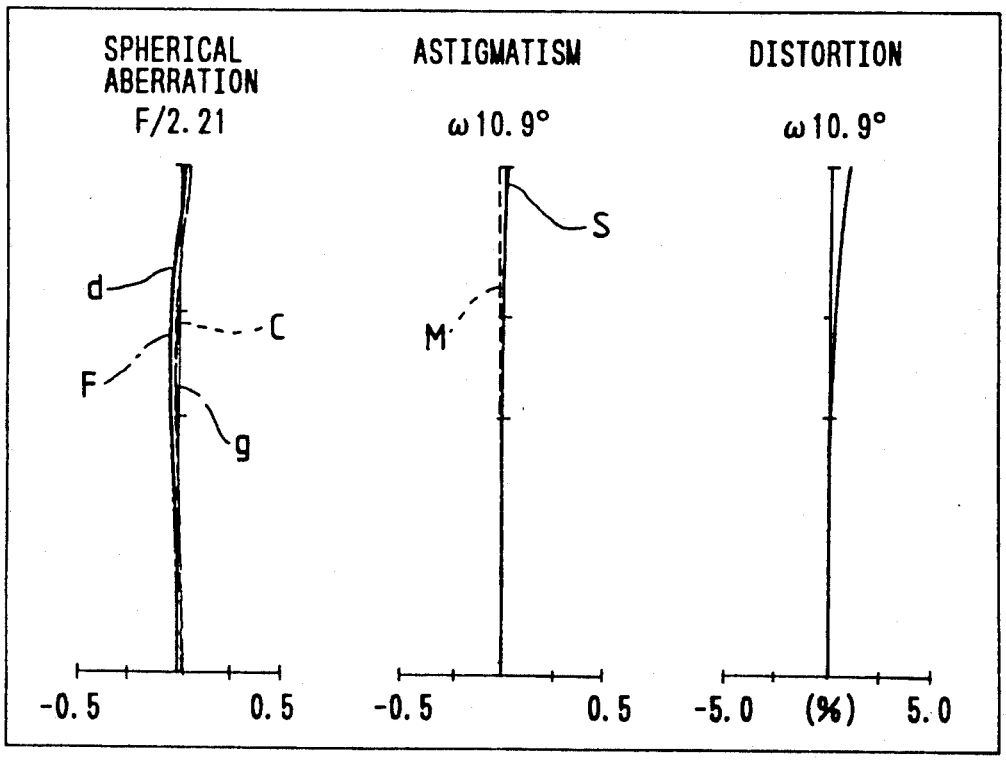

VARI-FOCAL SYSTEM HAVING SHORT TOTAL LENGTH

BACKGROUND OF THE INVENTION

1. Field of the invention

The present invention relates to a vari-focal lens system which has a short total length, a high aperture ratio and a high vari-focal ratio, comprises four lens units and is equipped with a rear focusing means.

2. Description of the prior art

Owing to the recent progresses which have recently been made to design compact and light-weight video cameras manufacturable at lower costs, the market of cam coders is very much activated to make the video cameras rapidly popularized among amateur photographers.

A video camera consists mainly of an electrical circuit board, an actuator system (a mechanical system) and an imaging optical system. Though attempts have hitherto been made to design the compact video cameras manufacturable at the lower costs mainly by improving the electrical system, the imaging optical systems are now rapidly made compacter.

Under the present circumstances, the compacter designs and reduction of the manufacturing costs are made by developing new vari-focal type optical systems through effective utilization of the progresses made in the technologies for compacter designs of imagers, shaping of revolutionally symmetrical aspherical lens surface and improvement in TTL type automatic focusing.

As examples of the newly developed vari-focal type optical systems, there are known the lens systems disclosed by Japanese Patents Kokai Publication No. Sho 62-24213, Kokai Publication No. Sho 62-178917, Kokai Publication No. Sho 62-215225 and so on. However, it is limitlessly demanded to obtain compacter and lighter lens systems, especially to shorten total lengths of lens systems and reduce diameters of the first lens units to be used therein.

As the vari-focal lens system which is proposed before the above-mentioned conventional examples, there is known the lens system disclosed by Japanese Patent Kokai Publication No. Sho 60-186818, which is designed for a vari-focal ratio on the order of 8. This lens system consists, in the order from the object side, of a vari-focal subsystem composed of a first lens unit which is movable for focusing, a second lens unit which has a negative refractive power and is movable for varying focal length, and a third lens unit which has a negative refractive power and is movable for correcting the deviation of image point caused by variation of focal length; and an imaging subsystem composed of an aperture stop and a relay lens unit. In this lens system, the first lens unit consists, in the order from the object side, of a negative lens element, a positive lens element and a positive lens element; the second lens unit consists, in the order from the object side, of a negative lens element, a negative lens element and a positive lens element; and the third lens unit consists, in the order from the object side, of a negative meniscus lens element having a strongly concave surface on the object side.

This lens system has a long total length and uses the first lens unit which has a large diameter. Further, this lens system allows remarkable variation of spherical aberration to be caused in the vicinity of the tele position by moving the first lens unit for focusing, thereby not permitting the first lens unit to have so strong a power. Accordingly, the point of the image formed by the first lens unit, i.e., the object point for the second lens unit is far from these lens units, whereby the second lens unit inevitably has a weak refractive power. As a result, the second lens unit must be moved for a long distance for variation of the focal length of the lens system and prolongs the total length of the vari-focal subsystem. Further, since the first lens unit and the second lens unit have the weak powers respectively, the entrance pupil is far from the first surface of the lens system toward the image side, thereby making it necessary to enlarge the diameter especially of the first lens unit. Furthermore, the convex lens elements to be arranged in the first lens unit must be thick for reserving the required thickness at the marginal portions thereof, thereby producing a vicious cycle to locate the entrance pupil farther from the first surface of the lens system, enlarge the diameter of the first lens unit and prolong the total length of the vari-focal subsystem. In addition, since the lens system is focused by moving the first lens unit, the entrance pupil is brought still farther from the first surface of the lens system when it is focused on an object located at a short distance. In order to solve this problem related to focusing, the above-mentioned Japanese Patents Kokai Publication No. Sho 62-24213, Kokai Publication No. Sho 62-178917, Kokai Publication No. Sho 62-215225 and so on disclosed the vari-focal lens systems of the types which adopted the rear focusing method and/or used a compensator arranged after an aperture stop. These publications provided technical means very excellent for shortening total lengths of vari-focal lens systems and reducing diameters of the first lens units. Especially, Japanese Patent Kokai Publication No. Sho 62-178917 contained technical information which permits remarkably reducing number of lens elements required for composing the lens system and correcting aberrations favorably therein by using an aspherical surface in the imaging subsystem. However, this publication scarcely made use of this technology effectively for designing the lens system, whereby the total length of the lens system disclosed by this publication and the diameter of the first lens unit used in this lens system remained substantially the same as those of the lens system proposed previously.

Speaking concretely, the lens system disclosed by Japanese Patent Kokai Publication No. Sho 62-178917 consists of a vari-focal subsystem which is composed of a first lens unit having a positive refractive power, and a second lens unit having a negative refractive power; and an imaging subsystem which is composed of a third lens unit always kept stationary and a fourth lens unit movable for correcting deviation of the image surface caused by variation of focal length or variation to the distance as measured to an object to be imaged. The third lens unit of this lens system consists only of a single positive lens element, whereas the fourth lens unit consists of two or three lens elements including at least one negative lens element. By adopting the rear focusing method and using the aspherical surface, Japanese Patent Kokai Publication No. Sho 62-178917 succeeded in composing the lens system of less than 10 lens elements or eliminating the unnecessary airspaces, thereby shortening the total length of the lens system and reducing the diameter of the first lens unit.

Though the lens system described above adopts the rear focusing method so as to permit strengthening the power of the first lens unit, the lens system uses the first lens unit which has a power not so strong and the second lens unit whose power is still weak. Further, the third lens unit which is composed of the single lens element produces an undesirable effect that it cannot converge a light bundle sufficiently for composing an afocal lens system and it obliges the fourth lens unit to have a long focal length, thereby making it impossible to shorten the total length of the lens system and sufficiently shorten the diameter of the first lens unit.

SUMMARY OF THE INVENTION

A primary object of the present invention is to provide a vari-focal lens system which comprises a vari-focal subsystem comprising a first lens unit having a positive refractive power and a second lens unit having a negative refractive power, and an imaging subsystem comprising a third lens unit which has a positive refractive power and is always kept stationary, and a fourth lens unit which has a positive refractive power and is movable for correcting deviation of image point caused by focusing and variation of focal length; is designed so as to be composed of 10 or a smaller number of lens elements by selecting an adequate power distribution among the lens elements arranged in the vari-focal subsystem and adequate compositions for the third lens unit and the fourth lens unit respectively; has a very short total length; uses the first lens unit having a short diameter; and has a compact external size, light weight, a high aperture ratio and a high vari-focal ratio.

The vari-focal lens system having the short total length according to the present invention comprises, in the order from the object side, the vari-focal subsystem consisting of the first lens unit having the positive refractive power and the second lens unit having the negative refractive power, and the imaging subsystem consisting of the third lens unit which has a positive refractive power and is always kept stationary, and the fourth lens unit which has the positive refractive power and is movable for correcting the deviation of image point caused by variation of focal length; said third lens unit comprising a positive lens element which is arranged on the object side and has a convex surface on the object side as well as a negative lens element having a concave surface on the image side, and is composed of four or a smaller number of lens elements.

It is desirable that said imaging subsystem (the third lens unit and the fourth lens unit) comprises at least one aspherical surface.

Further, the fourth lens unit comprises two or a smaller number of positive lens elements and the vari-focal lens system can be focused by moving the fourth lens unit along the optical axis.

Furthermore, the vari-focal lens system according to the present invention, which comprises the above-mentioned four lens units including the third lens unit and the fourth lens unit composed as described above, is designed so as to satisfy the following conditions (1) through (3):

$$0.55 < f_1/\{f_T(f_W \cdot f_T)^{\frac{1}{2}}\}^{\frac{1}{2}} < 1.35 \quad (1)$$

$$0.4 < f_{III}/(f_W \cdot f_T)^{\frac{1}{2}} < 2.5 \quad (2)$$

$$-0.5 < HH_{II-III}/(f_W \cdot f_T)^{\frac{1}{2}} < 0.25 \quad (3)$$

wherein the reference symbols $f_W$ and $f_T$ represent focal lengths of the vari-focal lens system as a whole at the wide position and tele position respectively, the reference symbol $f_I$ designates the focal length of the first lens unit, the reference symbol $f_{III}$ denotes the focal length of the third lens unit, and the reference symbol $HH_{II-III}$ represents the distance as measured from the principal point of the second lens unit to the principal point of the third lens unit at the tele position.

In the vari-focal lens system according to the present invention, the third lens unit comprises, in the order from the object side, one to three positive lens elements and a negative lens element having a strongly concave surface on the image side, and an object side surface of any one of the positive lens elements arranged in the third lens unit or any one of the lens elements arranged in the fourth lens unit is designed as an aspherical surface which has a curvature lowered as the portions of said surface are farther from the optical axis. It is desirable that the third lens unit and the fourth lens unit are designed so as to satisfy the conditions (4) through (6) mentioned below:

$$0.3 < R_{31}/(N_{31}-1)(f_W \cdot f_T)^{\frac{1}{2}} < 2.0 \quad (4)$$

$$0.2 < R_{36}/(N_{33}-1)(f_W \cdot f_T)^{\frac{1}{2}} < 1.6 \quad (5)$$

$$0.25 < (D_{III}+D_{IV})/(f_W \cdot f_T)^{\frac{1}{2}} < 1.5 \quad (6)$$

wherein the reference symbol $D_{III}$ represents thickness of the third lens unit as measured on the optical axis, the reference symbol $D_{IV}$ designates thickness of the fourth lens unit as measured on the optical axis, the reference symbols $N_{31}$ and $N_{33}$ designate refractive indices of the lens elements which are arranged on the most object side and the most image side respectively in the third lens unit, and the reference symbols $R_{31}$ and $R_{36}$ denote radii of curvature on the most object side surface and the most image side surface respectively of the third lens unit.

The vari-focal lens system having the short total length according to the present invention is characterized in that it adopts the lens composition which comprises the vari-focal subsystem consisting, in the order from the object side, of the first lens unit having the positive refractive power and the second lens unit having the negative refractive power, and the imaging subsystem consisting of the third lens unit which has the positive refractive power and is always kept stationary, and the fourth lens unit which has the positive refractive power and is movable for correcting the deviation of the image surface caused mainly by the variation of focal length and variation of the distance to an object to be imaged; and that the refractive power of the first lens unit is remarkably strengthened, paying attention to that fact that the vari-focal lens system is not focused by moving the first lens unit and the variation of aberrations to be caused by focusing in the vicinity of the tele position has little relation to the composition of the first lens unit.

When the refractive power of the first lens unit is strengthened, the point of the image formed by the first lens unit, i.e., the object point for the second lens unit, is brought closer to the second lens unit, thereby making it possible to strengthen the refractive power of the second lens unit so far as the range of variation of focal length to be performed by moving the second lens unit remains substantially unchanged.

Since the second lens unit of the vari-focal lens system according to the present invention has the composition which is the same as that of the second lens unit of the conventional example of vari-focal lens system, the variations of aberrations caused by the variation of focal length are sufficiently corrected by the second lens unit itself and it is possible to suppress the variations of aberrations even when the refractive power of the second lens unit is strengthened.

By strengthening the refractive powers of the first lens unit and the second lens unit, it is possible to shorten the moving distance of the second lens unit required for the variation of focal length and shorten the total length of the vari-focal subsystem. When the refractive power of the first lens unit is strengthened, there may be posed a problem in conjunction with reservation of the required thickness at the marginal portion of convex lens element arranged in the first lens unit. However, since the total length of the vari-focal subsystem is shortened by strengthening the refractive power of the first lens unit and the first lens unit is not moved for focusing the vari-focal lens system, the entrance pupil is brought closer to the first surface of the vari-focal lens system and the diameter of the first lens unit can be reduced, whereby the problem related to the thickness at the marginal portion of the convex lens element is solved.

It is desirable that the refractive power of the first lens unit which is strengthened as described above satisfies the above-mentioned condition (1).

If the first lens unit has a refractive power which is strong enough to exceed the lower limit of the condition (1), it will be impossible to correct spherical aberration, curvature of field and distortion sufficiently at the tele position. If the upper limit of the condition (1) is exceeded, in contrast, it will be impossible to shorten the total length of the vari-focal lens system.

When the refractive power of the first lens unit is strengthened as described above, it is desirable to define the refractive power of the second lens unit so as to satisfy the following condition (1'):

(1') $0.2 < |f_{II}|/\sqrt{f_W \cdot f_T} < 0.7$ wherein the reference symbol $f_{II}$ represents the focal length of the second lens unit.

If the lower limit of the condition (1') is exceeded, aberrations will tend to be varied remarkably by the variation of focal length. If the upper limit of the condition (1') is exceeded, in contrast, it will be impossible to shorten the diameter of the first lens unit.

The technical information provided above is useful for shortening the total length of the vari-focal lens system by shortening the total length of the vari-focal subsystem and is applicable to lens systems which have certain field angles (field angles of 36° and wider at the wide positions).

Now, description will be made on a technical concept for shortening the total length of the vari-focal lens system by shortening the total length of the imaging subsystem.

The total length of the imaging subsystem is prolonged by arranging lens elements in a large number in the subsystem, reserving a wide airspace between the third lens unit and the fourth lens unit, and designing the imaging subsystem so as to have a back focal length longer than necessary.

The number of the lens elements can be reduced by using an aspherical surface, whereby the length of the lens unit comprising the aspherical surface can be shortened.

The conventional lens system comprises a useless airspace due to the long back focal length thereof. Generally speaking, a light bundle incident on the third lens unit is made afocal, emerges from the third lens unit and then falls on the fourth lens unit. The reason for allowing the afocal light bundle to fall on the fourth lens unit is to reduce the variation of spherical aberration to be caused by adjustment of focal point. Since the afocal light bundle is incident on the fourth lens unit, the back focal length of the vari-focal lens system is determined by the focal length of the fourth lens unit, which in turn is determined by the focal length and the composition of the third lens unit. That is to say, the focal length of the fourth lens unit can be shortened by lowering the height (h) of the paraxial ray incident on the fourth lens unit. For this purpose, it is sufficient to shorten the focal length of the second lens unit by bringing the principal point of the third lens unit closer to the rear principal point of the second lens unit. The condition (2) is required for the reason described above.

If the upper limit of the condition (2) is exceeded, it will be impossible to shorten the back focal length of the imaging subsystem. If the lower limit of the condition (2) is exceeded, the light bundle emerging from the third lens unit will be strongly converged and aberrations will be remarkably varied by moving the fourth lens unit.

Further, it is desirable that a focal length $f_{IV}$ of the fourth lens unit satisfies the following condition (2'):

(2') $0.3 < f_{IV}/\sqrt{f_W \cdot f_T} < 1.2$

Since the focal length of the fourth lens unit is determined by the total refractive power of the first through third lens units so far as the light bundle emerging from the third lens unit is nearly afocal, the condition (2') can be said as a derivative condition.

If the upper limit of the condition (2') is exceeded, the back focal length of the imaging subsystem will tend to be prolonged. If the lower limit of the condition (2') is exceeded, the back focal length of the imaging subsystem will be shortened, thereby making it impossible to reserve the minimum airspace required for arranging an optical low pass filter and so on.

In order to shorten the back focal length of the vari-focal lens system according to the present invention, it is desirable to bring the principal point of the third lens unit as close as possible to the second lens unit as described above. For this purpose, the condition (3) is adopted.

The condition (3) defines the distance as measured from the rear principal point of the second lens unit to the front principal point of the third lens unit. If the upper limit of the condition (3) is exceeded, it will be difficult to shorten the back focal length of the vari-focal lens system. If the lower limit of the condition (3) is exceeded, it will be difficult to compose the second lens unit and the third lens unit so as to maintain favorably corrected aberrations with no mechanical interference between the second lens unit and the third lens unit.

When the third lens unit is composed of a single lens element as in the case of the lens system disclosed by Japanese Patent Kokai Publication No. Sho 62-178917, the second lens unit and the third lens unit are apt to mechanically interfere with each other before the principal points of these lens units are brought close to each other. When these lens units are composed so as to avoid the mechanical interference, the light bundle emerging from the third lens unit is enhanced, thereby prolonging the back focal length of the vari-focal lens system.

By composing the third lens unit, in the order from the object side, of one to three positive lens elements and a negative lens elements, i.e., two to four lens elements in total, it is at least possible to bring the front principal point of the third lens unit close to the rear principal point of the second lens unit, or shorten the distance between the principal points of the second lens unit and the third lens unit with no mechanical interference between these lens units.

From the viewpoint described above, it is desirable to design the third lens unit so as to satisfy the condition (2') mentioned below:

$$(3') \quad -1.0 < H_{III}/\sqrt{f_W \cdot f_T} < 0$$

The condition (3') defines the distance $H_{III}$ as measured from the vertex of the object side surface of the third lens unit to the front principal point of the third lens unit. If the upper limit of the condition (3') is exceeded, it will be difficult to favorably correct aberrations with no mechanical interference between the second lens unit and the third lens unit while maintaining the short back focal length of the vari-focal lens system. If the lower limit of the condition (3') is exceeded, in contrast, each of the lens elements arranged in the third lens unit will have too strong a refractive power, thereby making it difficult to correct aberrations.

For shifting the front principal point of the third lens unit effectively toward the object side, it is desirable to design the lens elements to be used for composing the third lens unit so as to satisfy the above-mentioned conditions (4) and (5).

The conditions (4) and (5) define the powers of the most object side surface and the most image side surface respectively of the third lens unit. If the upper limit of the condition (4) or (5) is exceeded, it will be difficult to shorten the distance $HH_{II-III}$. If the lower limit of the condition (4) or (5) is exceeded, it will be difficult to favorably correct spherical aberration and coma even by using an aspherical surface. The reference symbols $R_{31}$ and $R_{36}$ used in the conditions (4) and (5) represent the radii of curvature as measured in the vicinity of the optical axis wherein the paraxial values are the same for all the rays.

When the conditions (4) and (5) are satisfied, it is possible to obtain favorable optical performance of the vari-focal lens system while shortening the back focal length thereof.

The third lens unit of the vari-focal lens system according to the present invention comprises the lens elements in a number larger than that of the lens elements arranged in the third lens unit of the conventional lens system (for example, the lens system disclosed by Japanese Patent Kokai Publication No. Sho 62-178917), and is thicker than the latter third lens unit. Therefore, the vari-focal lens system according to the present invention cannot have a remarkably shortened total length simply by shortening the back focal length thereof as described above.

The fourth lens unit of the conventional example described above comprises three lens elements, whereas the fourth lens unit of the vari-focal lens system according to the present invention is composed only of one or two positive lens elements.

It is for the purpose of correcting chromatic aberration and Petzval's sum in the imaging subsystem as a whole that the fourth lens nit of the conventional lens system is composed of the three lens elements. When the function to correct the chromatic aberration and Petzval's sum is imparted to the third lens unit which is composed of the plurality of lens elements, it is therefore possible to compose the fourth lens unit of a single lens element.

When the exit pupil of the lens system is brought too near to obtain a sufficient amount of light on the light receiving surface of an image pickup device by composing the fourth lens unit of the single lens element, it is allowed to add a field lens (a lens element having a positive refractive power) in the vicinity of the light receiving surface of the image pickup device or to compose the fourth lens unit of two positive lens elements. In the former case, the field lens may have a weak power. In the latter case, the thickness of the fourth lens unit as a whole is not increased so much and no problem is posed in conjunction with the shortening of the total length of the vari-focal lens system since the fourth lens unit has a short diameter and the power of the above-mentioned single lens element is shared between the two lens elements.

Furthermore, the above-mentioned condition (6) relates to the back focal length of the vari-focal lens system, and defines the total sum of the thickness of the third lens unit as a whole and that of the fourth lens unit as a whole. If the upper limit of the condition (6) is exceeded, the total sum will have a large value, thereby cancelling the effect of shortening the back focal length for shortening the total length of the vari-focal lens system. If the lower limit of the condition (6) is exceeded, it will undesirably be difficult to reserve the required thickness at the marginal portion of the positive lens element.

It is desirable for further shortening the total length of the vari-focal lens system to reserve an air-space between the third lens unit and the fourth lens unit so as to satisfy the following condition (7):

$$1.0 \times 10^{-3} < D_{FT}/f_T^2 < 7.0 \times 10^{-3} \tag{7}$$

The condition (7) defines an airspace $D_{FT}$ to be reserved between the third lens unit and the fourth lens unit at the wide position when the vari-focal lens system is focused on an object located at infinite distance. For accomplishing the object of the present invention, it is desirable that $D_{FT}$ is as narrow as possible. For focusing the vari-focal lens system, it is necessary that $D_{FT}$ has a certain value.

On an assumption that the light bundle emerging from the third lens unit is afocal, a moving distance $\Delta$ of the fourth lens unit for focusing the vari-focal lens system on an object located at a given distance is expressed as follows:

$$\Delta = a \cdot \beta_{I\text{-}III}^2 \cdot f_{IV}^2$$

wherein the reference symbol $\beta_{I\text{-}III}$ represents the magnification of the lens system composed of the first through third lens units and the reference symbol a designates a constant.

Since the moving distance is almost determined only by the focal length of the vari-focal lens system as a whole, the moving distance is longer as the vari-focal lens system has a longer focal length.

If the upper limit of the condition (7) is exceeded, the vari-focal lens system can be focused on an object located at a shorter distance, but this is scarcely insignificant since aberrations will be aggravated when the vari-focal lens system is focused on the object located at the shorter distance and the airspace widened for moving the fourth lens unit for the longer distance will pose a more serious problem to prolong the total length of the vari-focal lens system. If the lower limit of the condition (7) is exceeded, in contrast, it will be difficult to focus the vari-focal lens system on an object located at a short distance.

Moreover, from the viewpoint to enhance optical performance of the vari-focal lens system, it is desirable to design the third lens unit and the fourth lens unit so as to satisfy the conditions (8) through (10) listed below:

$$-1.8 < (R_{31} + R_{32})/(R_{31} - R_{32}) < -0.1 \quad (8)$$

$$0.2 < (R_{35} + R_{36})/(R_{35} - R_{36}) < 3.5 \quad (9)$$

$$0.6 < R_{41}/R_{36} < 2.4 \quad (10)$$

wherein the reference symbols $R_{31}$ and $R_{32}$ represent radii of curvature on the object side surface and the image side surface respectively of the lens element arranged on the most object side in the third lens unit, the reference symbols $R_{35}$ and $R_{36}$ designates the radii of curvature on the most object side surface and the most image side surface respectively of the lens element arranged on the image side in the third lens unit, and the reference symbol $R_{41}$ denotes the radius of curvature on the most object side surface of the fourth lens unit.

The condition (8) defines a shape factor for the positive lens element arranged on the most object side in the third lens unit. If the lower limit of the condition (8) is exceeded, it will be difficult to correct spherical aberration. If the upper limit of the condition (8) is exceeded, it will be impossible to design the vari-focal lens system compact.

The condition (9) defines a shape factor for the negative lens element arranged on the most image side in the third lens unit. If the lower limit of the condition (9) is exceeded, it will be difficult to design the vari-focal lens system compact. If the upper limit of the condition (9) is exceeded, in contrast, it will be difficult to correct spherical aberration.

The condition (10) defines a ratio between the radius of curvature $R_{36}$ on the most image side surface of the third lens unit and the radius of curvature $R_{41}$ on the most object side surface of the fourth lens unit.

In the airspace reserved between the third lens unit and the fourth lens unit which is variable, the light bundle is nearly afocal and spherical aberration is scarcely varied. However, since degree of the afocality varies dependently on focal length, it is desirably, for minimizing variation of focal length to be caused by focusing, that $R_{36}$ and $R_{41}$ have values which are as close as possible to each other.

If the upper limit or the lower limit of the condition (10) is exceeded, not only spherical aberration but also astigmatism will easily be varied.

When any one of the surfaces described above is designed as an aspherical surface, the radius of curvature on this surface is to be determined as that on the portion of the reference sphere thereof located in the vicinity of the optical axis wherein the paraxial values are the same for all the rays.

Especially for correcting spherical aberration, it is the most effective to use an aspherical surface as the object side surface of the positive lens element arranged in the third lens unit. However, a prettily high effect can be obtained by using an aspherical surface as any one of the surfaces of the fourth lens unit. An aspherical surface used in the fourth lens unit provides an effect for correcting coma rather than spherical aberration. Accordingly, it is very effective for correcting both aberrations to use one aspherical surface in each of the third lens unit and the fourth lens unit.

It is desirable to design the aspherical surface to be used in the third lens unit so as to have a curvature which is lowered as the portions of said aspherical surface are farther from the optical axis. In addition, it is desirable that the degree of asphericality, i.e., departure $\Delta x$ from the reference sphere, of the aspherical surface satisfies the following conditions (11) and (12):

$$(11) \quad -1.0 \times 10^{-4} < \Delta x / \sqrt{f_W \cdot f_T} < 0 \quad (y = 0.182 y_1)$$

$$(12) \quad -2.5 \times 10^{-2} < \Delta x / \sqrt{f_W \cdot f_T} < 0 \quad (y = 0.437 y_1)$$

wherein the reference symbol y represents a height as measured from the optical axis and the reference symbol $y_1$ is expressed as $$\sqrt{f_W \cdot f_T}/F$$

(the reference symbol F designates an F number of the vari-focal lens system at the wide position).

The condition (11) defines the value of $\Delta x$ of the aspherical surface at $y=0.182 y_1$, i.e. at the portion in the vicinity of the optical axis, and means that the departure from the reference sphere which is not so large is desirable. Aberrations of the rays having heights within such a range can be corrected without using an aspherical surface. However, the aspherical surface having the departure from the reference sphere within the range defined by the condition (11) for the rays having such heights is effective for correcting the aberrations of high orders which are to be produced when the vari-focal lens system has a large aperture. Accordingly, it will undesirably be difficult to properly balance aberrations if the upper limit of the condition (11) is exceeded.

For the rays having the heights above the optical axis in the vicinity of $y=0.437 y_1$ defined by the condition (12), it is difficult to correct spherical aberration and coma by using spherical lens elements only. Within this range of heights of rays, it is desirable to reduce amounts of aberrations to be produced by using the aspherical surface which has a curvature lower than that of the reference sphere thereof.

If the lower limit of the condition (12) is exceeded, aberrations will tend to be corrected insufficiently by the aspherical surface. If the upper limit of the condition (12) is exceeded, aberrations will tend to be aggravated.

In addition, it is desirable for correcting aberrations to design the positive lens element having the aspherical surface in the fourth lens unit so as to satisfy the following condition:

$$-1.8 < (R_1 + R_2)/(R_1 - R_2) < -0.1$$

wherein the reference symbols $R_1$ and $R_2$ represent the radius of curvature of the object side surface and the radius of curvature of the image side surface respectively, either of which is to be determined as the paraxial radius of curvature, when the surface of interest is an aspherical surface, of the lens element having the aspherical surface in the fourth lens unit.

This condition defines a shape factor for the positive lens element having the aspherical surface in the fourth lens unit. If this condition is not satisfied, the aspherical surface will not exhibit its effect for correcting aberrations.

BRIEF DESCRIPTION OF THE DRAWINGS

FIG. 1 through FIG. 19 show sectional views illustrating compositions of Embodiments 1 through 19 respectively of the vari-focal lens system according to the present invention;

FIG. 44, FIG. 45 and FIG. 46 show curves illustrating aberration characteristics at the wide position, intermediate focal length and tele position respectively of the Embodiment 9 of the present invention;

DETAILED DESCRIPTION OF THE PREFERRED EMBODIMENTS

Figure 1:
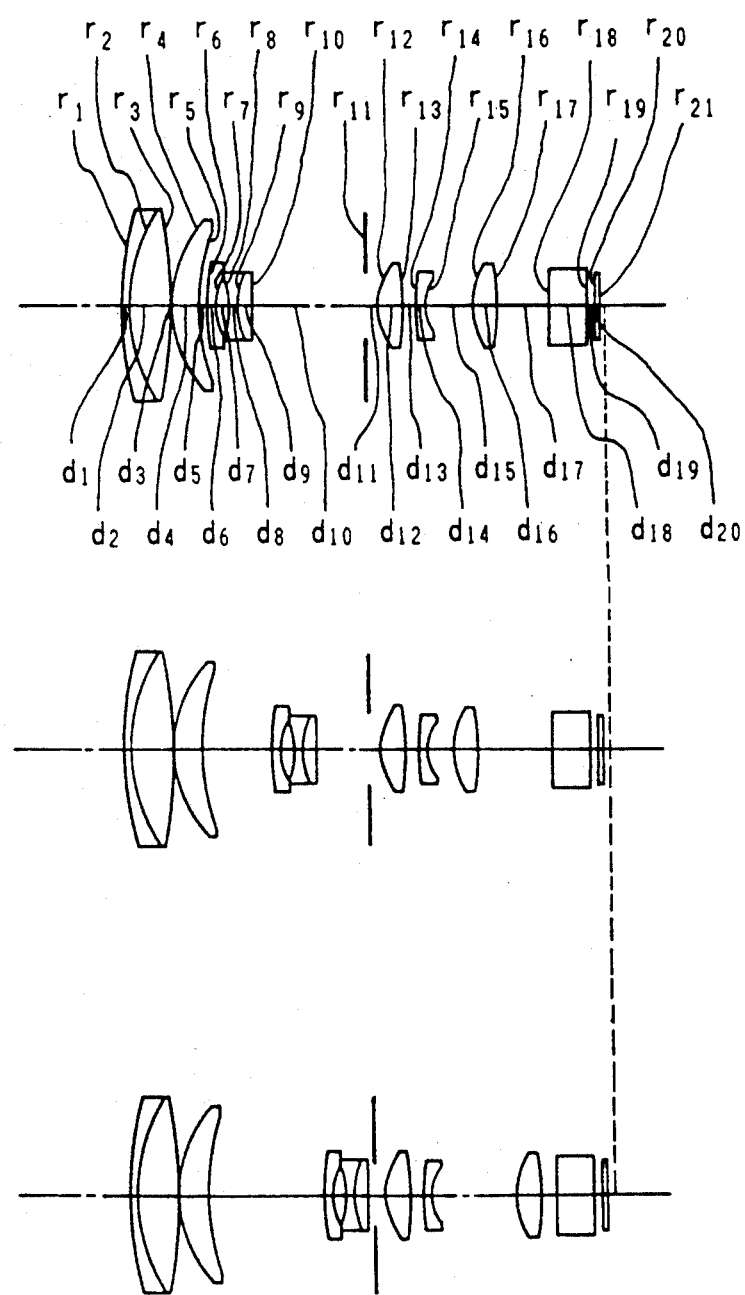

Now, the vari-focal lens system having the short total length according to the present invention will be described more detailedly below with reference to the preferred embodiments thereof illustrated in the accompanying drawings and given in the form of the following numerical data:

| Embodiment 1 | |
|---|---|
| f = 8.76~65.96, | f/2.0~f/2.6 |
| 2ω = 50.2°~7.2° | |

-continued

| | | | |
|---|---|---|---|
| $r_1 = 51.4795$ | | | |
| | $d_1 = 1.0000$ | $n_1 = 1.80518$ | $\nu_1 = 25.43$ |
| $r_2 = 23.9639$ | | | |
| | $d_2 = 5.6000$ | $n_2 = 1.60311$ | $\nu_2 = 60.70$ |
| $r_3 = -71.1147$ | | | |
| | $d_3 = 1.1500$ | | |
| $r_4 = 17.8414$ | | | |
| | $d_4 = 3.8000$ | $n_3 = 1.60311$ | $\nu_3 = 60.70$ |
| $r_5 = 33.3216$ | | | |
| | $d_5 = D_1$ (variable) | | |
| $r_6 = 37.2001$ | | | |
| | $d_6 = 1.1026$ | $n_4 = 1.69680$ | $\nu_4 = 55.52$ |
| $r_7 = 7.3340$ | | | |
| | $d_7 = 2.0000$ | | |
| $r_8 = -10.3299$ | | | |
| | $d_8 = 1.0000$ | $n_5 = 1.69680$ | $\nu_5 = 55.52$ |
| $r_9 = 9.5724$ | | | |
| | $d_9 = 2.0000$ | $n_6 = 1.80518$ | $\nu_6 = 25.43$ |
| $r_{10} = 469.3178$ | | | |
| | $d_{10} = D_2$ (variable) | | |
| $r_{11} = \infty$ (stop) | | | |
| | $d_{11} = 1.5000$ | | |
| $r_{12} = 7.9854$ (aspherical surface) | | | |
| | $d_{12} = 3.5000$ | $n_7 = 1.69680$ | $\nu_7 = 55.52$ |
| $r_{13} = -37.1999$ | | | |
| | $d_{13} = 1.8644$ | | |
| $r_{14} = 42.6275$ | | | |
| | $d_{14} = 1.2104$ | $n_8 = 1.80518$ | $\nu_8 = 25.43$ |
| $r_{15} = 6.7517$ | | | |
| | $d_{15} = D_3$ (variable) | | |
| $r_{16} = 10.1365$ (aspherical surface) | | | |
| | $d_{16} = 3.3000$ | $n_9 = 1.56384$ | $\nu_9 = 60.69$ |
| $r_{17} = -33.5763$ | | | |
| | $d_{17} = D_4$ (variable) | | |
| $r_{18} = \infty$ | | | |
| | $d_{18} = 5.1000$ | $n_{10} = 1.54771$ | $\nu_{10} = 62.83$ |
| $r_{19} = \infty$ | | | |
| | $d_{19} = 1.2100$ | | |
| $r_{20} = \infty$ | | | |
| | $d_{20} = 0.6000$ | $n_{11} = 1.48749$ | $\nu_{11} = 70.20$ |
| $r_{21} = \infty$ | | | | aspherical surface coefficient
(12th surface)
$A_4 = -0.25435 \times 10^{-3}$, $A_6 = -0.144404 \times 10^{15}$
$A_8 = -0.46594 \times 10^{-7}$ $P = 1$
(16th surface)
$A_4 = -0.22509 \times 10^{-3}$, $A_6 = 0.35300 \times 10^{-5}$
$G = -0.91309 \times 10^{-7}$

| f | 8.76 | 24.04 | 65.96 |
|---|---|---|---|
| $D_1$ | 1.000 | 9.497 | 15.916 |
| $D_2$ | 15.916 | 7.420 | 1.000 |
| $D_3$ | 6.391 | 3.500 | 11.458 |
| $D_4$ | 7.067 | 9.958 | 2.000 |

$f_I/\{f_T(f_W \cdot f_T)^{\frac{1}{2}}\}^{\frac{1}{2}} = 0.753$, $f_{II}/(f_W \cdot f_T)^{\frac{1}{2}} = 0.296$
$f_{III}/(f_W \cdot f_T)^{\frac{1}{2}} = 0.855$, $f_{IV}/(f_W \cdot f_T)^{\frac{1}{2}} = 0.591$
$HH_{II\,III}/(f_W \cdot f_T)^{\frac{1}{2}} = -0.142$, $H_{III}/(f_W \cdot f_T)^{\frac{1}{2}} = -0.358$
$R_{31}/(N_{31} - 1)(f_W \cdot f_T)^{\frac{1}{2}} = 0.477$
$R_{36}/(N_{33} - 1)(f_W \cdot f_T)^{\frac{1}{2}} = 0.335$
$D_{III\,IV}/(f_W \cdot f_T)^{\frac{1}{2}} = 0.394$, $D_{FT}/f_T^2 = 2.634 \times 10^{-3}$
$(R_{31} + R_{32})/(R_{31} - R_{32}) = -0.647$
$(R_{35} + R_{36})/(R_{35} - R_{36}) = 1.376$, $R_{41}/R_{36} = 1.501$
total length of lens system 63.320
diameter of front lens component 25.2$\phi$ Embodiment 2

$f = 6.49 \sim 48.90$, $F/1.4 \sim F/2.2$
$2\omega = 51.8° \sim 7.4°$

| | | | |
|---|---|---|---|
| $r_1 = 57.3585$ | | | |
| | $d_1 = 1.0000$ | $n_1 = 1.80518$ | $\nu_1 = 25.43$ |
| $r_2 = 23.7370$ | | | |
| | $d_2 = 5.6000$ | $n_2 = 1.60311$ | $\nu_2 = 60.70$ |
| $r_3 = -71.5301$ | | | |
| | $d_3 = 0.1500$ | | |
| $r_4 = 17.1706$ | | | |
| | $d_4 = 3.8000$ | $n_3 = 1.60311$ | $\nu_3 = 60.70$ |
| $r_5 = 43.6355$ | | | |
| | $d_5 = D_1$ (variable) | | |
| $r_6 = 1140.8303$ | | | |
| | $d_6 = 1.1026$ | $n_4 = 1.69680$ | $\nu_4 = 55.52$ |
| $r_7 = 6.8647$ | | | |
| | $d_7 = 2.0000$ | | |
| $r_8 = -9.8125$ | | | |
| | $d_8 = 1.0000$ | $n_5 = 1.69680$ | $\nu_5 = ]55.52$ |
| $r_9 = 8.1232$ | | | |
| | $d_9 = 2.600$ | $n_6 = 1.80518$ | $\nu_6 = 25.43$ |
| $r_{10} = 735.9093$ | | | |
| | $d_{10} = D_2$ (variable) | | |
| $r_{11} = \infty$ (stop) | | | |
| | $d_{11} = 1.5000$ | | |
| $r_{12} = 13.4774$ | | | |
| | $d_{12} = 3.400$ | $n_7 = 1.60311$ | $\nu_7 = 60.70$ |
| $r_{13} = -65.0959$ | | | |
| | $d_{13} = 0.300$ | | |
| $r_{14} = 16.4183$ | | | |
| | $d_{14} = 2.5000$ | $n_8 = 1.60311$ | $\nu_8 = 60.70$ |
| $r_{15} = 141.9059$ | | | |
| | $d_{15} = 0.300$ | | |
| $r_{16} = 8.6800$ | | | |
| | $d_{16} = 2.4000$ | $n_9 = 1.60311$ | $\nu_9 = 60.70$ |
| $r_{17} = 17.8996$ | | | |
| | $d_{17} = 0.700$ | | |
| $r_{18} = -28.6777$ | | | |
| | $d_{18} = 1.2104$ | $n_{10} = 1.80518$ | $\nu_{10} = 25.43$ |
| $r_{19} = 8.6110$ | | | |
| | $d_{19} = D_3$ (variable) | | |
| $r_{20} = 8.9305$ (aspherical surface) | | | |
| | $d_{20} = 3.3000$ | $n_{11} = 1.56384$ | $\nu_{11} = 60.69$ |
| $r_{21} = -18.5051$ | | | |
| | $d_{21} = D_4$ (variable) | | |
| $r_{22} = \infty$ | | | |
| | $d_{22} = 5.1000$ | $n_{12} = 1.54771$ | $\nu_{12} = 62.83$ |
| $r_{23} = \infty$ | | | |
| | $d_{23} = 1.2100$ | | |
| $r_{24} = \infty$ | | | |
| | $d_{24} = 0.6000$ | $n_{13} = 1.48749$ | $\nu_{13} = 70.20$ |
| $r_{25} = \infty$ | | | | aspherical surface coefficient
$A_4 = -0.37686 \times 10^{-3}$, $A_6 = -0.16869 \times 10^{-5}$
$A_8 = 0$ $P = 1$

| f | 6.49 | 17.82 | 48.90 |
|---|---|---|---|
| $D_1$ | 1.000 | 9.287 | 14.619 |
| $D_2$ | 14.619 | 6.332 | 1.000 |
| $D_3$ | 6.351 | 3.500 | 6.931 |
| $D_4$ | 2.580 | 5.431 | 2.000 |

$f_I/\{f_T(f_W \cdot f_T)^{\frac{1}{2}}\}^{\frac{1}{2}} = 0.940$, $f_{II}/(f_W \cdot f_T)^{\frac{1}{2}} = 0.329$
$f_{III}/(f_W \cdot f_T)^{\frac{1}{2}} = 0.836$, $f_{IV}/(f_W \cdot f_T)^{\frac{1}{2}} = 0.627$
$HH_{II\,III}/(f_W \cdot f_T)^{\frac{1}{2}} = -0.120$, $H_{III}/(f_W \cdot f_T)^{\frac{1}{2}} = -0.442$
$R_{31}/(N_{31} - 1)(f_W \cdot f_T)^{\frac{1}{2}} = 1.254$
$R_{36}/(N_{33} - 1)(f_W \cdot f_T)^{\frac{1}{2}} = 0.600$
$D_{III\,IV}/(f_W \cdot f_T)^{\frac{1}{2}} = 0.792$, $D_{FT}/f_T^2 = 2.899 \times 10^{-3}$
$(R_{31} + R_{32})/(R_{31} - R_{32}) = -0.657$
$(R_{35} + R_{36})/(R_{35} - R_{36}) = 0.538$, $R_{41}/R_{36} = 1.037$
total length of lens system 63.332
diameter of front lens component 24.0$\phi$ Embodiment 3

$f = 6.49 \sim 48.90$, $F/1.4 \sim F/2.2$
$2\omega = 51.8° \sim 7.4°$

| | | | |
|---|---|---|---|
| $r_1 = 49.2800$ | | | |
| | $d_1 = 1.0000$ | $n_1 = 1.80518$ | $\nu_1 = 25.43$ |
| $r_2 = 23.1954$ | | | |
| | $d_2 = 5.2000$ | $n_2 = 1.60311$ | $\nu_2 = 60.70$ |
| $r_3 = -1.04.9168$ | | | |
| | $d_3 = 0.1500$ | | |
| $r_4 = 18.4142$ | | | |
| | $d_4 = 3.7500$ | $n_3 = 1.60311$ | $\nu_3 = 60.70$ |
| $r_5 = 58.6398$ | | | |
| | $d_5 = D_1$ (variable) | | |
| $r_6 = 60.7724$ | | | |
| | $d_6 = 1.1026$ | $n_4 = 1.69680$ | $\nu_4 = 55.52$ |
| $r_7 = 6.6301$ | | | |
| | $d_7 = 2.0000$ | | |
| $r_8 = -9.8199$ | | | |
| | $d_8 = 1.0000$ | $n_5 = 1.69680$ | $\nu_5 = 55.52$ |

-continued $r_9 = 11.1626$
$d_9 = 2.4000$  $n_6 = 1.80518$  $\nu_6 = 25.43$
$r_{10} = -73.9440$
$d_{10} = D_2$ (variable)
$r_{11} = \infty$ (stop)
$d_{11} = 1.5000$
$r_{12} = 8.9570$
$d_{12} = 4.2000$  $n_7 = 1.69680$  $\nu_7 = 55.52$
$r_{13} = -97.9282$
$d_{13} = 0.8990$
$r_{14} = -18.4246$
$d_{14} = 1.2000$  $n_8 = 1.80518$  $\nu_8 = 25.43$
$r_{15} = 9.9456$
$d_{15} = 0.5000$
$r_{16} = 16.4456$
$d_{16} = 2.4000$  $n_9 = 1.69680$  $\nu_9 = 55.52$
$r_{17} = -31.7035$
$d_{17} = D_3$ (variable)
$r_{18} = 9.9286$ (aspherical surface)
$d_{18} = 4.1000$  $n_{10} = 1.56384$  $\nu_{10} = 60.69$
$r_{19} = -29.2366$
$d_{19} = D_4$ (variable)
$r_{20} = \infty$
$d_{20} = 5.1000$  $n_{11} = 1.54771$  $\nu_{11} = 62.83$
$r_{21} = \infty$
$d_{21} = 1.2100$
$r_{22} = \infty$
$d_{22} = 0.6000/$  $\nu_{12} = 70.20$
$n_{12} = 1.48749$
$r_{23} = \infty$
aspherical surface coefficient
$A_4 = -0.22999 \times 10^{-3}$, $A_6 = -0.977968 \times 10^{-6}$
$A_8 = 0$  $P = 1$

| f | 6.49 | 17.82 | 48.90 |
|---|------|-------|-------|
| $D_1$ | 1.300 | 9.552 | 14.895 |
| $D_2$ | 15.095 | 6.843 | 1.500 |
| $D_3$ | 3.764 | 2.500 | 7.591 |
| $D_4$ | 6.264 | 7.528 | 2.437 |

$f_1/\{f_T(f_W \cdot f_T)^{\frac{1}{2}}\}^{\frac{1}{2}} = 0.941$, $f_{II}/(f_W \cdot f_T)^{\frac{1}{2}} = 0.380$
$f_{III}(f_W \cdot f_T)^{\frac{1}{2}} = 1.427$, $f_{IV}(f_W \cdot f_T)^{\frac{1}{2}} = 0.767$
$HH_{II\ III}/(f_W \cdot f_T)^{\frac{1}{2}} = -0.200$, $H_{III}/(f_W \cdot f_T)^{\frac{1}{2}} = -0.159$
$R_{31}/(N_{31} - 1)(f_W \cdot f_T)^{\frac{1}{2}} = 0.722$
$R_{36}/(N_{33} - 1)(f_W \cdot f_T)^{\frac{1}{2}} = 0.693$
$D_{III\ IV}/(f_W \cdot f_T)^{\frac{1}{2}} = 0.747$, $D_{FT}/f_T^2 = 3.175 \times 10^{-3}$
$(R_{31} + R_{32})/(R_{31} - R_{32}) = -0.832$
$(R_{35} + R_{36})/(R_{35} - R_{36}) = 0.299$,
total length of lens system 62.743
diameter of front lens component 26.0φ

Embodiment 4
$f = 6.49 \sim 48.89$,  F/1.5~F/2.1
$2\omega = 51.8° \sim 7.4°$
$r_1 = 61.1461$
$d_1 = 1.0000$  $n_1 = 1.80518$  $\nu_1 = 25.43$
$r_2 = 25.5792$
$d_2 = 5.2000$  $n_2 = 1.60311$  $\nu_2 = 60.70$
$r_3 = -82.8557$
$d_3 = 0.1500$
$r_4 = 18.9721$
$d_4 = 3.7500$  $n_3 = 1.60311$  $\nu_3 = 60.70$
$r_5 = 50.8855$
$d_5 = D_1$ (variable)
$r_6 = 293.8083$
$d_6 = 1.1026$  $n_4 = 1.69680$  $\nu_4 = 55.52$
$r_7 = 7.3631$
$d_7 = 2.0000$
$r_8 = -10.8606$
$d_8 = 1.0000$  $n_5 = 1.69680$  $\nu_5 = 55.52$
$r_9 = 9.0391$
$d_9 = 2.4000$  $n_6 = 1.80518$  $\nu_6 = 25.43$
$r_{10} = -479.7696$
$d_{10} = D_2$ (variable)
$r_{11} = \infty$ (stop)
$d_{11} = 1.5000$
$r_{12} = 11.1400$
$d_{12} = 4.2000$  $n_7 = 1.69680$  $\nu_7 = 55.52$
$r_{13} = -43.8310$ -continued $d_{13} = 0.3000$
$r_{14} = 8.2915$
$d_{14} = 2.4000$  $n_8 = 1.69680$  $\nu_8 = 55.52$
$r_{15} = 19.0091$
$d_{15} = 0.6044$
$r_{16} = -27.4999$
$d_{16} = 1.2104$  $n_9 = 1.80518$  $\nu_9 = 25.43$
$r_{17} = 7.3325$
$d_{17} = D_3$ (variable)
$r_{18} = 9.6114$ (aspherical surface)
$d_{18}\ 4.1000$  $n_{10} = 1.56384$  $\nu_{10} = 60.69$
$r_{19} = -15.3541$
$d_{19} = D_4$ (variable)
$r_{20} = \infty$
$d_{20} = 5.1000$  $n_{11} = 1.54771$  $\nu_{11} = 62.83$
$r_{21} = \infty$
$d_{21} = 1.2100$
$r_{22} = \infty$
$d_{22} = 0.6000$  $n_{12} = 1.48749$  $\nu_{12} = 70.20$
$r_{23} = \infty$
aspherical surface coefficient
$A_4 = -0.39357 \times 10^{-3}$, $A_6 = -0.40862 \times 10^{-6}$
$A_8 = 0$  $P = 1$

| f | 6.49 | 17.82 | 48.89 |
|---|------|-------|-------|
| $D_1$ | 1.300 | 10.119 | 16.488 |
| $D_2$ | 16.688 | 7.869 | 1.500 |
| $D_3$ | 4.934 | 2.472 | 6.157 |
| $D_4$ | 3.660 | 6.123 | 2.437 |

$f_1/\{f_T(f_W \cdot f_T)^{\frac{1}{2}}\}^{\frac{1}{2}} = 1.026$, $f_{II}/(f_W \cdot f_T)^{\frac{1}{2}} = 0.374$
$f_{III}(f_W \cdot f_T)^{\frac{1}{2}} = 1.025$, $f_{IV}(f_W \cdot f_T)^{\frac{1}{2}} = 0.626$
$HH_{II\ III}/(f_W \cdot f_T)^{\frac{1}{2}} = -0.205$, $H_{III}/(f_W \cdot f_T)^{\frac{1}{2}} = -0.555$
$R_{31}/(N_{31} - 1)(f_W \cdot f_T)^{\frac{1}{2}} = 0.898$
$R_{36}/(N_{33} - 1)(f_W \cdot f_T)^{\frac{1}{2}} = 0.511$
$D_{III\ IV}/(f_W \cdot f_T)^{\frac{1}{2}} = 0.719$, $D_{FT}/f_T^2 = 2.576 \times 10^{-3}$
$(R_{31} + R_{32})/(R_{31} - R_{32}) = -0.595$
$(R_{35} + R_{36})/(R_{35} - R_{36}) = 0.579$, $R_{41}/R_{36} = 1.311$
total length of lens system 62.418
diameter of front lens component 24.0φ

Embodiment 5
$f = 6.49 \sim 48.90$,  F/1.6~F/2.2
$2\omega = 51.8° \sim 7.4°$
$r_1 = 62.6591$
$d_1 = 1.0000$  $n_1 = 1.80518$  $\nu_1 = 25.43$
$r_2 = 25.6867$
$d_2 = 5.2000$  $n_2 = 1.60311$  $\nu_2 = 60.70$
$r_3 = -88.1045$
$d_3 = 0.1500$
$r_4 = 19.1934$
$d_4 = 3.7500$  $n_3 = 1.60311$  $\nu_3 = 60.70$
$r_5 = 58.7953$
$d_5 = D_1$ (variable)
$r_6 = -157.6505$
$d_6 = 1.1026$  $n_4 = 1.69680$  $\nu_4 = 55.52$
$r_7 = 7.6914$
$d_7 = 2.0000$
$r_8 = -13.7250$
$d_8 = 1.0000$  $n_5 = 1.69680$  $\nu_5 = 55.52$
$r_9 = 8.3911$
$d_9 = 2.4000$  $n_6 = 1.80518$  $\nu_6 = 25.43$
$r_{10} = 204.9580$
$d_{10} = D_2$ (variable)
$r_{11} = \infty$ (stop)
$d_{11} = 1.5000$
$r_{12} = 11.4645$
$d_{12} = 4.2000$  $n_7 = 1.69680$  $\nu_7 = 55.52$
$r_{13} = -41.1109$
$d_{13} = 0.3000$
$r_{14} = 9.3876$
$d_{14} = 2.4000$  $n_8 = 1.69680$  $\nu_8 = 55.52$
$r_{15} = 28.3293$
$d_{15} = 0.4948$
$r_{16} = -24.6734$
$d_{16} = 1.2104$  $n_9 = 1.80518$  $\nu_9 = 25.43$
$r_{17} = 8.4053$
$d_{17} = D_3$ (variable)
$r_{18} = 24.2967$ -continued

| | | | |
|---|---|---|---|
| $r_{19} = -36.3424$ | $d_{18} = 2.0000$ | $n_{10} = 1.60311$ | $\nu_{10} = 60.70$ |
| | $d_{19} = 0.1000$ | | |
| $r_{20} = 10.7865$ (aspherical surface) | | | |
| | $d_{20} = 2.000$ | $n_{11} = 1.60311$ | $\nu_{11} = 60.70$ |
| $r_{21} = 70.0000$ | | | |
| | $d_{21} = D_4$ (variable) | | |
| $r_{22} = \infty$ | | | |
| | $d_{22} = 5.1000$ | $n_{12} = 1.54771$ | $\nu_{12} = 62.83$ |
| $r_{23} = \infty$ | | | |
| | $d_{23} = 1.2100$ | | |
| $r_{24} = \infty$ | | | |
| | $d_{24} = 0.6000$ | $n_{13} = 1.48749$ | $\nu_{13} = 70.20$ |
| $r_{25} = \infty$ | | | | aspherical surface coefficient
$A_4 = -0.17524 \times 10^{-3}$, $A_6 = -0.70866 \times 10^{-5}$
$A_8 = -0.23328 \times 10^6$ P = 1

| f | 6.49 | 17.82 | 48.90 |
|---|---|---|---|
| $D_1$ | 1.300 | 10.352 | 16.336 |
| $D_2$ | 16.536 | 7.483 | 1.500 |
| $D_3$ | 5.837 | 3.797 | 7.805 |
| $D_4$ | 3.467 | 5.507 | 1.500 |

$f_1/\{f_T(f_W \cdot f_T)^{\frac{1}{2}}\}^{\frac{1}{2}} = 1.015$, $f_{III}/(f_W \cdot f_T)^{\frac{1}{2}} = 0.387$
$f_{III}/(f_W \cdot f_T)^{\frac{1}{2}} = 1.043$, $f_{IV}/(f_W \cdot f_T)^{\frac{1}{2}} = 0.641$
$HH_{II\,III}/(f_W \cdot f_T)^{\frac{1}{2}} = -0.125$, $H_{III}/(f_W \cdot f_T)^{\frac{1}{2}} = -0.475$
$R_{31}/(N_{31} - 1)(f_W \cdot f_T)^{\frac{1}{2}} = 0.924$
$R_{36}/(N_{33} - 1)(f_W \cdot f_T)^{\frac{1}{2}} = 0.586$
$D_{III\,IV}/(f_W \cdot f_T)^{\frac{1}{2}} = 0.713$, $D_{FT}/f_T^2 = 3.264 \times 10^{-3}$
$(R_{31} + R_{32})/(R_{31} - R_{32}) = -0.564$
$(R_{35} + R_{36})/(R_{35} - R_{36}) = 0.492$, $R_{41}/R_{36} = 2.891$
total length of lens system 62.866
diameter of front lens component 24.7$\phi$ Embodiment 6
f = 6.900~38.800, F/1.45~F/2.23
$2\omega = 49.0° \sim 9.2°$

| | | | |
|---|---|---|---|
| $r_1 = 46.6262$ | | | |
| | $d_1 = 1.1000$ | $n_1 = 1.84666$ | $\nu_1 = 23.78$ |
| $r_2 = 21.8337$ | | | |
| | $d_2 = 4.6000$ | $n_2 = 1.60311$ | $\nu_2 = 60.70$ |
| $r_3 = -53.5341$ | | | |
| | $d_3 = 0.1500$ | | |
| $r_4 = 14.4337$ | | | |
| | $d_4 = 2.9000$ | $n_3 = 1.60311$ | $\nu_3 = 60.70$ |
| $r_5 = 33.8040$ | | | |
| | $d_5 = D_1$ (variable) | | |
| $r_6 = -152.2103$ | | | |
| | $d_6 = 0.9000$ | $n_4 = 1.69680$ | $\nu_4 = 55.52$ |
| $r_7 = 6.5436$ | | | |
| | $d_7 = 2.3000$ | | |
| $r_8 = -9.8267$ | | | |
| | $d_8 = 0.8000$ | $n_5 = 1.60311$ | $\nu_5 = 60.70$ |
| $r_9 = 8.4818$ | | | |
| | $d_9 = 1.9000$ | $n_6 = 1.84666$ | $\nu_6 = 23.78$ |
| $r_{10} = 45.4524$ | | | |
| | $d_{10} = D_2$ (variable) | | |
| $r_{11} = \infty$ (stop) | | | |
| | $d_{11} = 1.7000$ | | |
| $r_{12} = 10.0679$ (aspherical surface) | | | |
| | $d_{12} = 3.6000$ | $n_7 = 1.58913$ | $\nu_7 = 60.97$ |
| $r_{13} = -62.2959$ | | | |
| | $d_{13} = 0.1500$ | | |
| $r_{14} = 8.9432$ | | | |
| | $d_{14} = 4.0000$ | $n_8 = 1.72000$ | $\nu_8 = 50.25$ |
| $r_{15} = -71.7917$ | | | |
| | $d_{15} = 0.1500$ | | |
| $r_{16} = -202.7666$ | | | |
| | $d_{16} = 0.8000$ | $n_9 = 1.80518$ | $\nu_9 = 25.43$ |
| $r_{17} = 5.4043$ | | | |
| | $d_{17} = D_3$ (variable) | | |
| $r_{18} = 7.7606$ (aspherical surface) | | | |
| | $d_{18} = 3.3000$ | $n_{10} = 1.58913$ | $\nu_{10} = 60.97$ |
| $r_{19} = -41.3529$ | | | |
| | $d_{19} = D_4$ (variable) | | |
| $r_{20} = \infty$ | | | |
| | $d_{20} = 6.0000$ | $n_{11} = 1.51633$ | $\nu_{11} = 64.15$ |
| $r_{21} = \infty$ | | | | aspherical surface coefficient
(12th surface)
P = 1.0000, $A_4 = -0.15714 \times 10^{13}$
$A_6 = -0.18163 \times 10^{-5}$, $A_8 = 0.70381 \times 10^{-8}$
(18th surface)
P = 1.0000, $A_4 = -0.22486 \times 10^{-3}$
$A_6 = -0.50608 \times 10^{-5}$, $A_8 = 0.27776 \times 10^{31\,7}$

| f | 6.900 | 16.362 | 38.800 |
|---|---|---|---|
| $D_1$ | 0.900 | 6.827 | 11.236 |
| $D_2$ | 11.636 | 5.708 | 1.300 |
| $D_3$ | 4.465 | 2.700 | 5.987 |
| $D_4$ | 3.521 | 5.287 | 2.000 |

$f_1/\{f_T(f_W \cdot f_T)^{\frac{1}{2}}\}^{\frac{1}{2}} = 0.922$, $f_{III}/(f_W \cdot f_T)^{\frac{1}{2}} = 0.344$
$f_{III}/(f_W \cdot f_T)^{\frac{1}{2}} = 0.864$, $f_{IV}/(f_W \cdot f_T)^{\frac{1}{2}} = 0.695$
$HH_{II\,III}/(f_W \cdot f_T)^{\frac{1}{2}} = -0.0373$, $H_{III}/(f_W \cdot f_T)^{\frac{1}{2}} = -0.395$
$R_{31}/(N_{31} - 1)(f_W \cdot f_T)^{\frac{1}{2}} = 1.044$
$R_{36}/(N_{33} - 1)(f_W \cdot f_T)^{\frac{1}{2}} = 0.410$
$D_{III\,IV}/(f_W \cdot f_T)^{\frac{1}{2}} = 0.733$, $D_{FT}/f_T^2 = 3.977 \times 10^{-3}$
$(R_{31} + R_{32})/(R_{31} - R_{32}) = -0.722$
$(R_{35} + R_{36})/(R_{35} - R_{36}) = 0.948$, $R_{41}/R_{36} = 1.436$
total length of lens system 52.959
diameter of front lens component 21.0$\phi$ Embodiment 7
f = 6.900~38.799, F/1.44~F/2.17
$2\omega = 49.0° \sim 9.2°$

| | | | |
|---|---|---|---|
| $r_1 = 33.6905$ | | | |
| | $d_1 = 1.2000$ | $n_1 = 1.84666$ | $\nu_1 = 23.78$ |
| $r_2 = 20.4286$ | | | |
| | $d_2 = 4.4000$ | $n_2 = 1.60311$ | $\nu_2 = 60.70$ |
| $r_3 = -283.3472$ | | | |
| | $d_3 = 0.1500$ | | |
| $r_4 = 20.9192$ | | | |
| | $d_4 = 3.1000$ | $n_3 = 1.60311$ | $\nu_3 = 60.70$ |
| $r_5 = 70.1720$ | | | |
| | $d_5 = D_1$ (variable) | | |
| $r_6 = 107.1270$ | | | |
| | $d_6 = 0.8000$ | $n_4 = 1.80610$ | $\nu_4 = 40.95$ |
| $r_7 = 5.7148$ | | | |
| | $d_7 = 2.2000$ | | |
| $r_8 = -8.3221$ | | | |
| | $d_8 = 0.7000$ | $n_5 = 1.60738$ | $\nu_5 = 56.81$ |
| $r_9 = 7.8205$ | | | |
| | $d_9 = 2.1000$ | $n_6 = 1.84666$ | $\nu_6 = 23.78$ |
| $r_{10} = -126.6923$ | | | |
| | $d_{10} = D_2$ (variable) | | |
| $r_{11} = \infty$ (stop) | | | |
| | $d_{11} = 1.5000$ | | |
| $r_{12} = 9.2402$ (aspherical surface) | | | |
| | $d_{12} = 3.8000$ | $n_7 = 1.58913$ | $\nu_7 = 60.97$ |
| $r_{13} = -62.7605$ | | | |
| | $d_{13} = 0.1500$ | | |
| $r_{14} = 9.0124$ | | | |
| | $d_{14} = 4.1000$ | $n_8 = 1.58913$ | $\nu_8 = 60.97$ |
| $r_{15} = -69.0295$ | | | |
| | $d_{15} = 0.1500$ | | |
| $r_{16} = 26.1836$ | | | |
| | $d_{16} = 0.8000$ | $n_9 = 1.84666$ | $\nu_9 = 23.78$ |
| $r_{17} = 5.1686$ | | | |
| | $d_{17} = D_3$ (variable) | | |
| $r_{18} = 6.7364$ (aspherical surface) | | | |
| | $d_{18} = 4.0000$ | $n_{10} = 1.48749$ | $\nu_{10} = 70.20$ |
| $r_{19} = -21.1553$ | | | |
| | $d_{19} = D_4$ (variable) | | |
| $r_{20} = \infty$ | | | |
| $r_{21} = \infty$ | $d_{20} = 6.0000$ | $n_{11} = 1.51633$ | $\nu_{11} = 64.15$ | aspherical surface coefficient
(12th surface)
P = 1.0000, $A_4 = -0.25905 \times 10^{-3}$
$A_6 = -0.23436 \times 10^{-5}$, $A_8 = 0.62261 \times 10^{-8}$
(18th surface)
P = 1.0000, $A_4 = -0.39540 \times 10^{-3}$
$A_6 = -0.69335 \times 10^{-5}$, $A_8 = -0.11826 \times 10^{-7}$

| f | 6.900 | 16.362 | 38.799 |
|---|---|---|---|
| $D_1$ | 0.600 | 9.340 | 15.258 |

-continued

| | | |
|---|---|---|
| $D_2$ | 0.329 | 3.958 | 1.000 |
| $D_3$ | 4.044 | 2.500 | 5.508 |
| $D_4$ | 3.464 | 5.008 | 2.000 |

$f_1/\{f_I(f_W \cdot f_T)^{\frac{1}{2}}\} = 1.126$,
$f_{II}/(f_W \cdot f_T)^{\frac{1}{2}} = 0.351$
$f_{III}/(f_W \cdot f_T)^{\frac{1}{2}} = 0.798$,
$f_{IV}/(f_W \cdot f_T)^{\frac{1}{2}} = 0.672$
$HH_{II\,III}/(f_W \cdot f_T)^{\frac{1}{2}} = 0.0118$,
$H_{III}/(f_W \cdot f_T)^{\frac{1}{2}} = -0.351$
$R_{31}/(N_{31} - 1)(f_W \cdot f_T)^{\frac{1}{2}} = 0.959$
$R_{36}/(N_{33} - 1)(f_W \cdot f_T)^{\frac{1}{2}} = 0.373$
$D_{III\,IV}/(f_W \cdot f_T)^{\frac{1}{2}} = 0.794$,
$D_{FT}/f_T^2 = 0.3659 \times 10^{-3}$
$(R_{31} + R_{32})/(R_{31} - R_{32}) = -0.743$
$(R_{35} + R_{36})/(R_{35} - R_{36}) = 1.492$,
$R_{41}/R_{36} = 1.303$
total length of lens system 49.669
diameter of front lens component 21.7$\phi$ Embodiment 8

$f = 6.900 \sim 38.800$, $\quad F/1.44 \sim F/2.04$
$2\omega = 49.0° \sim 9.2°$
$r_1 = 41.7937$
$\quad d_1 = 1.2000 \quad n_1 = 1.84666 \quad \nu_1 = 23.78$
$r_2 = 22.8622$
$\quad d_2 = 4.1000 \quad n_2 = 1.60311 \quad \nu_2 = 60.70$
$r_3 = -118.8556$
$\quad d_3 = 0.2000$
$r_4 = 19.1412$
$\quad d_4 = 3.000 \quad n_3 = 1.60311 \quad \nu_3 = 60.70$
$r_5 = 73.3694$
$\quad d_5 = D_1$ (variable)
$r_6 = 80.3217$
$\quad d_6 = 0.9000 \quad n_4 = 1.69680 \quad \nu_4 = 55.52$
$r_7 = 7.7697$
$\quad d_7 = 2.8000$
$r_8 = -11.2903$
$\quad d_8 = 0.8000 \quad n_5 = 1.60311 \quad \nu_5 = 60.70$
$r_9 = 10.5774$
$\quad d_9 = 2.000 \quad n_6 = 1.84666 \quad \nu_6 = 23.78$
$r_{10} = 37.1339$
$\quad d_{10} = D_2$ (variable)
$r_{11} = \infty$ (stop)
$\quad d_{11} = 1.7000$
$r_{12} = 7.9500$
$\quad d_{12} = 4.6000 \quad n_7 = 1.69680 \quad \nu_7 = 55.52$
$r_{13} = -30.1367$
$\quad d_{13} = 0.2000$
$r_{14} = 29.2800$
$\quad d_{14} = 3.7303 \quad n_8 = 1.84666 \quad \nu_8 = 23.78$
$r_{15} = 6.0792$
$\quad d_{15} = D_3$ (variable)
$r_{16} = 7.5823$ (aspherical surface)
$\quad d_{16} = 3.1000 \quad n_9 = 1.60311 \quad \nu_9 = 60.70$
$r_{17} = -32.4893$
$\quad d_{17} = D_4$ (variable)
$r_{18} = \infty$
$\quad d_{18} = 6.0000 \quad n_{10} = 1.51633 \quad \nu_{10} = 64.15$
$r_{19} = \infty$ aspherical surface coefficient
(12th surface)
$P = 1.0000, A_4 = -0.25835 \times 10^{-3}$
$A_6 = -0.30075 \times 10^{-5}, A_8 = -0.32127 \times 10^{-7}$
(16th surface)
$P = 1.0000, A_4 = -0.36853 \times 10^{-3}$
$A_6 = 0.74935 \times 10^{-5}, A_8 = -0.52612 \times 10^{-6}$

| f | 6.900 | 16.362 | 38.800 |
|---|---|---|---|
| $D_1$ | 0.600 | 7.480 | 12.823 |
| $D_2$ | 13.523 | 6.644 | 1.300 |
| $D_3$ | 3.589 | 2.200 | 5.481 |
| $D_4$ | 3.892 | 5.281 | 2.000 |

$f_1/\{f_T(f_W \cdot f_T)^{\frac{1}{2}}\} = 1.054$,
$f_{II}/(f_W \cdot f_T)^{\frac{1}{2}} = 0.412$
$f_{III}/(f_W \cdot f_T)^{\frac{1}{2}} = 1.034$,
$f_{IV}/(f_W \cdot f_T)^{\frac{1}{2}} = 0.642$
$HH_{II\,III}/(f_W \cdot f_T)^{\frac{1}{2}} = -0.1580$,
$H_{III}/(f_W \cdot f_T)^{\frac{1}{2}} = -0.514$
$R_{31}/(N_{31} - 1)(f_W \cdot f_T)^{\frac{1}{2}} = 0.697$
$R_{36}/(N_{33} - 1)(f_W \cdot f_T)^{\frac{1}{2}} = 0.439$
$D_{III\,IV}/(f_W \cdot f_T)^{\frac{1}{2}} = 0.711$,
$D_{FT}/f_T^2 = 3.641 \times 10^{-3}$
$(R_{31} + R_{32})/(R_{31} - R_{32}) = -0.583$
$(R_{35} + R_{36})/(R_{35} - R_{36}) = 1.524$,
$R_{41}/R_{36} = 1.247$
total length of lens system 54.023
diameter of front lens component 21.5$\phi$ Embodiment 9

$f = 6.900 \sim 38.800$, $\quad F/2.06 \sim F/2.05$
$2\omega = 49.0° \sim 9.2°$
$r_1 = 49.0000$
$\quad d_1 = 1.2000 \quad n_1 = 1.84666 \quad \nu_1 = 23.78$
$r_2 = 24.6210$
$\quad d_2 = 4.1000 \quad n_2 = 1.60311 \quad \nu_2 = 60.70$
$r_3 = -87.7864$
$\quad d_3 = 0.2000$
$r_4 = 17.6736$
$\quad d_4 = 3.2000 \quad n_3 = 1.60311 \quad \nu_3 = 60.70$
$r_5 = 58.6771$
$\quad d_5 = D_1$ (variable)
$r_6 = 151.1492$
$\quad d_6 = 0.9000 \quad n_4 = 1.69680 \quad \nu_4 = 55.52$
$r_7 = 7.1029$
$\quad d_7 = 2.6500$
$r_8 = -11.0922$
$\quad d_8 = 0.8000 \quad n_5 = 1.60311 \quad \nu_5 = 60.70$
$r_9 = 10.2657$
$\quad d_9 = 1.8000 \quad n_6 = 1.84666 \quad \nu_6 = 23.78$
$r_{10} = 94.4742$
$\quad d_{10} = D_2$ (variable)
$r_{11} = \infty$ (stop)
$\quad d_{11} = 1.7000$
$r_{12} = 6.3725$ (aspherical surface)
$\quad d_{12} = 3.1500 \quad n_7 = 1.69680 \quad \nu_7 = 55.52$
$r_{13} = -50.1345$
$\quad d_{13} = 0.1500$
$r_{14} = 27.7421$
$\quad d_{14} = 2.7421 \quad n_8 = 1.84666 \quad \nu_8 = 23.78$
$r_{15} = 5.0177$
$\quad d_{15} = D$ (variable)
$r_{16} = 7.8414$
$\quad d_{16} = 3.4000 \quad n_9 = 1.60311 \quad \nu_9 = 60.70$
(aspherical surface)
$r_{17} = -22.6625$
$\quad d_{17} = D_4$ (variable)
$r_{18} = \infty$
$\quad d_{18} = 6.0000 \quad n_{10} = 1.51633 \quad \nu_{10} = 64.15$
$r_{19} = \infty$ aspherical surface coefficient
(12th surface)
$P = 1.0000, A_4 = -0.36365 \times 10^{-3}$
$A_6 = -0.66028 \times 10^{-5}, A_8 = -0.14291 \times 10^{-6}$
(16th surface)
$P = 1.0000, A_4 = -0.27343 \times 10^{-3}$
$A_6 = -0.85428 \times 10^{-5}, A_8 = 0.23185 \times 10^{-6}$

| f | 6.900 | 16.362 | 38.800 |
|---|---|---|---|
| $D_1$ | 0.700 | 7.606 | 13.000 |
| $D_2$ | 13.600 | 6.694 | 1.300 |
| $D_3$ | 3.885 | 2.800 | 6.580 |
| $D_4$ | 4.696 | 5.780 | 2.000 |

$f_1/\{f_T(f_W \cdot f_T)^{\frac{1}{2}}\} = 1.039$,
$f_{II}/(f_W \cdot f_T)^{\frac{1}{2}} = 0.429$
$f_{III}/(f_W \cdot f_T)^{\frac{1}{2}} = 1.255$,
$f_{IV}/(f_W \cdot f_T)^{\frac{1}{2}} = 0.616$
$HH_{II\,III}/(f_W \cdot f_T)^{\frac{1}{2}} = -0.2257$,
$H_{III}/(f_W \cdot f_T)^{\frac{1}{2}} = -0.603$
$R_{31}/(N_{31} - 1)(f_W \cdot f_T)^{\frac{1}{2}} = 0.559$
$R_{36}/(N_{33} - 1)(f_W \cdot f_T)^{\frac{1}{2}} = 0.362$
$D_{III\,IV}/(f_W \cdot f_T)^{\frac{1}{2}} = 0.577$,
$D_{FT}/f_T^2 = 4.371 \times 10^{-3}$
$(R_{31} + R_{32})/(R_{31} - R_{32}) = -0.774$
$(R_{35} + R_{36})/(R_{35} - R_{36}) = 1.438$,
$R_{41}/R_{36} = 1.563$
total length of lens system 52.959
diameter of front lens component 21.4$\phi$ Embodiment 10

-continued $f = 6.900 \sim 38.800,$  $F/1.41 \sim F/1.99$
$2\omega = 49.0° \sim 9.2°$
$r_1 = 43.0767$
$\quad d_1 = 1.2000 \quad n_1 = 1.80518 \quad \nu_1 = 25.43$
$r_2 = 19.5560$
$\quad d_2 = 4.2000 \quad n_2 = 1.60311 \quad \nu_2 = 60.70$
$r_3 = -600.3543$
$\quad d_3 = 0.1500$
$r_4 = 20.8028$
$\quad d_4 = 3.3000 \quad n_3 = 1.65844 \quad \nu_3 = 50.86$
$r_5 = 127.7478$
$\quad d_5 = D_1$
$\quad$ (variable)
$r_6 = 40.8164$
$\quad d_6 = 0.8000 \quad n_4 = 1.69680 \quad \nu_4 = 55.52$
$r_7 = 6.1997$
$\quad d_7 = 2.3000$
$r_8 = -8.3248$
$\quad d_8 = 0.7000 \quad n_5 = 1.60311 \quad \nu_5 = 60.70$
$r_9 = 8.9835$
$\quad d_9 = 2.0000 \quad n_6 = 1.84666 \quad \nu_6 = 23.78$
$r_{10} = 86.3663$
$\quad d_{10} = D_2$
$\quad$ (variable)
$r_{11} = \infty$ (stop)
$\quad d_{11} = 1.5000$
$r_{12} = 8.2684$
$\quad d_{12} = 4.6000 \quad n_7 \leqq 1.58913 \quad \nu_7 = 60.97$
$r_{13} = -15.6514$
$\quad d_{13} = 0.1500$
$r_{14} = 54.7313$
$\quad d_{14} = 5.0896 \quad n_8 = 1.84666 \quad \nu_8 = 23.78$
$r_{15} = 7.8285$
$\quad d_{15} = D_3$
$\quad$ (variable)
$r_{16} = 7.0945$
(aspherical surface)
$\quad d_{16} = 4.0000 \quad n_9 = 1.48749 \quad \nu_9 = 70.20$
$r_{17} = -11.6664$
$\quad d_{17} = D_4$
$\quad$ (variable)
$r_{18} = \infty$
$\quad d_{18} = 6.0000 \quad n_{10} = 1.51633 \quad \nu_{10} = 64.15$
$r_{19} = \infty$
Aspherical surface coefficient
(12th surface)
$P = 1.0000, A_4 = -0.40016 \times 10^{-3}$
$A_6 = -0.17286 \times 10^{-5}, A_8 = -0.37067 \times 10^{-7}$
(16th surface)
$P = 1.0000, A_4 = -0.69721 \times 10^{-3}$
$A_6 = -0.33798 \times 10^{-5}, A_8 = -0.37651 \times 10^{-6}$

| f | 6.900 | 16.362 | 38.800 |
|---|---|---|---|
| $D_1$ | 0.600 | 9.406 | 15.230 |
| $D_2$ | 8.315 | 3.911 | 1.000 |
| $D_3$ | 3.459 | 2.500 | 5.959 |
| $D_4$ | 4.501 | 5.459 | 2.000 |

$f_1/\{f_7(f_W \cdot f_T)^{\frac{1}{2}}\}^{\frac{1}{2}} = 1.121,$
$f_{II}/(f_W \cdot f_T)^{\frac{1}{2}} = 0.378$
$f_{III}/(f_W \cdot f_T)^{\frac{1}{2}} = 0.975,$
$f_{IV}/(f_W \cdot f_T)^{\frac{1}{2}} = 0.595$
$HH_{II\,III}/(f_W \cdot f_T)^{\frac{1}{2}} = -0.0901,$
$H_{III}/(f_W \cdot f_T)^{\frac{1}{2}} = -0.413$
$R_{31}/(N_{31} - 1)(f_W \cdot f_T)^{\frac{1}{2}} = 0.858$
$R_{36}/(N_{33} - 1)(f_W \cdot f_T)^{\frac{1}{2}} = 0.565$
$D_{III\,IV}/(f_W \cdot f_T)^{\frac{1}{2}} = 0.846,$
$D_{FT}f_T^2 = 3.958 \times 10^{-3}$
$(R_{31} + R_{32})/(R_{31} - R_{32}) = -0.309$
$(R_{35} + R_{36})/(R_{35} - R_{36}) = 1.334,$
$R_{41}/R_{36} = 0.906$
total length of lens system 50.953
diameter of front lens component 21.0$\phi$ Embodiment 11

$f = 6.700 \sim 50.440,$  $F/1.44 \sim F/2.11$
$2\omega = 50.4° \sim 7.2°$
$r_1 = 53.9356$
$\quad d_1 = 1.5000 \quad n_1 = 1.84666 \quad \nu_1 = 23.78$
$r_2 = 28.6454$
$\quad d_2 = 4.8000 \quad n_2 = 1.56873 \quad \nu_2 = 63.16$
$r_3 = -103.6510$
$\quad d_3 = 0.1500$
$r_4 = 20.9530$
$\quad d_4 = 3.4500 \quad n_3 = 1.60311 \quad \nu_3 = 60.70$
$r_5 = 55.3350$
$\quad d_5 = D_1$
$\quad$ (variable)
$r_6 = 35.1277$
$\quad d_6 = 1.1000 \quad n_4 = 1.69680 \quad \nu_4 = 55.52$
$r_7 = 7.6963$
$\quad d_7 = 2.9000$
$r_8 = -9.8110$
$\quad d_8 = 1.0000 \quad n_5 = 1.60311 \quad \nu_5 = 60.70$
$r_9 = 12.3932$
$\quad d_9 = 2.0000 \quad n_6 = 1.84666 \quad \nu_6 = 23.78$
$r_{10} = 99.8484$
$\quad d_{10} = D_2$
$\quad$ (variable)
$r_{11} = \infty$ (stop)
$\quad d_{11} = 1.5000$
$r_{12} = 13.9316$
(aspherical surface)
$\quad d_{12} = 3.5000 \quad n_7 = 1.69680 \quad \nu_7 = 55.52$
$r_{13} = -51.9617$
$\quad d_{13} = 0.2000$
$r_{14} = 11.2530$
$\quad d_{14} = 2.5000 \quad n_8 = 1.60311 \quad \nu_8 = 60.70$
$r_{15} = 30.6895$
$\quad d_{15} = 0.6200$
$r_{16} = -192.3609$
$\quad d_{16} = 1.2100 \quad n_9 = 1.84666 \quad \nu_9 = 23.78$
$r_{17} = 11.1804$
$\quad d_{17} = D_3$
$\quad$ (variable)
$r_{18} = 12.3060$
(aspherical surface)
$\quad d_{18} = 3.3000 \quad n_{10} = 1.56873 \quad \nu_{10} = 63.16$
$r_{19} = -20.0283$
$\quad d_{19} = D_4$
$\quad$ (variable)
$r_{20} = \infty$
$\quad d_{20} = 1.0000 \quad n_{11} = 1.51633 \quad \nu_{11} = 64.15$
$r_{21} = \infty$
$\quad d_{21} = 0.7000$
$r_{22} = \infty$
$\quad d_{22} = 5.8600 \quad n_{12} = 1.54771 \quad \nu_{12} = 62.83$
$r_{23} = \infty$
$\quad d_{23} = 1.2100$
$r_{24} = \infty$
$\quad d_{24} = 0.6000 \quad n_{13} = 1.48749 \quad \nu_{13} = 70.20$
$r_{25} = \infty$
aspherical surface coefficient
(12th surface)
$P = 0.5388, A_4 = -0.10978 \times 10^{-4}$
$A_6 = -0.48118 \times 10^{-7}$
(18th surface)
$P = 0.6118, A_4 = -0.22709 \times 10^{-3}$
$A_6 = 0.40034 \times 10^{-7}$

| f | 6.700 | 18.383 | 50.440 |
|---|---|---|---|
| $D_1$ | 0.700 | 10.815 | 18.075 |
| $D_2$ | 18.875 | 8.760 | 1.500 |
| $D_3$ | 4.812 | 2.591 | 6.626 |
| $D_4$ | 3.503 | 5.724 | 1.690 |

$f_1/\{f_7(f_W \cdot f_T)^{\frac{1}{2}}\}^{\frac{1}{2}} = 1.108,$
$f_{II}/(f_W \cdot f_T)^{\frac{1}{2}} = 0.420$
$f_{III}/(f_W \cdot f_T)^{\frac{1}{2}} = 1.144,$
$f_{IV}/(f_W \cdot f_T)^{\frac{1}{2}} = 0.757$
$HH_{II\,III}/(f_W \cdot f_T)^{\frac{1}{2}} = -0.0114,$
$H_{III}/(f_W \cdot f_T)^{\frac{1}{2}} = -0.345$
$R_{31}/(N_{31} - 1)(f_W \cdot f_T)^{\frac{1}{2}} = 1.088$
$R_{36}/(N_{33} - 1)(f_W \cdot f_T)^{\frac{1}{2}} = 0.718$
$D_{III\,IV}/(f_W \cdot f_T)^{\frac{1}{2}} = 0.616,$
$D_{FT}f_T^2 = 4.371 \times 10^{-3}$
$(R_{31} + R_{32})/(R_{31} - R_{32}) = -0.577$
$(R_{35} + R_{36})/(R_{35} - R_{36}) = 0.890,$
$R_{41}/R_{36} = 1.101$
total length of lens system 64.957
diameter of front lens component 24.3$\phi$ Embodiment 12

$f = 6.700 \sim 50.440,$  $F/1.43 \sim F/2.26$
$2\omega = 50.4° \sim 7.2°$
$r_1 = 48.9885$
$\quad d_1 = 1.5000 \quad n_1 = 1.84666 \quad \nu_1 = 23.78$
$r_2 = 24.8892$
$\quad d_2 = 4.5000 \quad n_2 = 1.60311 \quad \nu_2 = 60.70$
$r_3 = -377.4066$ -continued

| | $d_3 = 0.1500$ | | |
|---|---|---|---|
| $r_4 = 23.4540$ | $d_4 = 3.4000$ | $n_3 = 1.63854$ | $\nu_3 = 55.38$ |
| $r_5 = 100.3216$ | $d_5 = D_1$ (variable) | | |
| $r_6 = 104.0635$ | $d_6 = 1.1000$ | $n_4 = 1.69680$ | $\nu_4 = 55.52$ |
| $r_7 = 7.2555$ | $d_7 = 2.6000$ | | |
| $r_8 = -9.8423$ | $d_8 = 1.0000$ | $n_5 = 1.60311$ | $\nu_5 = 60.70$ |
| $r_9 = 10.3952$ | $d_9 = 2.0000$ | $n_6 = 1.84666$ | $\nu_6 = 23.78$ |
| $r_{10} = 95.3109$ | $d_{10} = D_2$ (variable) | | |
| $r_{11} = \infty$ (stop) | $d_{11} = 1.5000$ | | |
| $r_{12} = 11.7960$ (aspherical surface) | | | |
| | $d_{12} = 4.0000$ | $n_7 = 1.60311$ | $\nu_7 = 60.70$ |
| $r_{13} = -33.4377$ | $d_{13} = 0.2000$ | | |
| $r_{14} = 11.0871$ | $d_{14} = 2.6500$ | $n_8 = 1.56873$ | $\nu_8 = 63.16$ |
| $r_{15} = 33.0044$ | $d_{15} = 0.3500$ | | |
| $r_{16} = 106.7443$ | $d_{16} = 0.9000$ | $n_9 = 1.84666$ | $\nu_9 = 23.78$ |
| $r_{17} = 10.3881$ | $d_{17} = D_3$ (variable) | | |
| $r_{18} = 13.2932$ | $d_{18} = 3.1000$ | $n_{10} = 1.56873$ | $\nu_{10} = 63.16$ |
| $r_{19} = -19.6489$ | $d_{19} = D_4$ (variable) | | |
| $r_{20} = \infty$ | $d_{20} = 1.0000$ | $n_{11} = 1.51633$ | $\nu_{11} = 64.15$ |
| $r_{21} = \infty$ | $d_{21} = 0.7000$ | | |
| $r_{22} = \infty$ | $d_{22} = 5.8600$ | $n_{12} = 1.54771$ | $\nu_{12} = 62.83$ |
| $r_{23} = \infty$ | $d_{23} = 1.2100$ | | |
| $r_{24} = \infty$ | $d_{24} = 0.6000$ | $n_{13} = 1.48749$ | $\nu_{13} = 70.20$ |
| $r_{25} = \infty$ | | | | aspherical surface coefficient
(12th surface)
$P = 1.000$, $A_4 = -0.10430 \times 10^{-3}$
$A_6 = -0.49710 \times 10^{-6}$, $A_8 = 0.20608 \times 10^{-8}$
(18th surface)
$P = 1.0000$, $A_4 = -0.20376 \times 10^{-3}$
$A_6 = -0.22521 \times 10^{-5}$, $A_8 = 0.29150 \times 10^{-7}$

| f | 6.700 | 18.383 | 50.440 |
|---|---|---|---|
| $D_1$ | 0.800 | 11.933 | 19.316 |
| $D_2$ | 13.844 | 6.422 | 1.500 |
| $D_3$ | 4.760 | 2.510 | 6.762 |
| $D_4$ | 3.608 | 5.858 | 1.606 |

$f_I/\{f_T(f_W \cdot f_T)^{\frac{1}{2}}\}^{\frac{1}{2}} = 1.104$,
$f_{II}/(f_W \cdot f_T)^{\frac{1}{2}} = 0.372$
$f_{III}/(f_W \cdot f_T)^{\frac{1}{2}} = 0.960$,
$f_{IV}/(f_W \cdot f_T)^{\frac{1}{2}} = 0.785$
$HH_{II\,III}/(f_W \cdot f_T)^{\frac{1}{2}} = -0.1059$,
$H_{III}/(f_W \cdot f_T)^{\frac{1}{2}} = -0.234$
$R_{31}/(N_{31} - 1)(f_W \cdot f_T)^{\frac{1}{2}} = 1.064$
$R_{36}/(N_{33} - 1)(f_W \cdot f_T)^{\frac{1}{2}} = 0.667$
$D_{III\,IV}/(f_W \cdot f_T)^{\frac{1}{2}} = 0.609$,
$D_F/f_T^2 = 4.371 \times 10^{-3}$
$(R_{31} + R_{32})/(R_{31} - R_{32}) = -0.478$
$(R_{35} + R_{36})/(R_{35} - R_{36}) = 1.216$,
$R_{41}/R_{36} = 1.280$
total length of lens system 59.299
diameter of front lens component 24.6$\phi$ Embodiment 13

$f = 6.700 \sim 50.440$, $F/1.45 \sim F/2.29$
$2\omega = 50.4° \sim 7.2°$
$r_1 = 55.4246$

| | $d_1 = 1.4000$ | $n_1 = 1.84666$ | $\nu_1 = 23.78$ |
|---|---|---|---|
| $r_2 = 27.2103$ | | | |
| | $d_2 = 5.2000$ | $n_2 = 1.56873$ | $\nu_2 = 63.16$ |
| $r_3 = -87.4611$ | $d_3 = 0.1500$ | | |
| $r_4 = 20.1075$ | $d_4 = 3.3000$ | $n_3 = 1.60311$ | $\nu_3 = 60.70$ |
| $r_5 = 55.4501$ | $d_5 = D_1$ (variable) | | |
| $r_6 = 46.3576$ | $d_6 = 0.9000$ | $n_4 = 1.60311$ | $\nu_4 = 60.70$ |
| $r_7 = 7.6705$ | $d_7 = 3.3000$ | | |
| $r_8 = -10.4549$ | $d_8 = 0.9000$ | $n_5 = 1.60311$ | $\nu_5 = 60.70$ |
| $r_9 = 9.6357$ | $d_9 = 2.4000$ | $n_6 = 1.80518$ | $\nu_6 = 25.43$ |
| $r_{10} = 44.8278$ | $d_{10} = D_2$ (variable) | | |
| $r_{11} = \infty$ (stop) | $d_{11} = 1.500$ | | |
| $r_{12} = 10.5254$ | $d_{12} = 5.5403$ | $n_7$ (graded refractive index lens 1) | |
| $r_{13} = -122.1190$ | $d_{13} = 0.200$ | | |
| $r_{14} = 57.2174$ | $d_{14} = 1.2363$ | $n_8$ (graded refractive index lens 2) | |
| $r_{15} = 10.9471$ | $d_{15} = D_3$ (variable) | | |
| $r_{16} = 16.3464$ | $d_{16} = 3.6384$ | $n_9$ (graded refractive index lens 3) | |
| $r_{17} = -38.6328$ | $d_{17} = D_4$ (variable) | | |
| $r_{18} = \infty$ | $d_{18} = 5.8600$ | $n_{10} = 1.54771$ | $\nu_{10} = 62.83$ |
| $r_{19} = \infty$ | $d_{19} = 1.2100$ | | |
| $r_{20} = \infty$ | $d_{20} = 0.6000$ | $n_{11} = 1.48749$ | $\nu_{11} = 70.20$ |
| $r_1 = \infty$ | | | | graded refractive index lens 1

| wave length | $N_0$ | $N_1$ |
|---|---|---|
| 587.56 | 1.60311 | $-0.96088 \times 10^{-3}$ |
| 656.28 | 1.60008 | $-0.86366 \times 10^{-3}$ |
| 486.13 | 1.61002 | $-0.86201 \times 10^{-3}$ |
| wave length | $N_2$ | |
| 587.56 | $0.13611 \times 10^{-4}$ | |
| 656.28 | $0.15883 \times 10^{-4}$ | |
| 486.13 | $0.17095 \times 10^{-4}$ | | graded refractive index lens 2

| wave length | $N_0$ | $N_1$ |
|---|---|---|
| 587.56 | 1.68893 | $-0.44201 \times 10^{-2}$ |
| 656.28 | 1.68248 | $-0.51824 \times 10^{-2}$ |
| 486.13 | 1.70465 | $-0.52764 \times 10^{-2}$ |
| wave length | $N_2$ | |
| 587.56 | $0.62536 \times 10^{-4}$ | |
| 656.28 | $0.73930 \times 10^{-4}$ | |
| 486.13 | $0.77591 \times 10^{-4}$ | | graded refractive index lens 3

| wave length | $N_0$ | $N_1$ |
|---|---|---|
| 587.56 | 1.60311 | $-0.18390 \times 10^{-2}$ |
| 656.28 | 1.60008 | $-0.17437 \times 10^{-2}$ |
| 486.13 | 1.61002 | $-0.16776 \times 10^{-2}$ |
| wave length | $N_2$ | |
| 587.56 | $-0.19369 \times 10^{-5}$ | |
| 656.28 | $-0.29650 \times 10^{-5}$ | |
| 486.13 | $-0.55626 \times 10^{-5}$ | |

| f | 6.700 | 18.383 | 50.440 |
|---|---|---|---|
| $D_1$ | 0.700 | 10.328 | 17.277 |
| $D_2$ | 18.077 | 8.449 | 1.500 |
| $D_3$ | 4.538 | 2.475 | 7.063 |
| $D_4$ | 4.787 | 6.849 | 2.262 |

$f_I/\{f_T(f_W \cdot f_T)^{\frac{1}{2}}\}^{\frac{1}{2}} = 1.061$,
$f_{II}/(f_W \cdot f_T)^{\frac{1}{2}} = 0.408$
$f_{III}/(f_W \cdot f_T)^{\frac{1}{2}} = 1.252$,
$f_{IV}/(f_W \cdot f_T)^{\frac{1}{2}} = 0.854$
$HH_{II\,III}/(f_W \cdot f_T)^{\frac{1}{2}} = -0.1524$, -continued $H_{III}/(f_W \cdot f_T)^{\frac{1}{2}} = -0.185$
$R_{31}/(N_{31} - 1)(f_W \cdot f_T)^{\frac{1}{2}} = 0.949$
$R_{36}/(N_{33} - 1)(f_W \cdot f_T)^{\frac{1}{2}} = 0.864$
$D_{III\,IV}/(f_W \cdot f_T)^{\frac{1}{2}} = 0.579$,
$D_F f_T^2 = 2.776 \times 10^{-3}$
$(R_{31} + R_{32})/(R_{31} - R_{32}) = -0.841$
$(R_{35} + R_{36})/(R_{35} - R_{36}) = 1.473$,
$R_{41}/R_{36} = 1.493$
total length of lens system 64.965
diameter of front lens component 25.5φ

Embodiment 14

$f = 6.700 \sim 50.440$,   $F/1.45 \sim F/2.30$
$2\omega = 50.4° \sim 7.2°$

| | | | |
|---|---|---|---|
| $r_1 = 56.9259$ | | | |
| | $d_1 = 1.4000$ | $n_1 = 1.84666$ | $\nu_1 = 23.78$ |
| $r_2 = 27.5385$ | | | |
| | $d_2 = 5.1000$ | $n_2 = 1.56873$ | $\nu_2 = 63.16$ |
| $r_3 = -87.4998$ | | | |
| | $d_3 = 0.1500$ | | |
| $r_4 = 20.8150$ | | | |
| | $d_4 = 3.3000$ | $n_3 = 1.60311$ | $\nu_3 = 60.70$ |
| $r_5 = 63.8668$ | | | |
| | $d_5 = D_1$ (variable) | | |
| $r_6 = 91.6022$ | | | |
| | $d_6 = 0.9000$ | $n_4 = 1.60311$ | $\nu_4 = 60.70$ |
| $r_7 = 7.8421$ | | | |
| | $d_7 = 3.2000$ | | |
| $r_8 = -10.9528$ | | | |
| | $d_8 = 0.8000$ | $n_5 = 1.60311$ | $\nu_5 = 60.70$ |
| $r_9 = 9.7328$ | | | |
| | $d_9 = 2.4000$ | $n_6 = 1.80518$ | $\nu_6 = 25.43$ |
| $r_{10} = 57.9526$ | | | |
| | $d_{10} = D_2$ (variable) | | |
| $r_{11} = \infty$ (stop) | | | |
| | $d_{11} = 1.5000$ | $n_7$ (graded refractive index lens) | |
| $r_{12} = 10.6401$ | | | |
| | $d_{12} = 7.2176$ | | |
| $r_{13} = -34.2560$ | | | |
| | $d_{13} = 0.2000$ | | |
| $r_{14} = -866.5188$ | | | |
| | $d_{14} = 0.9000$ | $n_8 = 1.84666$ | $\nu_8 = 23.78$ |
| $r_{15} = 12.4001$ | | | |
| | $d_{15} = D_3$ (variable) | | |
| $r_{16} = 11.5959$ (aspherical surface) | | | |
| | $d_{16} = 4.0000$ | $n_9 = 1.48749$ | $\nu_9 = 70.20$ |
| $r_{17} = -18.0077$ | | | |
| | $d_{17} = D_4$ (variable) | | |
| $r_{18} = \infty$ | | | |
| | $d_{18} = 5.8600$ | $n_{10} = 1.5477$ | $\nu_{10} = 62.83$ |
| $r_{19} = \infty$ | | | |
| | $d_{19} = 1.2100$ | | |
| $r_{20} = \infty$ | | | |
| | $d_{20} = 0.6000$ | $n_{11} = 1.48749$ | $\nu_{11} = 70.20$ |
| $r_{21} = \infty$ | | | | aspherical surface coefficient
$P = 1.0000$, $A_4 = -0.19046 \times 10^{-3}$
$A_6 = -0.61255 \times 10^{-5}$, $A_8 = 0.85120 \times 10^{-7}$ graded refractive index lens

| wave length | $N_0$ | $N_1$ |
|---|---|---|
| 587.56 | 1.60311 | $-0.18280 \times 10^{-2}$ |
| 656.28 | 1.60008 | $-0.18174 \times 10^{-2}$ |
| 486.13 | 1.61002 | $-0.18543 \times 10^{-2}$ |

| wave length | $N_2$ |
|---|---|
| 587.56 | $-0.14795 \times 10^{-5}$ |
| 656.28 | $-0.16875 \times 10^{-5}$ |
| 486.13 | $-0.13249 \times 10^{-5}$ |

| f | 6.700 | 18.383 | 50.440 |
|---|---|---|---|
| $D_1$ | 0.700 | 10.587 | 17.422 |
| $D_2$ | 18.222 | 8.335 | 1.500 |
| $D_3$ | 4.424 | 2.405 | 7.032 |
| $D_4$ | 4.870 | 6.889 | 2.262 |

$f_1/\{f_T(f_W \cdot f_T)^{\frac{1}{2}}\} = 1.061$,
$f_{II}/(f_W \cdot f_T)^{\frac{1}{2}} = 0.417$
$f_{III}/(f_W \cdot f_T)^{\frac{1}{2}} = 1.138$,
$f_{IV}/(f_W \cdot f_T)^{\frac{1}{2}} = 0.824$
$HH_{II\,III}/(f_W \cdot f_T)^{\frac{1}{2}} = -0.1060$,
$H_{III}/(f_W \cdot f_T)^{\frac{1}{2}} = -0.239$ -continued $R_{31}/(N_{31} - 1)(f_W \cdot f_T)^{\frac{1}{2}} = 0.960$
$R_{36}/(N_{33} - 1)(f_W \cdot f_T)^{\frac{1}{2}} = 0.797$
$D_{III\,IV}/(f_W \cdot f_T)^{\frac{1}{2}} = 0.670$,
$D_F f_T^2 = 4.371 \times 10^{-3}$
$(R_{31} + R_{32})/(R_{31} - R_{32}) = -0.526$
$(R_{35} + R_{36})/(R_{35} - R_{36}) = 0.972$,
$R_{41}/R_{36} = 0.935$
total length of lens system 64.956
diameter of front lens component 25.0φ

Embodiment 15

$f = 6.700 \sim 50.44$,   $F/1.44 \sim F/2.11$
$2\omega = 50.4° \sim 7.2°$

| | | | |
|---|---|---|---|
| $r_1 = 55.1109$ | | | |
| | $d_1 = 1.3000$ | $n_1 = 1.84666$ | $\nu_1 = 23.78$ |
| $r_2 = 28.8970$ | | | |
| | $d_2 = 4.8000$ | $n_2 = 1.56873$ | $\nu_2 = 63.16$ |
| $r_3 = -92.8429$ | | | |
| | $d_3 = 0.1500$ | | |
| $r_4 = 20.7944$ | | | |
| | $d_4 = 3.4500$ | $n_3 = 1.60311$ | $\nu_3 = 60.70$ |
| $r_5 = 51.7240$ | | | |
| | $d_5 = D_1$ (variable) | | |
| $r_6 = 100.5677$ | | | |
| | $d_6 = 0.9000$ | $n_4 = 1.72000$ | $\nu_4 = 50.25$ |
| $r_7 = 9.0549$ | | | |
| | $d_7 = 3.2000$ | | |
| $r_8 = -11.5198$ | | | |
| | $d_8 = 0.8000$ | $n_5 = 1.60311$ | $\nu_5 = 60.70$ |
| $r_9 = 12.5374$ | | | |
| | $d_9 = 2.0000$ | $n_6 = 1.84666$ | $\nu_6 = 23.78$ |
| $r_{10} = 73.5525$ | | | |
| | $d_{10} = D_2$ (variable) | | |
| $r_{11} = 14.7025$ (aspherical surface) | | | |
| | $d_{11} = 3.3000$ | $n_7 = 1.69680$ | $\nu_7 = 55.52$ |
| $r_{12} = -55.8822$ | | | |
| | $d_{12} = 1.0000$ | | |
| $r_{13} = \infty$ (stop) | | | |
| | $d_{13} = 1.5000$ | | |
| $r_{14} = 9.4162$ | | | |
| | $d_{14} = 2.6000$ | $n_8 = 1.69680$ | $\nu_8 = 55.52$ |
| $r_{15} = 30.8448$ | | | |
| | $d_{15} = 0.7000$ | | |
| $r_{16} = -32.9050$ | | | |
| | $d_{16} = 0.8000$ | $n_9 = 1.84666$ | $\nu_9 = 23.78$ |
| $r_{17} = 10.4169$ | | | |
| | $d_{17} = D_3$ (variable) | | |
| $r_{18} = 10.1889$ (aspherical surface) | | | |
| | $d_{18} = 3.6000$ | $n_{10} = 1.56873$ | $\nu_{10} = 63.16$ |
| $r_{19} = -14.9311$ | | | |
| | $d_{19} = D_4$ (variable) | | |
| $r_{20} = \infty$ | | | |
| | $d_{20} = 1.0000$ | $n_{11} = 1.51633$ | $\nu_{11} = 64.15$ |
| $r_{21} = \infty$ | | | |
| | $d_{21} = 5.8600$ | $n_{12} = 1.54771$ | $\nu_{12} = 62.83$ |
| $r_{22} = \infty$ | | | |
| | $d_{22} = 1.2100$ | | |
| $r_{23} = \infty$ | | | |
| | $d_{23} = 0.6000$ | $n_{13} = 1.48749$ | $\nu_{13} = 70.20$ |
| $r_{24} = \infty$ | | | | aspherical surface coefficient
(11th surface)
$P = 1.0000$, $A_4 = 0.18511 \times 10^{-4}$
$A_6 = -0.10252 \times 10^{-5}$, $A_8 = 0.13963 \times 10^{-7}$
(18th surface)
$P = 1.0000$, $A_4 = -0.37628 \times 10^{-3}$
$A_6 = 0.47003 \times 10^{-6}$, $A_8 = -0.24529 \times 10^{-7}$

| f | 6.700 | 18.383 | 50.44 |
|---|---|---|---|
| $D_1$ | 0.700 | 10.890 | 18.161 |
| $D_2$ | 18.161 | 7.971 | 0.700 |
| $D_3$ | 4.709 | 2.563 | 6.507 |
| $D_4$ | 2.718 | 4.864 | 0.920 |

$f_1/\{f_T(f_W \cdot f_T)^{\frac{1}{2}}\} = 1.109$,
$f_{II}/(f_W \cdot f_T)^{\frac{1}{2}} = 0.427$
$f_{III}/(f_W \cdot f_T)^{\frac{1}{2}} = 1.088$,
$f_{IV}/(f_W \cdot f_T)^{\frac{1}{2}} = 0.611$
$HH_{II\,III}/(f_W \cdot f_T)^{\frac{1}{2}} = -0.2627$, -continued $H_{III}/(f_W \cdot f_T)^{\frac{1}{2}} = -0.478$
$R_{31}/(N_{31} - 1)(f_W \cdot f_T)^{\frac{1}{2}} = 1.148$
$R_{36}/(N_{33} - 1)(f_W \cdot f_T)^{\frac{1}{2}} = 0.669$
$D_{III\ IV}/(f_W \cdot f_T)^{\frac{1}{2}} = 0.734,$
$D_{FT}f_T^2 = 4.371 \times 10^{-3}$
$(R_{31} + R_{32})/(R_{31} - R_{32}) = -0.583$
$(R_{35} + R_{36})/(R_{35} - R_{36}) = 0.519,$
$R_{41}/R_{36} = 0.978$
total length of lens system 63.025
diameter of front lens component 25.7φ

Embodiment 16

$f = 6.7 \sim 18.38 \sim 50.44$
$F_{NO} = 1.85 \sim 2.02 \sim 2.39$
$\omega = 25.18 \sim 9.72 \sim 3.57°$

| | | | |
|---|---|---|---|
| $r_1 = 38.9550$ | | | |
| | $d_1 = 1.2000$ | $n_1 = 1.84666$ | $\nu_1 = 23.78$ |
| $r_2 = 22.9987$ | | | |
| | $d_2 = 4.2500$ | $n_2 = 1.56873$ | $\nu_2 = 63.16$ |
| $r_3 = -279.6634$ | | | |
| | $d_3 = 0.1500$ | | |
| $r_4 = 21.3776$ | | | |
| | $d_4 = 3.2500$ | $n_3 = 1.60311$ | $\nu_3 = 60.70$ |
| $r_5 = 94.2597$ | | | |
| | $d_5 = D_1$ (variable) | | |
| $r_6 = 204.4263$ | | | |
| | $d_6 = 0.9000$ | $n_4 = 1.69680$ | $\nu_4 = 55.52$ |
| $r_7 = 7.7743$ | | | |
| | $d_7 = 2.8000$ | | |
| $r_8 = -12.6764$ | | | |
| | $d_8 = 0.8000$ | $n_5 = 1.60311$ | $\nu_5 = 60.70$ |
| $r_9 = 11.2751$ | | | |
| | $d_9 = 2.0000$ | $n_6 = 1.84666$ | $\nu_6 = 23.78$ |
| $r_{10} = 68.6575$ | | | |
| | $d_{10} = D_2$ (variable) | | |
| $r_{11} = \infty$ (stop) | | | |
| | $d_{11} = 1.4000$ | | |
| $r_{12} = 6.5200$ (aspherical surface) | | | |
| | $d_{12} = 3.6000$ | $n_7 = 1.69680$ | $\nu_7 = 55.52$ |
| $r_{13} = 173.1581$ | | | |
| | $d_{13} = 0.1500$ | | |
| $r_{14} = 15.0584$ | | | |
| | $d_{14} = 0.8000$ | $n_8 = 1.84666$ | $\nu_8 = 23.78$ |
| $r_{15} = 5.6605$ | | | |
| | $d_{15} = D_3$ (variable) | | |
| $r_{16} = 10.5785$ (aspherical surface) | | | |
| | $d_{16} = 2.5500$ | $n_9 = 1.58913$ | $\nu_9 = 60.97$ |
| $r_{17} = -26.8865$ | | | |
| | $d_{17} = D_4$ (variable) | | |
| $r_{18} = \infty$ | | | |
| | $d_{18} = 1.6000$ | $n_{10} = 1.51633$ | $\nu_{10} = 64.15$ |
| $r_{19} = \infty$ | | | |
| | $d_{19} = 4.4000$ | $n_{11} = 1.54771$ | $\nu_{11} = 62.83$ |
| $r_{20} = \infty$ | | | |
| | $d_{20} = 0.5000$ | | |
| $r_{21} = \infty$ | | | |
| | $d_{21} = 0.6000$ | $n_{12} = 1.48749$ | $\nu_{12} = 70.20$ |
| $r_{22} = \infty$ | | | |
| | $d_{22} = 1.1600$ | | |
| $r_{23} = \infty$ | | | |

| f | 6.7 | 18.38 | 50.44 |
|---|---|---|---|
| $D_1$ | 0.700 | 9.744 | 16.493 |
| $D_2$ | 17.193 | 8.149 | 1.400 |
| $D_3$ | 4.719 | 2.984 | 8.574 |
| $D_4$ | 5.356 | 7.091 | 1.500 | aspherical surface coefficient
(12th surface)
$P = 1, A_4 = -0.30923 \times 10^{-3}$
$A_6 = -0.69943 \times 10^{-6}, A_8 = -0.24097 \times 10^{-6}$
(16th surface)
$P = 1, A_4 = -0.14135 \times 10^{-3}$
$A_6 = -0.51072 \times 10^{-5}, A_8 = 0.12180 \times 10^{-6}$
$f_1/\{f_T(f_W \cdot f_T)^{\frac{1}{2}}\}^{\frac{1}{2}} = 0.990,$
$f_{II}/(f_W \cdot f_T)^{\frac{1}{2}} = 0.405$
$f_{III}/(f_W \cdot f_T)^{\frac{1}{2}} = 1.280,$
$f_{IV}/(f_W \cdot f_T)^{\frac{1}{2}} = 0.719$
$HH_{II\ III}/(f_W \cdot f_T)^{\frac{1}{2}} = -0.0259,$ -continued $H_{III}/(f_W \cdot f_T)^{\frac{1}{2}} = -0.355$
$R_{31}/(N_{31} - 1)(f_W \cdot f_T)^{\frac{1}{2}} = 0.509$
$R_{36}/(N_{33} - 1)(f_W \cdot f_T)^{\frac{1}{2}} = 0.364$
$D_{III\ IV}/(f_W \cdot f_T)^{\frac{1}{2}} = 0.386,$
$D_{FT}f_T^2 = 4.371 \times 10^{-3}$
$(R_{31} + R_{32})/(R_{31} - R_{32}) = -1.078$
$(R_{35} + R_{36})/(R_{35} - R_{36}) = 2.205,$
$R_{41}/R_{36} = 1.869$
$\Delta x/(f_W \cdot f_T)^{\frac{1}{2}} = 0.004\ (y = 0.182y_1)$
$\Delta x/(f_W \cdot f_T)^{\frac{1}{2}} = 0.146\ (y = 0.437y_1)$
total length of lens system 57.788
diameter of front lens component 22.5φ

Embodiment 17

$f = 6.7 \sim 18.38 \sim 50.44$
$F_{NO} = 1.85 \sim 2.04 \sim 2.35$
$\omega = 25.18 \sim 9.72 \sim 3.57°$

| | | | |
|---|---|---|---|
| $r_1 = 26.3774$ | | | |
| | $d_1 = 1.2000$ | $n_1 = 1.84666$ | $\nu_1 = 23.78$ |
| $r_2 = 17.7731$ | | | |
| | $d_2 = 4.9000$ | $n_2 = 1.56873$ | $\nu_2 = 63.16$ |
| $r_3 = 657.1990$ | | | |
| | $d_3 = 0.1500$ | | |
| $r_4 = 22.1232$ | | | |
| | $d_4 = 2.9000$ | $n_3 = 1.60311$ | $\nu_3 = 60.70$ |
| $r_5 = 71.7507$ | | | |
| | $d_5 = D_1$ (variable) | | |
| $r_6 = 100.2516$ | | | |
| | $d_6 = 0.9000$ | $n_4 = 1.83400$ | $\nu_4 = 37.16$ |
| $r_7 = 6.6206$ | | | |
| | $d_7 = 2.5000$ | | |
| $r_8 = -8.8402$ | | | |
| | $d_8 = 0.8000$ | $n_5 = 1.62230$ | $\nu_5 = 53.20$ |
| $r_9 = 9.8650$ | | | |
| | $d_9 = 2.4000$ | $n_6 = 1.84666$ | $\nu_6 = 23.78$ |
| $r_{10} = -51.6671$ | | | |
| | $d_{10} = D_2$ (variable) | | |
| $r_{11} = 14.2950$ (aspherical surface) | | | |
| | $d_{11} = 2.2000$ | $n_7 = 1.58913$ | $\nu_7 = 60.97$ |
| $r_{12} = -43.2848$ | | | |
| | $d_{12} = 0.6000$ | | |
| $r_{13} = \infty$ (stop) | | | |
| | $d_{13} = 1.4000$ | | |
| $r_{14} = 10.4076$ | | | |
| | $d_{14} = 3.0000$ | $n_8 = 1.62374$ | $\nu_8 = 47.10$ |
| $r_{15} = -24.0926$ | | | |
| | $d_{15} = 0.1500$ | | |
| $r_{16} = 71.1257$ | | | |
| | $d_{16} = 0.8000$ | $n_9 = 1.84666$ | $\nu_9 = 23.78$ |
| $r_{17} = 7.0558$ | | | |
| | $d_{17} = D_3$ (variable) | | |
| $r_{18} = 10.5860$ (aspherical surface) | | | |
| | $d_{18} = 2.2000$ | $n_{10} = 1.58913$ | $\nu_{10} = 60.97$ |
| $r_{19} = -52.7672$ | | | |
| | $d_{19} = D_4$ (variable) | | |
| $r_{20} = \infty$ | | | |
| | $d_{20} = 1.6000$ | $n_{11} = 1.51633$ | $\nu_{11} = 64.15$ |
| $r_{21} = \infty$ | | | |
| | $d_{21} = 4.4000$ | $n_{12} = 1.54771$ | $\nu_{12} = 62.83$ |
| $r_{22} = \infty$ | | | |
| | $d_{22} = 0.5000$ | | |
| $r_{23} = \infty$ | | | |
| | $d_{23} = 0.6000$ | $n_{13} = 1.48749$ | $\nu_{13} = 70.20$ |
| $r_{24} = \infty$ | | | |
| | $d_{24} = 1.1600$ | | |
| $r_{25} = \infty$ | | | |

| f | 6.7 | 18.38 | 50.44 |
|---|---|---|---|
| $D_1$ | 0.700 | 9.559 | 15.671 |
| $D_2$ | 15.571 | 6.713 | 0.600 |
| $D_3$ | 5.966 | 3.317 | 7.925 |
| $D_4$ | 3.459 | 6.108 | 1.500 | aspherical surface coefficient
(11th surface)
$P = 1, A_4 = -0.18200 \times 10^{-3}$
$A_6 = -0.23816 \times 10^{-5}, A_8 = 0.15287 \times 10^{-7}$
(18th surface)
$P = 1, A_4 = -0.45037 \times 10^{-4}$ -continued $A_6 = -0.82357 \times 10^{-5}$, $A_8 = 0.24085 \times 10^{-6}$
$f_1/\{f_T(f_W \cdot f_T)^{\frac{1}{2}}\}^{\frac{1}{2}} = 0.965$,
$f_{II}/(f_W \cdot f_T)^{\frac{1}{2}} = 0.363$
$f_{III}/(f_W \cdot f_T)^{\frac{1}{2}} = 0.908$,
$f_{IV}/(f_W \cdot f_T)^{\frac{1}{2}} = 0.825$
$HH_{II\,III}/(f_W \cdot f_T)^{\frac{1}{2}} = -0.0618$,
$H_{III}/(f_W \cdot f_T)^{\frac{1}{2}} = -0.196$
$R_{31}/(N_{31} - 1)(f_W \cdot f_T)^{\frac{1}{2}} = 1.320$
$R_{36}/(N_{33} - 1)(f_W \cdot f_T)^{\frac{1}{2}} = 0.453$
$D_{III\,IV}/(f_W \cdot f_T)^{\frac{1}{2}} = 0.563$,
$D_{FT}f_T^2 = 4.371 \times 10^{-3}$
$(R_{31} + R_{32})/(R_{31} - R_{32}) = -0.503$
$(R_{35} + R_{36})/(R_{35} - R_{36}) = 1.220$,
$R_{41}/R_{36} = 1.500$
$\Delta x/(f_W \cdot f_T)^{\frac{1}{2}} = 0.002 (y = 0.182 y_1)$
$\Delta x/(f_W \cdot f_T)^{\frac{1}{2}} = 0.079 (y = 0.437 y_1)$
total length of lens system 57.767
diameter of front lens component 22.3$\phi$

Embodiment 18

$f = 6.7 \sim 18.38 \sim 50.44$
$F_{NO} = 1.85 \sim 1.99 \sim 2.39$
$\omega = 25.18 \sim 9.72 \sim 3.57°$

| | | | |
|---|---|---|---|
| $r_1 = 19.6985$ | | | |
| | $d_1 = 1.2000$ | $n_1 = 1.84666$ | $\nu_1 = 23.78$ |
| $r_2 = 13.7089$ | | | |
| | $d_2 = 0.0900$ | | |
| $r_3 = 13.8901$ | | | |
| | $d_3 = 6.2000$ | $n_2 = 1.69680$ | $\nu_2 = 55.52$ |
| $r_4 = 1092.6801$ (aspherical surface) | | | |
| | $d_4 = D_1$ (variable) | | |
| $r_5 = 46.5765$ | | | |
| | $d_5 = 0.9000$ | $n_3 = 1.77250$ | $\nu_3 = 49.66$ |
| $r_6 = 5.8624$ | | | |
| | $d_6 = 2.9700$ | | |
| $r_7 = -16.4818$ | | | |
| | $d_7 = 0.8000$ | $n_4 = 1.60311$ | $\nu_4 = 60.70$ |
| $r_8 = 19.2213$ | | | |
| | $d_8 = 0.1500$ | | |
| $r_9 = 11.9035$ | | | |
| | $d_9 = 2.0000$ | $n_5 = 1.84666$ | $\nu_5 = 23.78$ |
| $r_{10} = 61.8455$ | | | |
| | $d_{10} = D_2$ (variable) | | |
| $r_{11} = \infty$ (stop) | | | |
| | $d_{11} = 1.4000$ | | |
| $r_{12} = 6.7400$ (aspherical surface) | | | |
| | $d_{12} = 4.0000$ | $n_6 = 1.58913$ | $\nu_6 = 60.97$ |
| $r_{13} = -47.9719$ | | | |
| | $d_{13} = 0.1500$ | | |
| $r_{14} = 13.2398$ | | | |
| | $d_{14} = 0.8000$ | $n_7 = 1.84666$ | $\nu_7 = 23.78$ |
| $r_{15} = 5.7647$ | | | |
| | $d_{15} = D_3$ (variable) | | |
| $r_{16} = 10.3940$ (aspherical surface) | | | |
| | $d_{16} = 2.8000$ | $n_8 = 1.58913$ | $\nu_8 = 60.97$ |
| $r_{17} = -41.4945$ | | | |
| | $d_{17} = D_4$ (variable) | | |
| $r_{18} = \infty$ | | | |
| | $d_{18} = 1.6000$ | $n_9 = 1.51633$ | $\nu_9 = 64.15$ |
| $r_{19} = \infty$ | | | |
| | $d_{19} = 4.4000$ | $n_{10} = 1.54771$ | $\nu_{10} = 62.83$ |
| $r_{20} = \infty$ | | | |
| | $d_{20} = 0.5000$ | | |
| $r_{21} = \infty$ | | | |
| | $d_{21} = 0.6000$ | $n_{11} = 1.48749$ | $\nu_{11} = 70.20$ |
| $r_{22} = \infty$ | | | |
| | $d_{22} = 1.1600$ | | |
| $r_{23} = \infty$ | | | |

| f | 6.7 | 18.38 | 50.44 |
|---|---|---|---|
| $D_1$ | 0.600 | 10.393 | 17.462 |
| $D_2$ | 17.862 | 8.069 | 1.000 |
| $D_3$ | 4.630 | 2.982 | 8.312 |
| $D_4$ | 5.182 | 6.830 | 1.500 | aspherical surface coefficient
(4th surface)
$P = 1$, $A_4 = 0.75640 \times 10^{-5}$
$A_6 = 0.13214 \times 10^{-7}$, $A_8 = -0.23383 \times 10^{-9}$
(12th surface)
$P = 1$, $A_4 = -0.34910 \times 10^{-3}$
$A_6 = -0.12936 \times 10^{-5}$, $A_8 = -0.19996 \times 10^{-6}$
(16th surface)
$P = 1$, $A_4 = -0.22649 \times 10^{-4}$
$A_6 = -0.77421 \times 10^{-5}$, $A_8 = 0.25529 \times 10^{-6}$
$f_1/\{f_T(f_W \cdot f_T)^{\frac{1}{2}}\}^{\frac{1}{2}} = 1.051$,
$f_{II}/(f_W \cdot f_T)^{\frac{1}{2}} = 0.433$
$f_{III}/(f_W \cdot f_T)^{\frac{1}{2}} = 1.271$,
$f_{IV}/(f_W \cdot f_T)^{\frac{1}{2}} = 0.783$
$HH_{II\,III}/(f_W \cdot f_T)^{\frac{1}{2}} = -0.0651$,
$H_{III}/(f_W \cdot f_T)^{\frac{1}{2}} = -0.306$
$R_{31}/(N_{31} - 1)(f_W \cdot f_T)^{\frac{1}{2}} = 0.622$
$R_{36}/(N_{33} - 1)(f_W \cdot f_T)^{\frac{1}{2}} = 0.370$
$D_{III\,IV}/(f_W \cdot f_T)^{\frac{1}{2}} = 0.422$,
$D_{FT}f_T^2 = 3.267 \times 10^{-3}$
$(R_{31} + R_{32})/(R_{31} - R_{32}) = -0.754$
$(R_{35} + R_{36})/(R_{35} - R_{36}) = 2.542$,
$R_{41}/R_{36} = 1.803$
$\Delta x/(f_W \cdot f_T)^{\frac{1}{2}} = 0.004 (y = 0.182 y_1)$
$\Delta x/(f_W \cdot f_T)^{\frac{1}{2}} = 0.160 (y = 0.437 y_1)$
total length of lens system 57.706
diameter of front lens component 21.8$\phi$

Embodiment 19

$f = 6.5 \sim 52$  $F/1.8 \sim F/2.4$
$2\omega = 50.4° \sim 7.2°$

| | | | |
|---|---|---|---|
| $r_1 = 43.7901$ | | | |
| | $d_1 = 1.2000$ | $n_1 = 1.80518$ | $\nu_1 = 25.43$ |
| $r_2 = 23.2327$ | | | |
| | $d_2 = 6.1700$ | $n_2 = 1.60311$ | $\nu_2 = 60.70$ |
| $r_3 = -96.6864$ | | | |
| | $d_3 = 0.1500$ | | |
| $r_4 = 18.6501$ | | | |
| | $d_4 = 2.5900$ | $n_3 = 1.60311$ | $\nu_3 = 60.70$ |
| $r_5 = 31.3590$ | | | |
| | $d_5 = D_1$ (variable) | | |
| $r_6 = 27.2301$ | | | |
| | $d_6 = 0.9000$ | $n_4 = 1.65844$ | $\nu_4 = 50.86$ |
| $r_7 = 6.9714$ | | | |
| | $d_7 = 3.5000$ | | |
| $r_8 = -9.1811$ | | | |
| | $d_8 = 0.8000$ | $n_5 = 1.60311$ | $\nu_5 = 60.70$ |
| $r_9 = 9.1811$ | | | |
| | $d_9 = 2.3000$ | $n_6 = 1.80518$ | $\nu_6 = 25.43$ |
| $r_{10} = 65.7228$ | | | |
| | $d_{10} = D_2$ (variable) | | |
| $r_{11} = \infty$ (stop) | | | |
| | $d_{11} = 1.4000$ | | |
| $r_{12} = 7.3212$ (aspherical surface) | | | |
| | $d_{12} = 5.4530$ | $n_7 = 1.58913$ | $\nu_7 = 60.97$ |
| $r_{13} = -18.0242$ | | | |
| | $d_{13} = 0.1500$ | | |
| $r_{14} = 11.8864$ | | | |
| | $d_{14} = 0.8000$ | $n_8 = 1.84666$ | $\nu_8 = 23.78$ |
| $r_{15} = 5.6861$ | | | |
| | $d_{15} = D_3$ (variable) | | |
| $r_{16} = 9.4173$ | | | |
| | $d_{16} = 2.7000$ | $n_9 = 1.56873$ | $\nu_9 = 63.16$ |
| $r_{17} = 297.2498$ | | | |
| | $d_{17} = D_4$ (variable) | | |
| $r_{18} = \infty$ | | | |
| | $d_{18} = 1.6000$ | $n_{10} = 1.51633$ | $\nu_{10} = 64.15$ |
| $r_{19} = \infty$ | | | |
| | $d_{19} = 4.4000$ | $n_{11} = 1.54771$ | $\nu_{11} = 62.83$ |
| $r_{20} = \infty$ | | | |
| | $d_{20} = 0.5000$ | | |
| $r_{21} = \infty$ | | | |
| | $d_{21} = 0.6000$ | $n_{12} = 1.48749$ | $\nu_{12} = 70.20$ |
| $r_{22} = \infty$ | | | | aspherical surface coefficient
$P = 1$, $A_4 = -0.44224 \times 10^{-3}$
$A_6 = -0.17987 \times 10^{-5}$, $A_8 = -0.11666 \times 10^{-6}$

| f | 6.5 | 18.4 | 52 |
|---|---|---|---|
| $D_1$ | 1.000 | 10.876 | 17.778 |
| $D_2$ | 17.978 | 8.103 | 1.200 |
| $D_3$ | 6.530 | 3.723 | 7.277 |

-continued

| | D$_4$ | 2.747 | 5.555 | 2.000 |

$f_1/\{f_T(f_W \cdot f_T)^{\frac{1}{2}}\} = 1.110$,
$f_{II}/(f_W \cdot f_T)^{\frac{1}{2}} = 0.392$
$f_{III}/(f_w \cdot f_T)^{\frac{1}{2}} = 0.921$,
$f_{IV}/(f_W \cdot f_T)^{\frac{1}{2}} = 0.927$
$HH_{II\,III}/(f_W \cdot f_T)^{\frac{1}{2}} = 0.131$,
$H_{III}/(f_W \cdot f_T)^{\frac{1}{2}} = -0.189$
$R_{31}/(N_{31} - 1)(f_W \cdot f_T)^{\frac{1}{2}} = 0.676$
$R_{36}/(N_{33} - 1)(f_W \cdot f_T)^{\frac{1}{2}} = 0.365$
$D_{III\,IV}/(f_W \cdot f_T)^{\frac{1}{2}} = 0.495$,
$D_{FT}f_T^2 = 2.860 \times 10^{-3}$
$(R_{31} + R_{32})/(R_{31} - R_{32}) = -0.422$
$(R_{35} + R_{36})/(R_{35} - R_{36}) = 2.834$,
$R_{41}/R_{36} = 1.656$
total length of lens system 62.430
diameter of front lens component 26.4ϕ wherein the reference symbols r$_1$, r$_2$, . . . represent radii of curvature on the surfaces of the respective lens elements, the reference symbols d$_1$, d$_2$, . . . designate thicknesses of the respective lens elements and airspaces reserved therebetween, the reference symbols n$_1$, n$_2$, . . . denote refractive indices of the respective lens elements, and the reference symbols ν$_1$, ν$_2$, . . . represent Abbe's numbers of the respective lens elements.

The Embodiment 1 has the composition illustrated in FIG. 1, wherein the third lens unit consists of a positive lens element and a negative lens element, and the fourth lens element is composed of a positive lens element. Further, the object side surface (r$_{12}$) of the third lens unit and the object side surface (r$_{16}$) of the fourth lens unit are designed as aspherical surfaces respectively.

Figure 2:
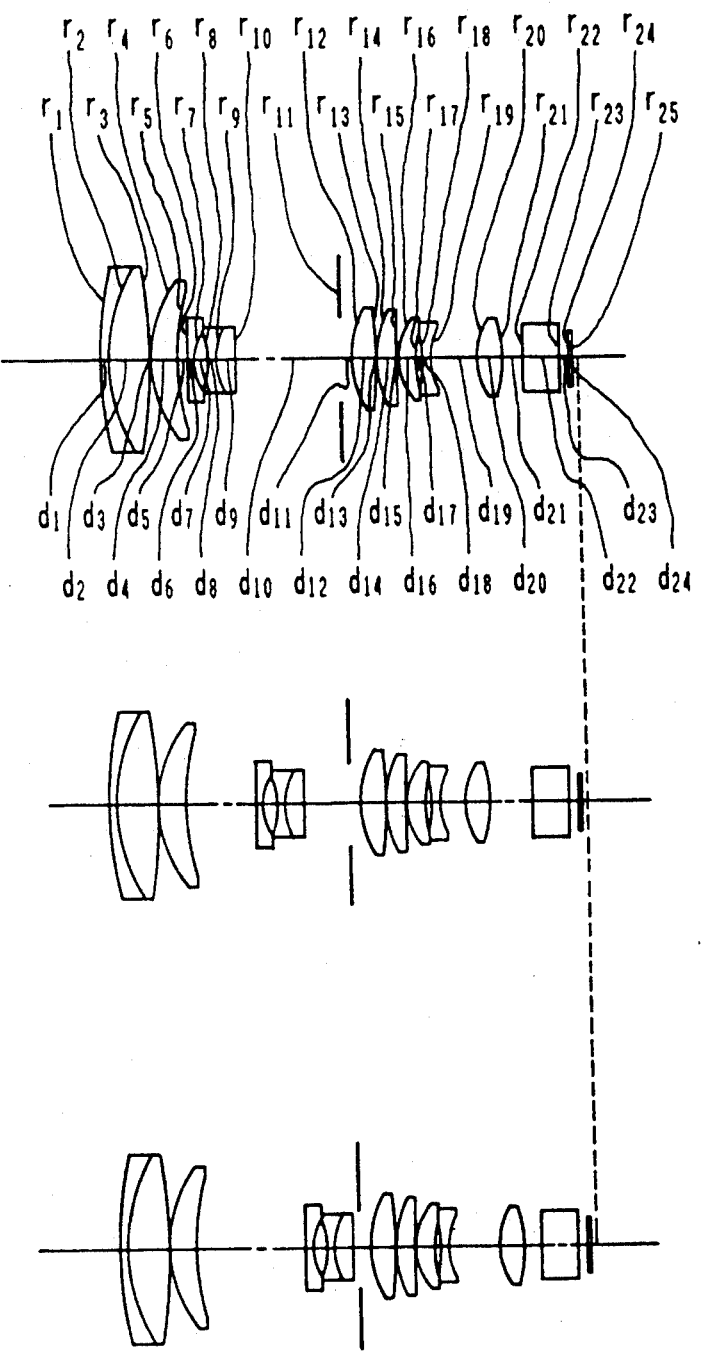

The Embodiment 2 has the composition illustrated in FIG. 2, wherein the third lens unit consists of three positive lens elements and a negative lens element, whereas the fourth lens unit is composed of a positive lens element. Further, the object side surface (r$_{20}$) of the fourth lens unit is designed as an aspherical surface.

Figure 3:
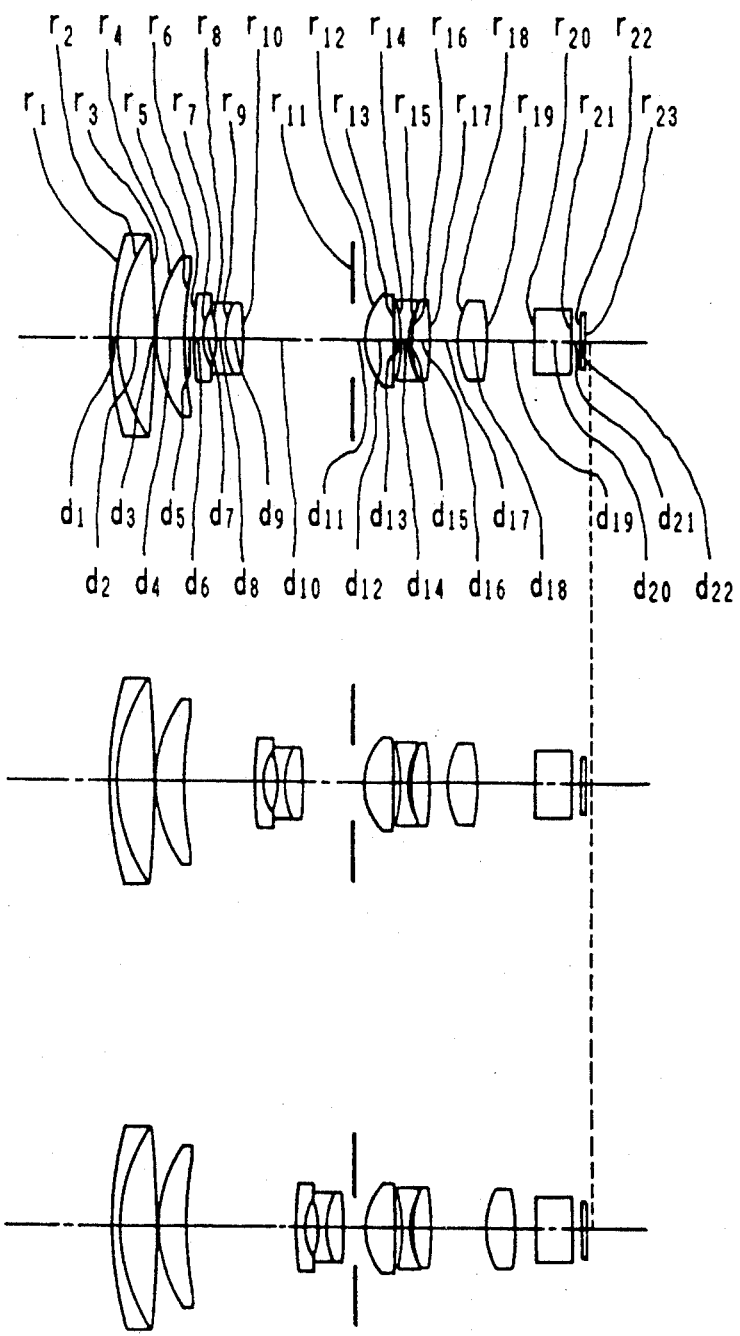

The Embodiment 3 has the composition shown in FIG. 3, wherein the third lens unit consists of a positive lens element, a negative lens element and a positive lens element, whereas the fourth lens unit is composed of a positive lens element. The object side surface (r$_{18}$) of the fourth lens unit is designed as an aspherical surface.

Figure 4:
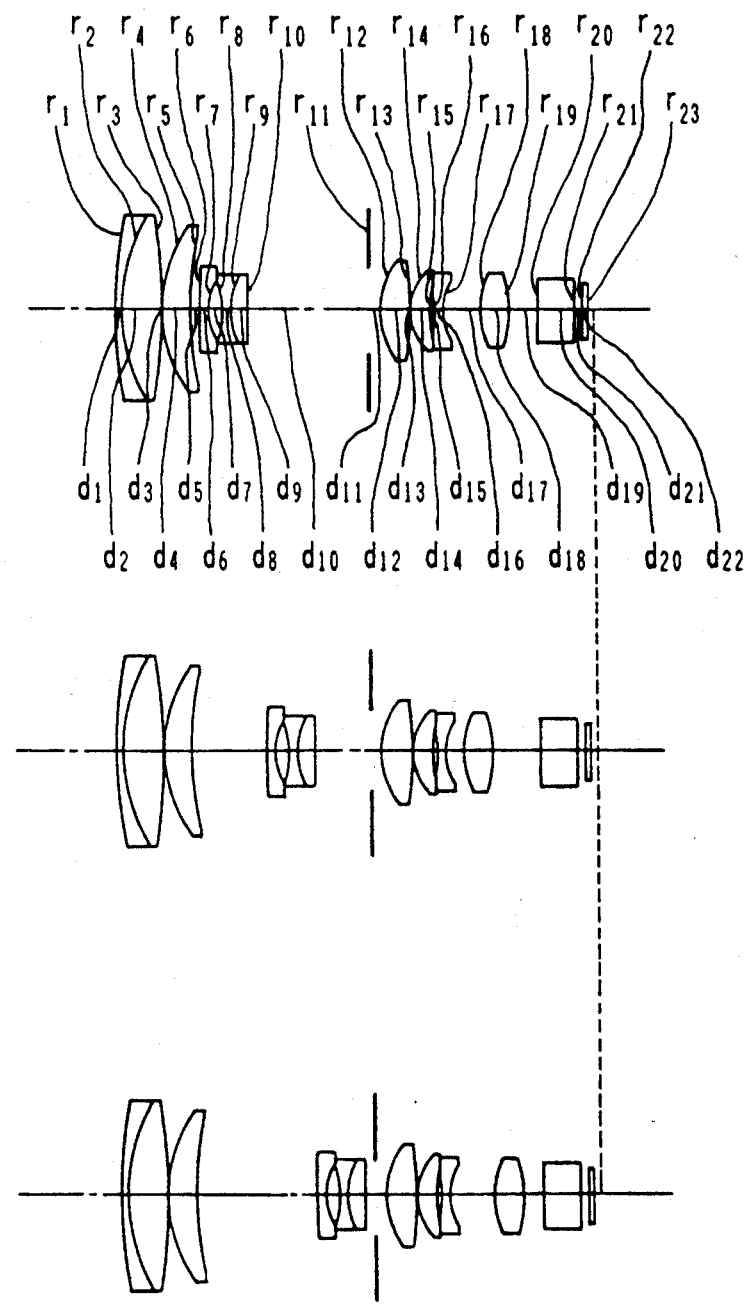

The Embodiment 4 has the composition shown in FIG. 4, wherein the thrid lens unit consists of two positive lens elements and a negative lens element, whereas the fourth lens unit is composed of a positive lens element. The object side surface (r$_{18}$) of the fourth lens unit is designed as an aspherical surface.

Figure 5:
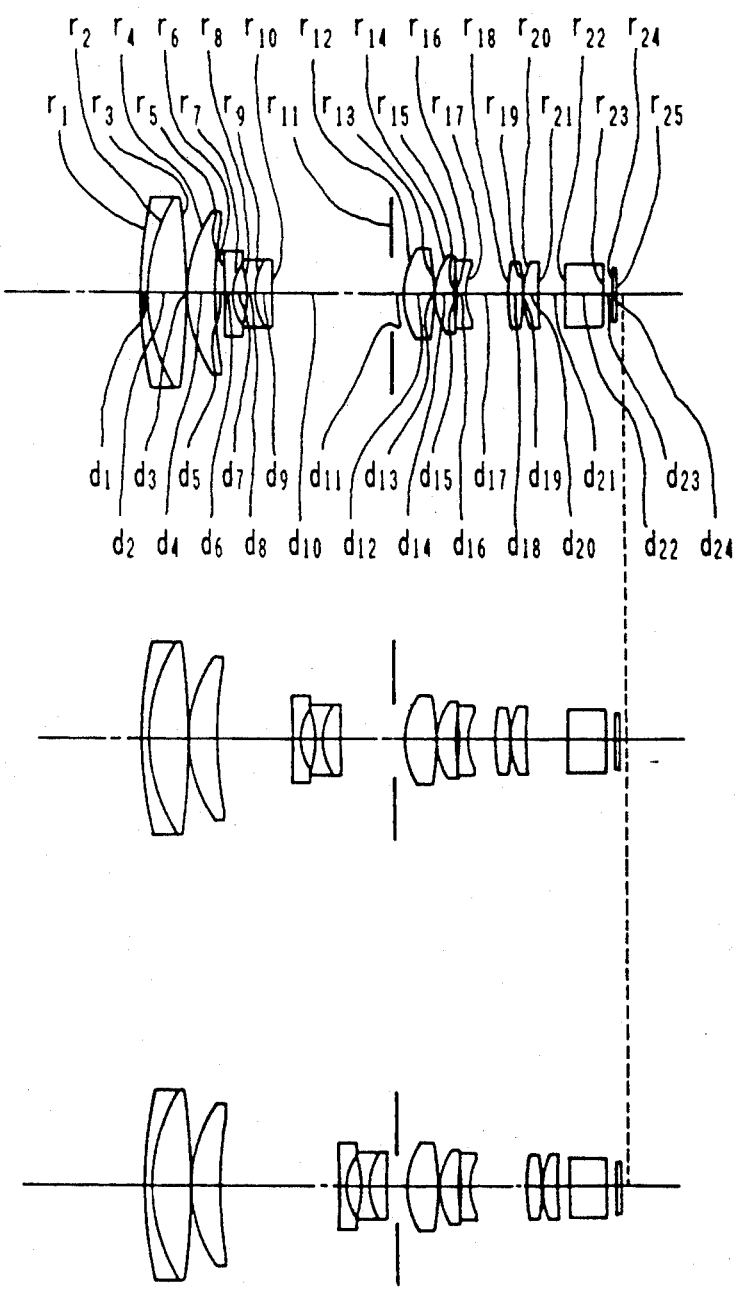

The Embodiment 5 has the composition presented in FIG. 5, wherein the third lens unit consists of two positive lens elements and a negative lens element, whereas the fourth lens unit is composed of two positive lens elements. The object side surface (r$_{20}$) of the positive lens element arranged on the image side in the fourth lens unit is designed as an aspherical surface.

Figure 6:
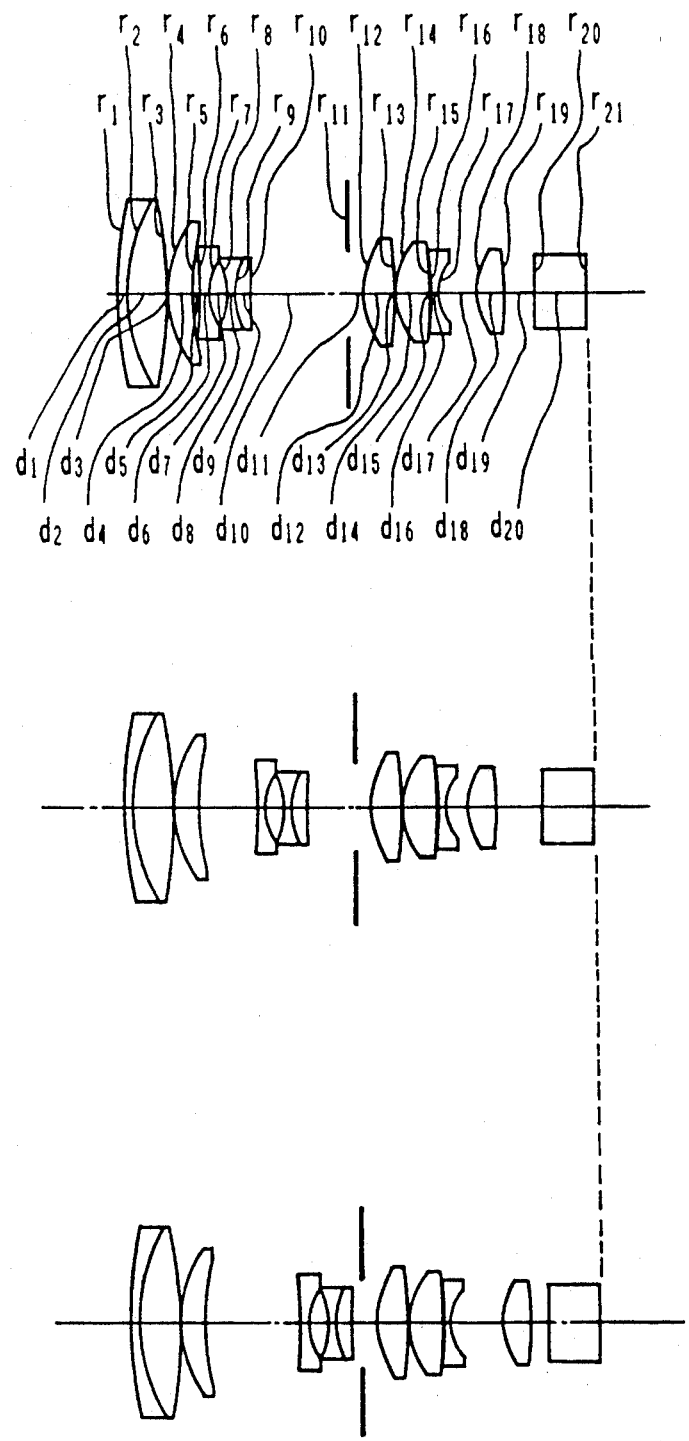

The Embodiment 6 has the composition illustrated in FIG. 6, wherein the third lens unit consists of two positive lens elements and a negative lens element having a strongly concave surface on the image side, whereas the fourth lens unit is composed of a positive lens element. The object side surface (r$_{12}$) of the third lens unit and the object side surface (r$_{18}$) of the fourth lens unit are designed as aspherical surface having curvature which is lowered as the portions of said aspherical surfaces are farther from the optical axis.

Figure 7:
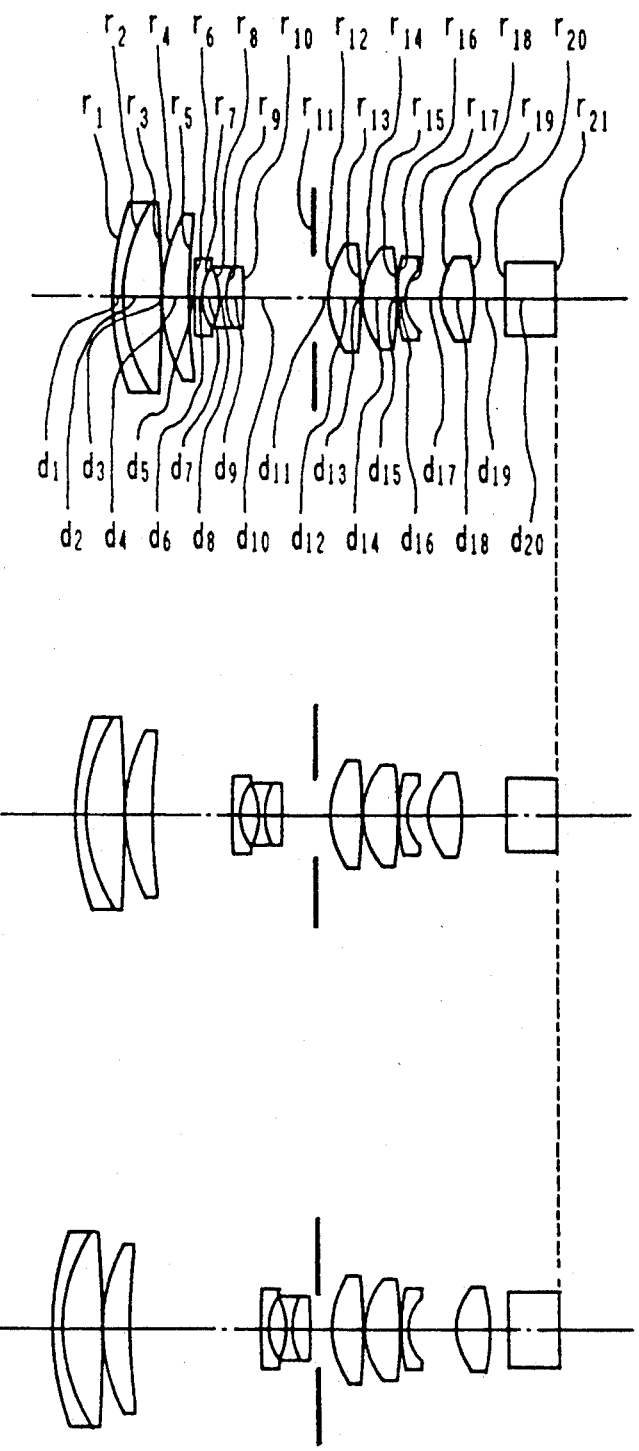

The Embodiment 7 has the composition illustrated in FIG. 7, wherein the third lens unit consists of two positive lens elements and a negative lens element, whereas the fourth lens unit is composed of a positive lens element. The object side surface (r$_{12}$) of the third lens unit and the object side surface (r$_{18}$) of the fourth lens unit are designed as aspherical surfaces respectively.

In the Embodiment 7, the first lens unit and the second lens unit are moved in the directions reverse to each other for variation of focal length.

Figure 8:
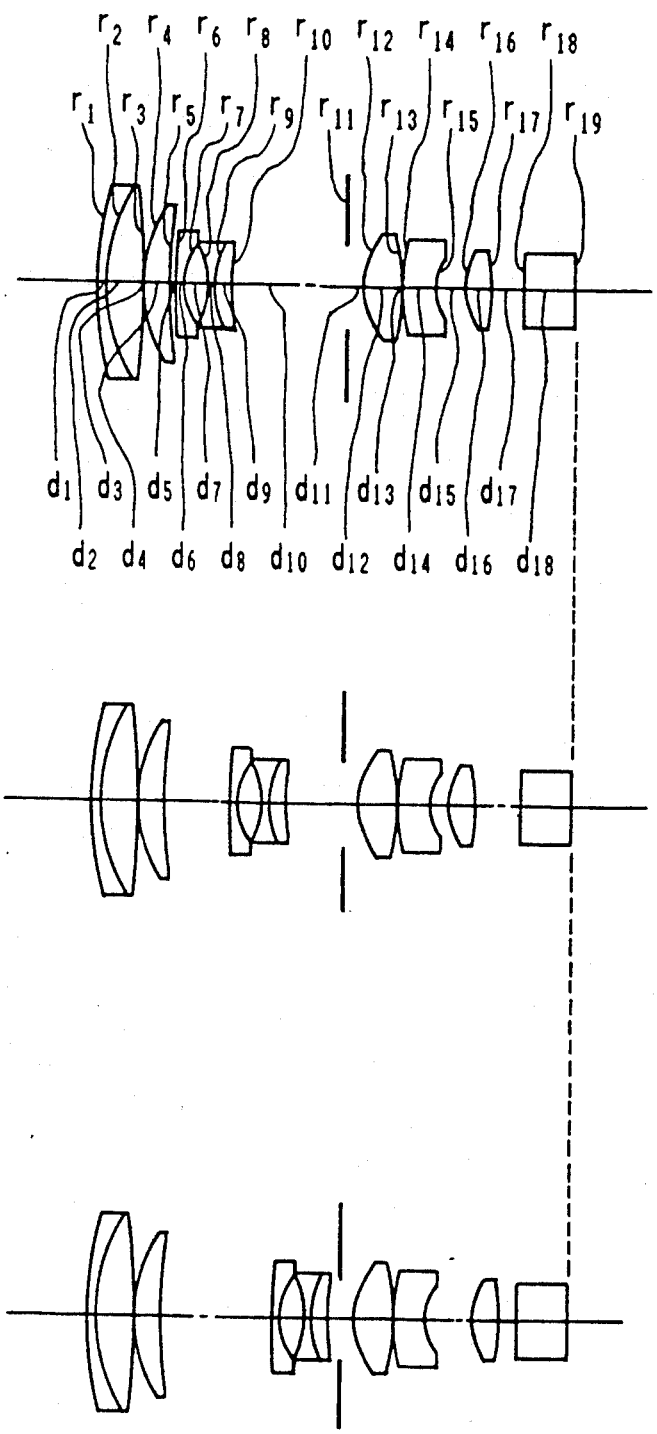

The Embodiment 8 has the composition shown in FIG. 8, wherein the third lens unit consists of a positive lens element and a negative lens element having a strongly concave surface on the image side, whereas the fourth lens unit is composed of a positive lens element. The object side surface (r$_{12}$) of the third lens unit and the object side surface (r$_{18}$) of the fourth lens unit are designed as aspherical surfaces having curvature which is lowered as the portions of said aspherical surfaces are farther from the optical axis.

Figure 9:
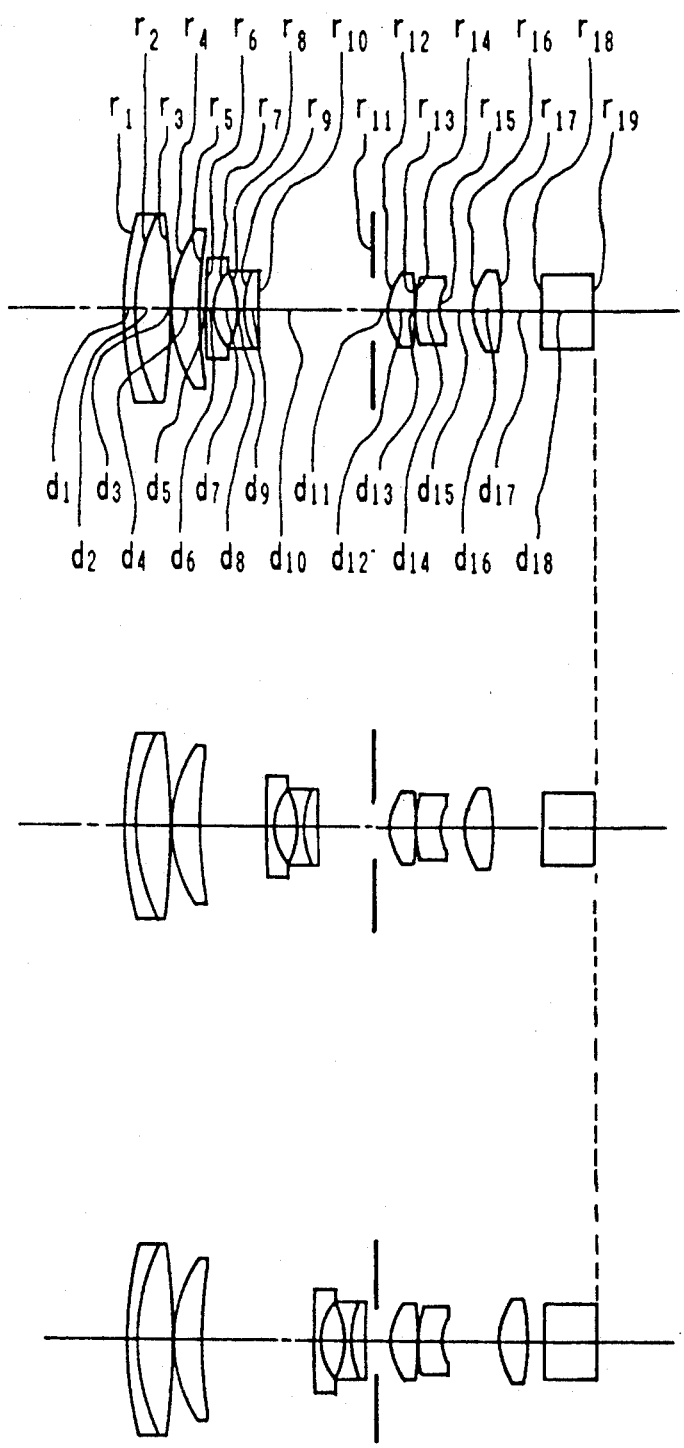

The Embodiment 9 has the composition illustrated in FIG. 9, wherein the third lens unit consists of a positive lens element and a negative lens element having a strongly concave surface on the image side, whereas the fourth lens unit is composed of a positive lens element. The object side surface (r$_{12}$) of the third lens unit and the object side surface (r$_{16}$) of the fourth lens unit are designed as aspherical surfaces having curvature which is lowered as the portions of said aspherical surfaces are farther from the optical axis.

Figure 10:
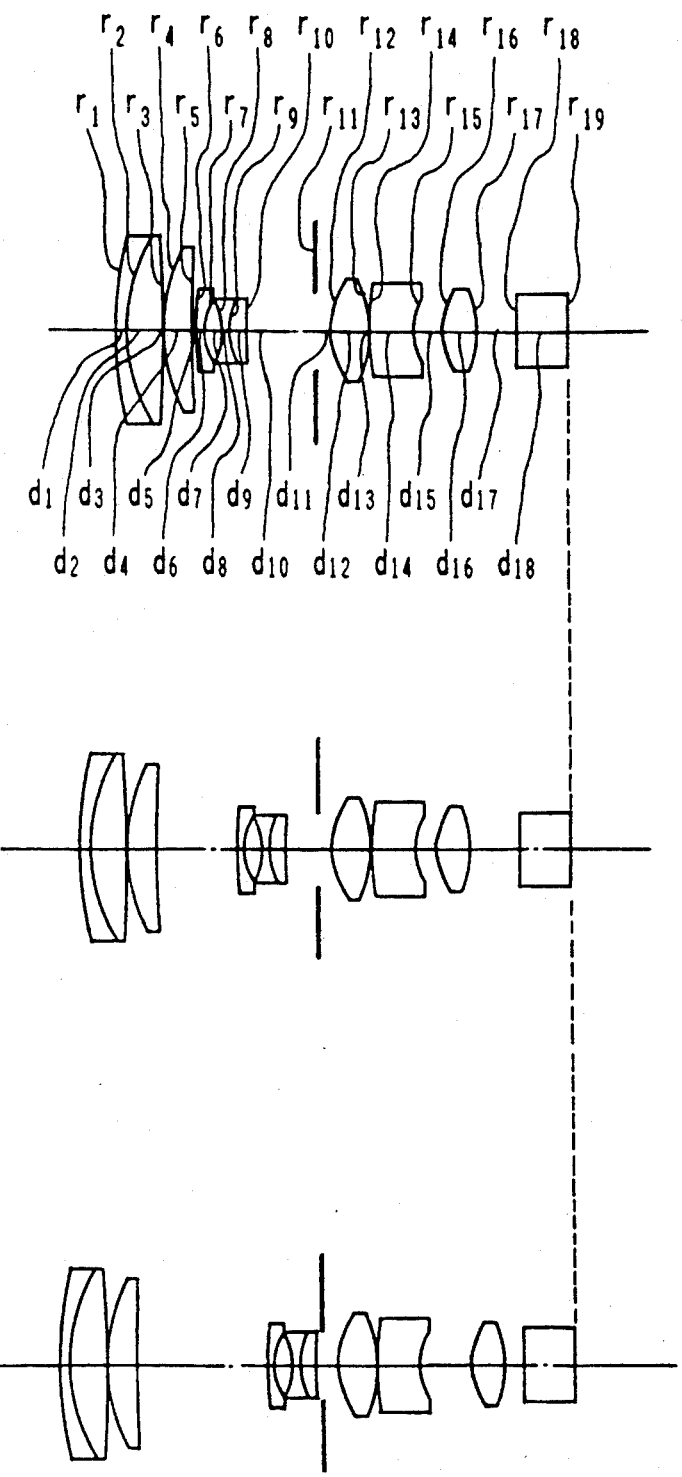

The Embodiment 10 has the composition illustrated in FIG. 10, wherein the third lens unit consists of a positive lens element and a negative lens element having a strongly concave surface on the image side, whereas the fourth lens unit is composed of a positive lens element. The object side surface (r$_{12}$) of the third lens unit and the object side surface (r$_{16}$) of the fourth lens unit are aspherical surfaces having curvature which is lowered as the portions of said aspherical surfaces are farther from the optical axis.

In the Embodiment 10, the first lens unit and the second lens unit are moved in the directions reverse to each other for varying focal length of the vari-focal lens system.

Figure 11:
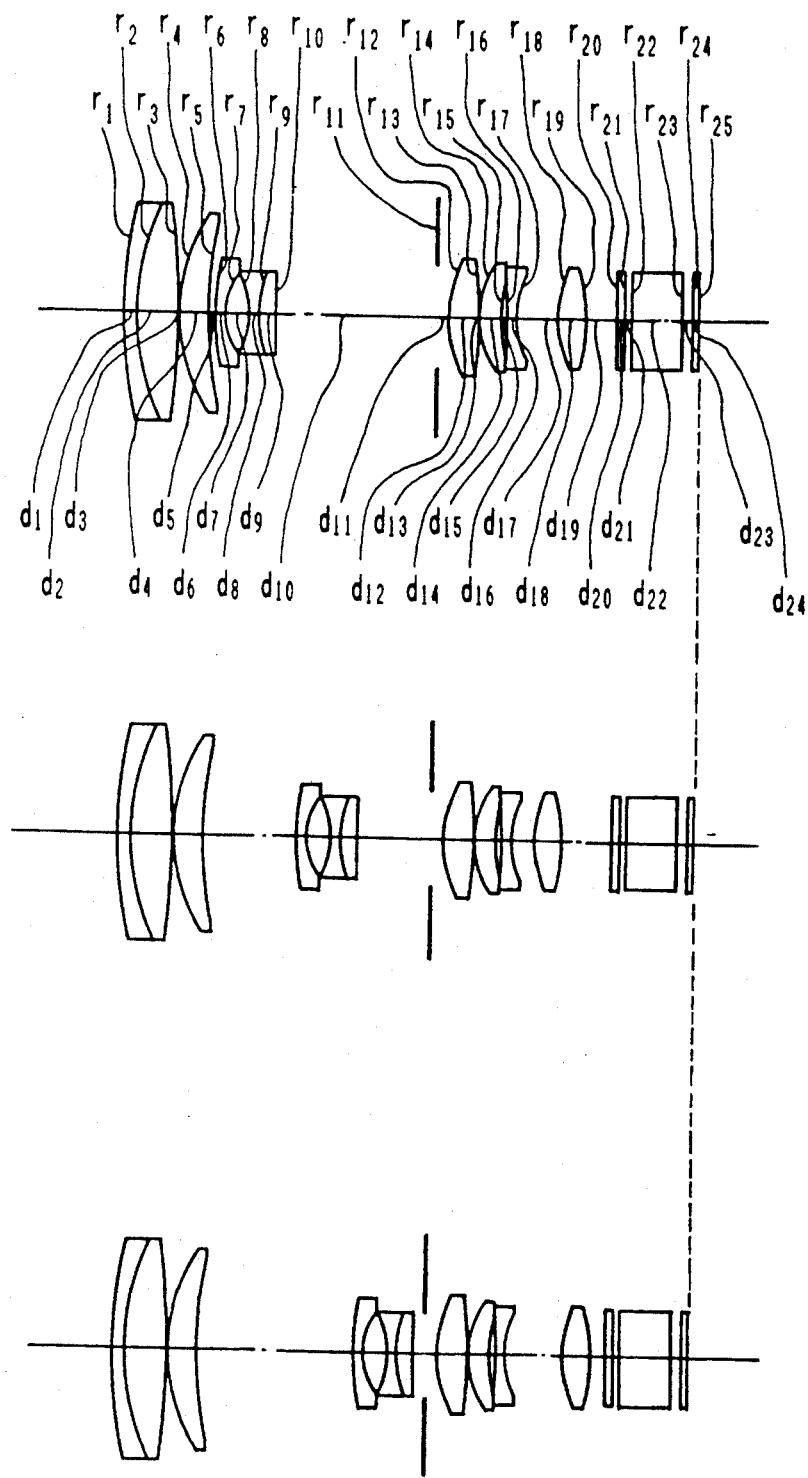

The Embodiment 11 has the composition shown in FIG. 11, wherein the third lens unit consists of two positive lens elements and a negative lens element having a strongly concave surface on the image side, whereas the fourth lens unit is composed of a positive lens element. The object side surface (r$_{11}$) of the third lens unit and the object side surface (r$_{18}$) of the fourth lens unit are aspherical surfaces having curvature which is lowered as the portions of said aspherical surface are farther from the optical axis.

Figure 12:
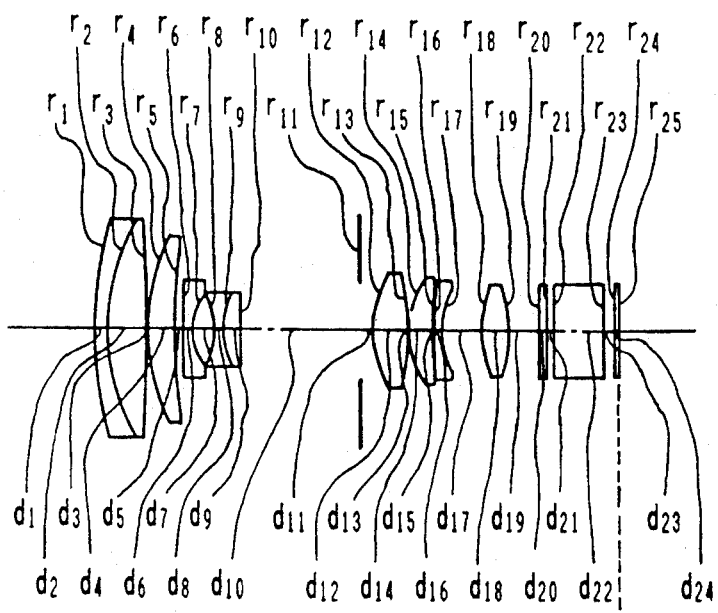

The Embodiment 12 has the composition visualized in FIG. 12, wherein the third lens unit consists of two positive lens elements and a negative lens element having a strongly concave surface on the image side, whereas the fourth lens unit is composed of a positive lens element. The object side surface (r$_{12}$) of the third lens unit and the object side surface (r$_{18}$) of the fourth lens unit are aspherical surfaces respectively.

Figure 13:
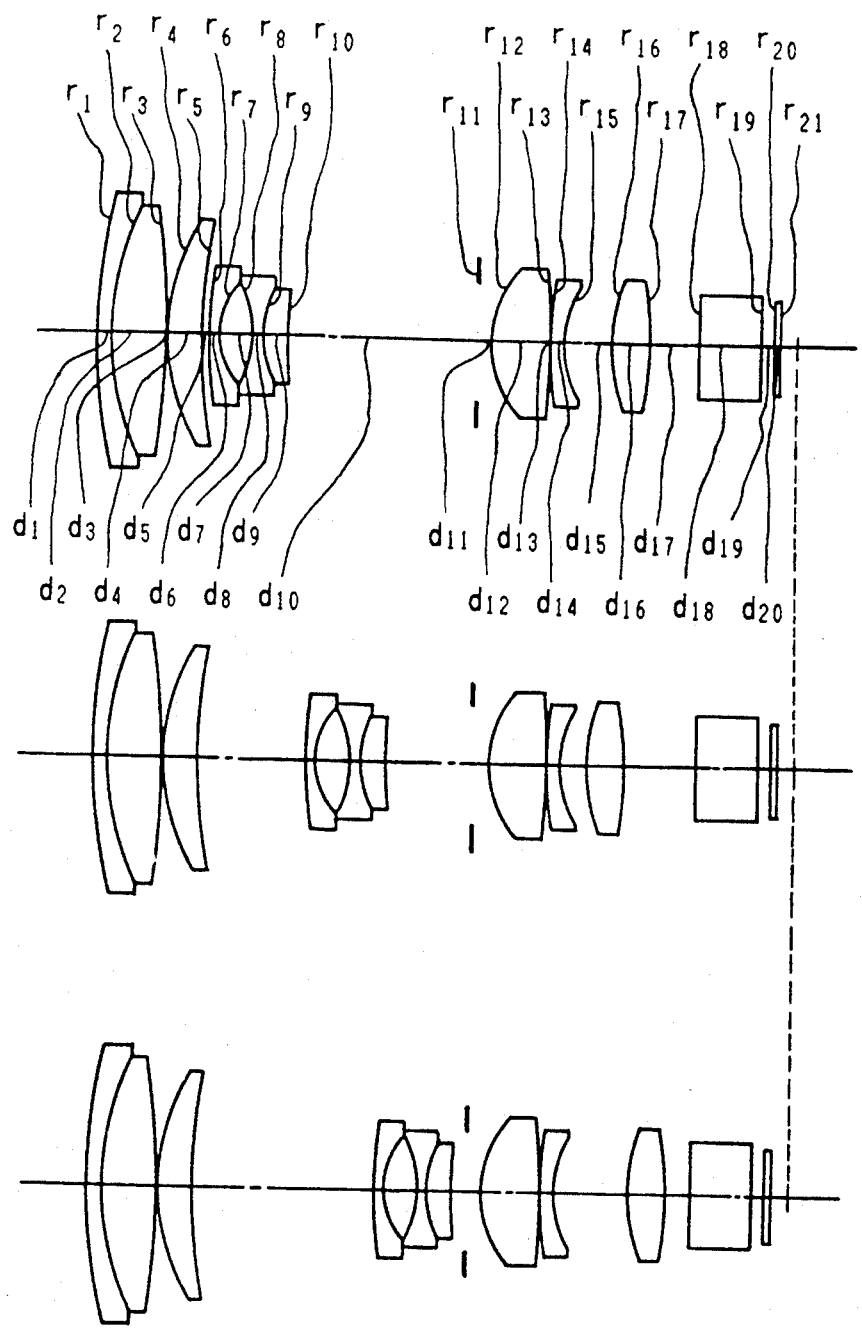

The Embodiment 13 has the composition illustrated in FIG. 13, wherein the third lens unit is composed of a positive lens element and a negative lens element having a strongly concave surface on the image side, whereas the fourth lens unit consists of a positive lens element. In the Embodiment 13, all the lens elements arranged in the third lens unit and the fourth lens unit are made of an unhomogenous medium having a refractive index which is lowered as the portions of said lens elements are farther from the optical axis.

Figure 14:
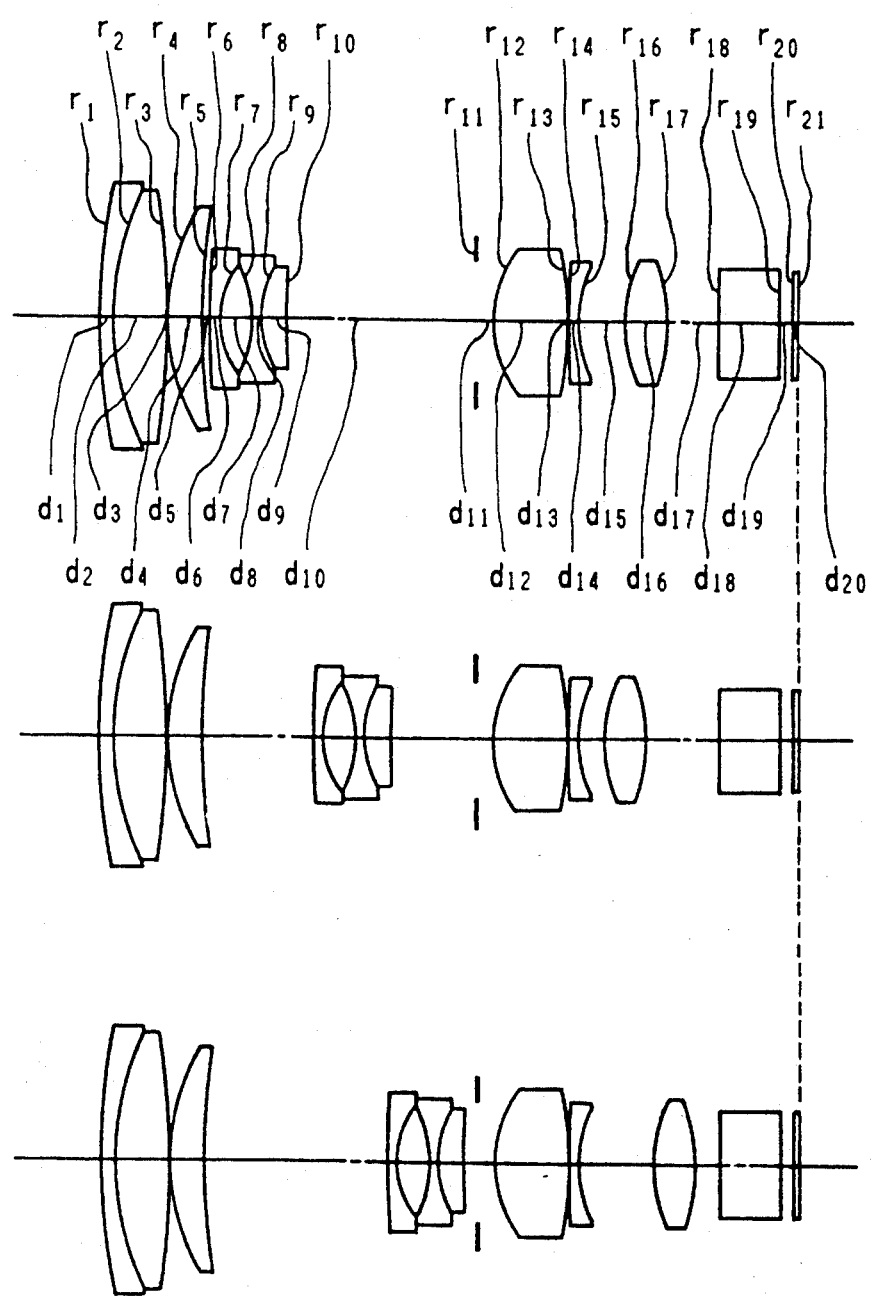

The Embodiment 14 has the composition visualized in FIG. 14, wherein the third lens unit is composed of a positive lens element and a negative lens element having a strongly concave surface on the image side, whereas the fourth lens unit consists of a positive lens element. The positive lens element arranged on the object side in the third lens unit is made of an unhomogenous medium having refractive index which is lowered as the portions of said lens element are farther from the optical axis.

The Embodiment 15 has the composition illustrated in FIG. 15 wherein the third lens unit is composed of a positive lens element and a negative lens element having a strongly concave surface on the image side, whereas the fourth lens unit consists of a positive lens element. The object side surface ($r_{11}$) of the third lens unit and the object side surface ($r_{18}$) of the fourth lens unit are designed as aspherical surfaces having curvature which is lowered as the portions of said aspherical surfaces are farther from the optical axis.

Figure 16:
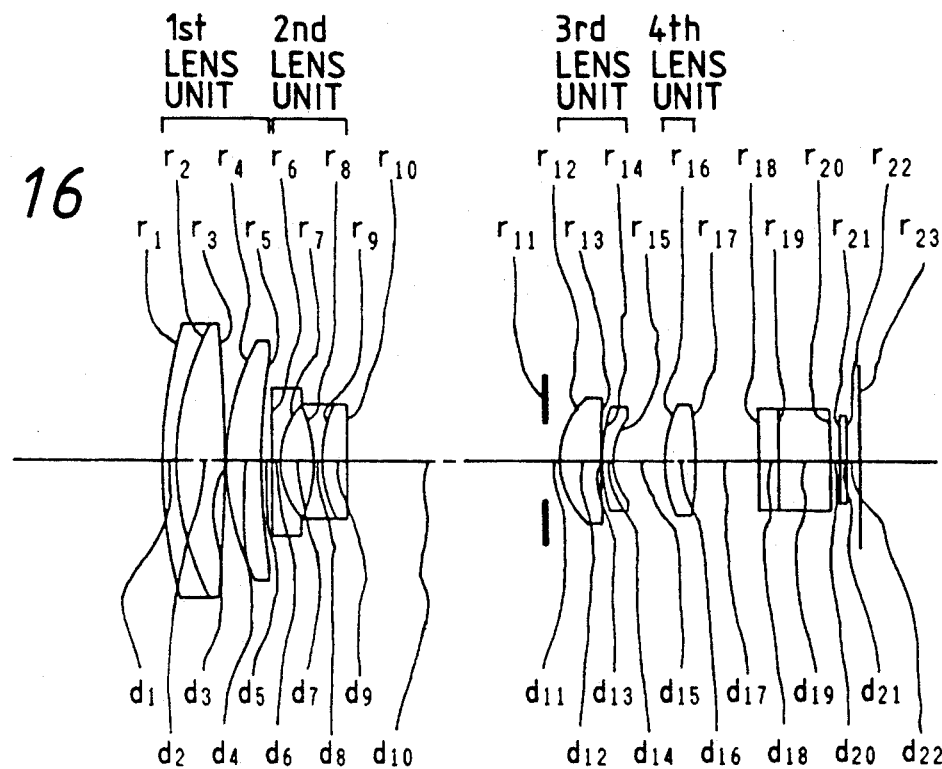

The Embodiment 16 has the composition shown in FIG. 16, wherein the third lens unit consists of a positive lens element and a negative lens element, whereas the fourth lens unit is composed of a single positive lens element. The object side surface ($r_{12}$) of the third lens unit and the object side surface ($r_{22}$) of the fourth lens unit are aspherical surfaces.

Figure 17:
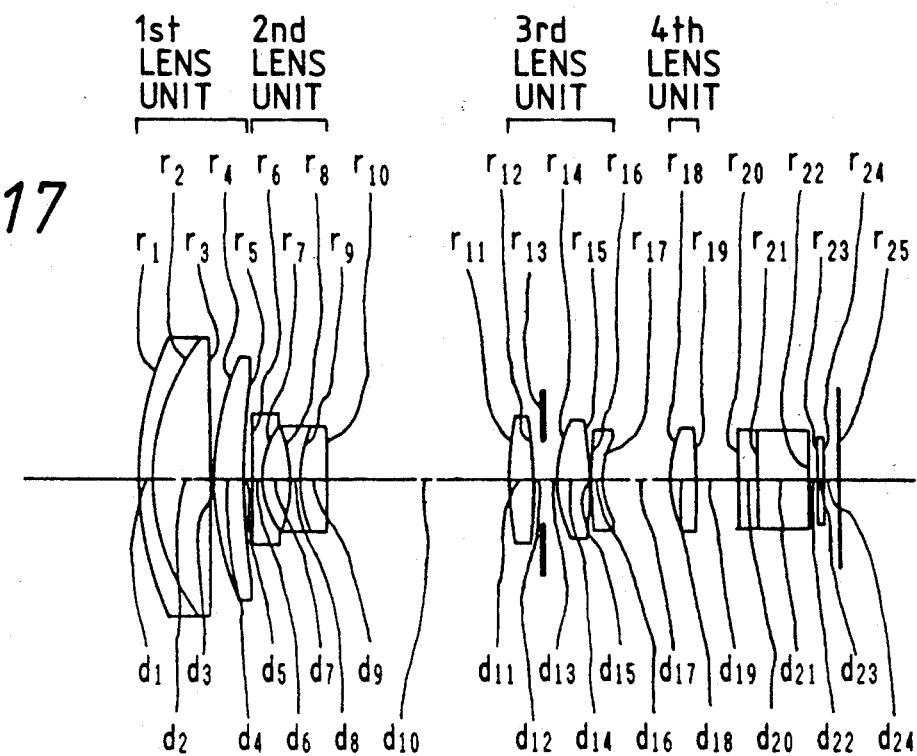

The Embodiment 17 has the composition illustrated in FIG. 17, wherein the third lens unit consists of two positive lens elements and a negative lens element, whereas the fourth lens unit is composed of a positive lens element. The object side surface ($r_{11}$) of the third lens unit and the object side surface ($r_{18}$) of the fourth lens unit are aspherical surfaces.

Figure 18:
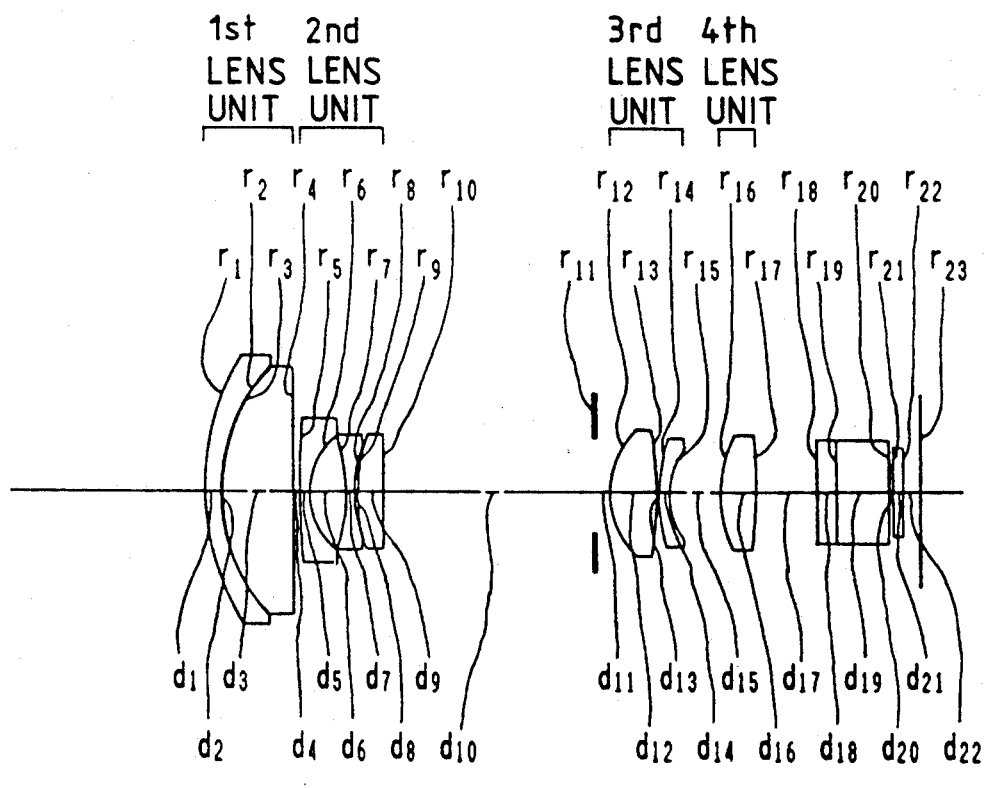

The Embodiment 18 has the composition shown in FIG. 18, wherein the third lens unit consists of a positive lens element and a negative lens element, whereas the fourth lens unit is composed of a positive lens element. The object side surface ($r_{12}$) of the third lens unit and the object side surface ($r_{16}$) of the fourth lens unit are aspherical surfaces.

Figure 19:
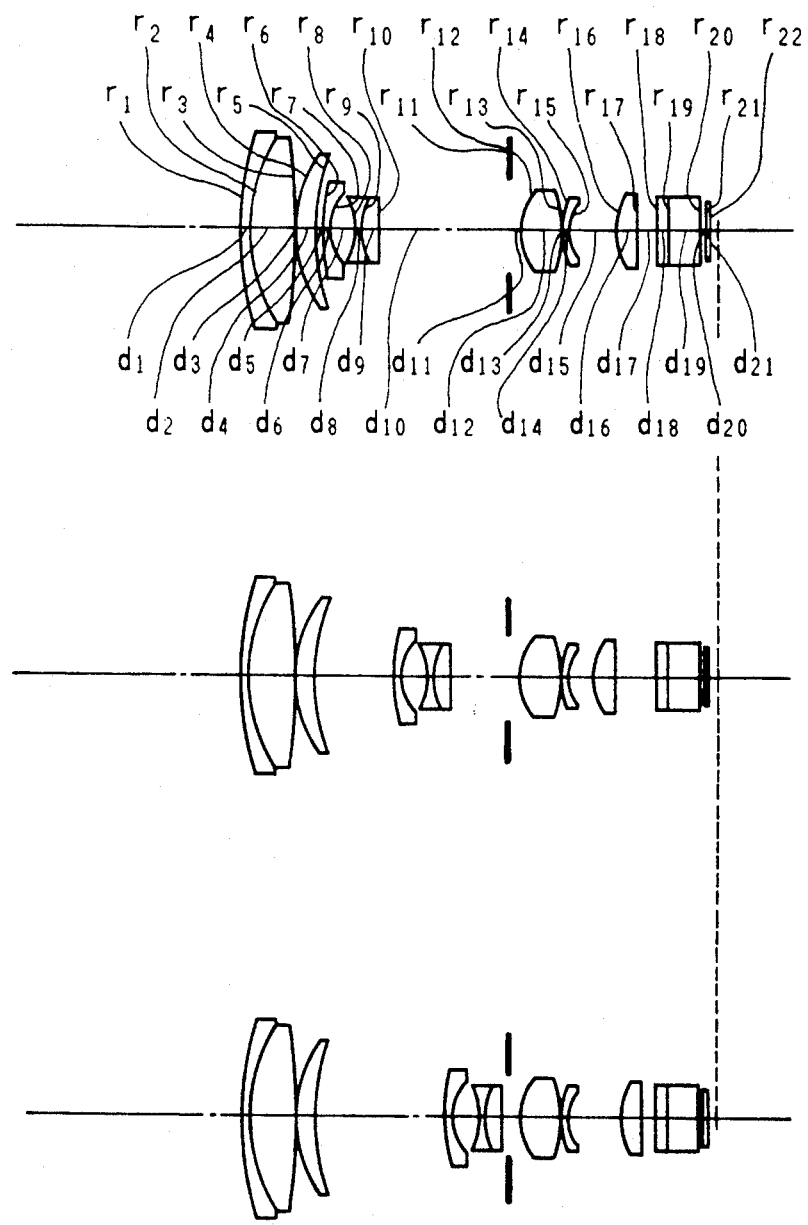
Figure 20:
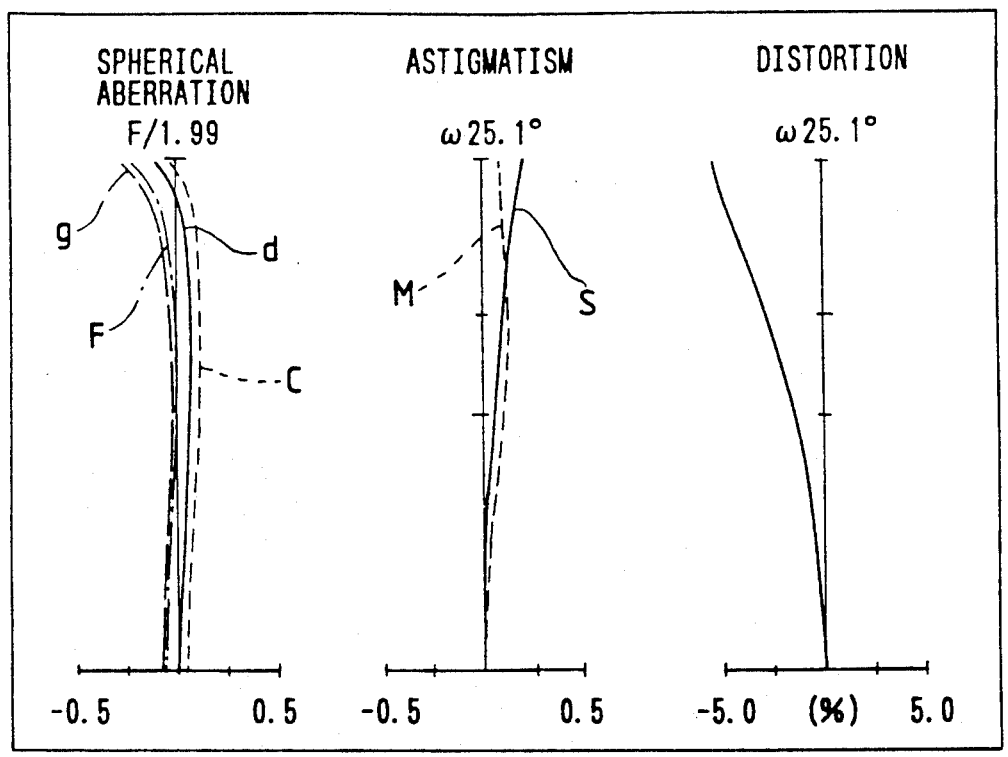
FIG. 20, FIG. 21 and FIG. 22 show graphs illustrating aberration characteristics at the wide position, intermediate focal length and tele position respectively of the Embodiment 1 of the present invention.
Figure 21:
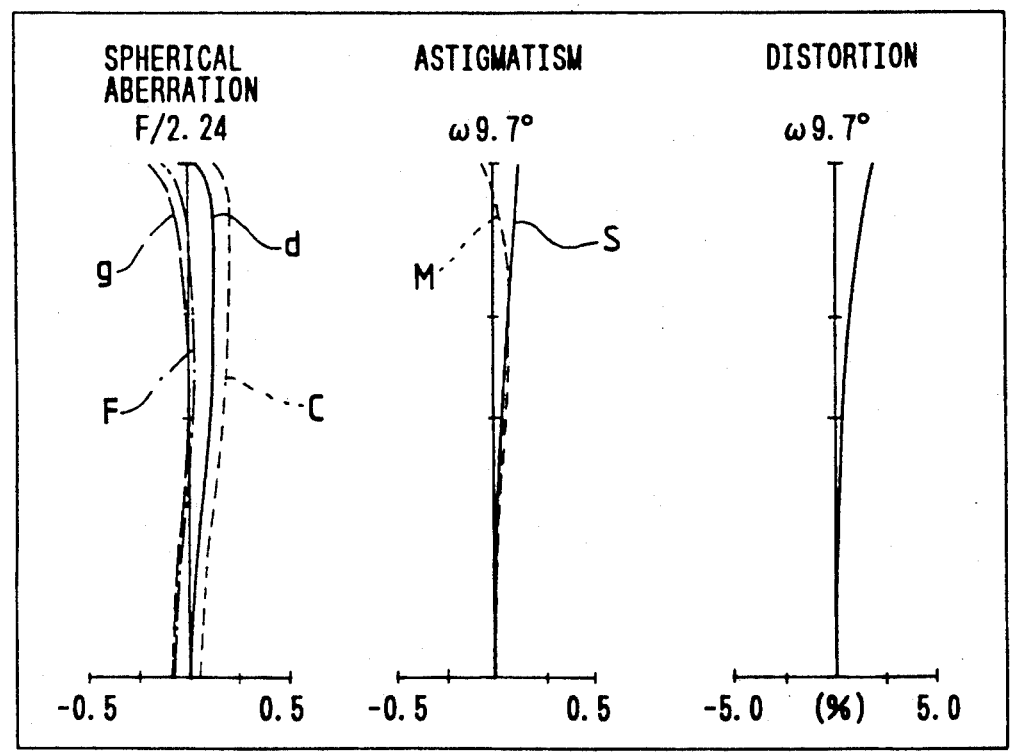
Figure 22:
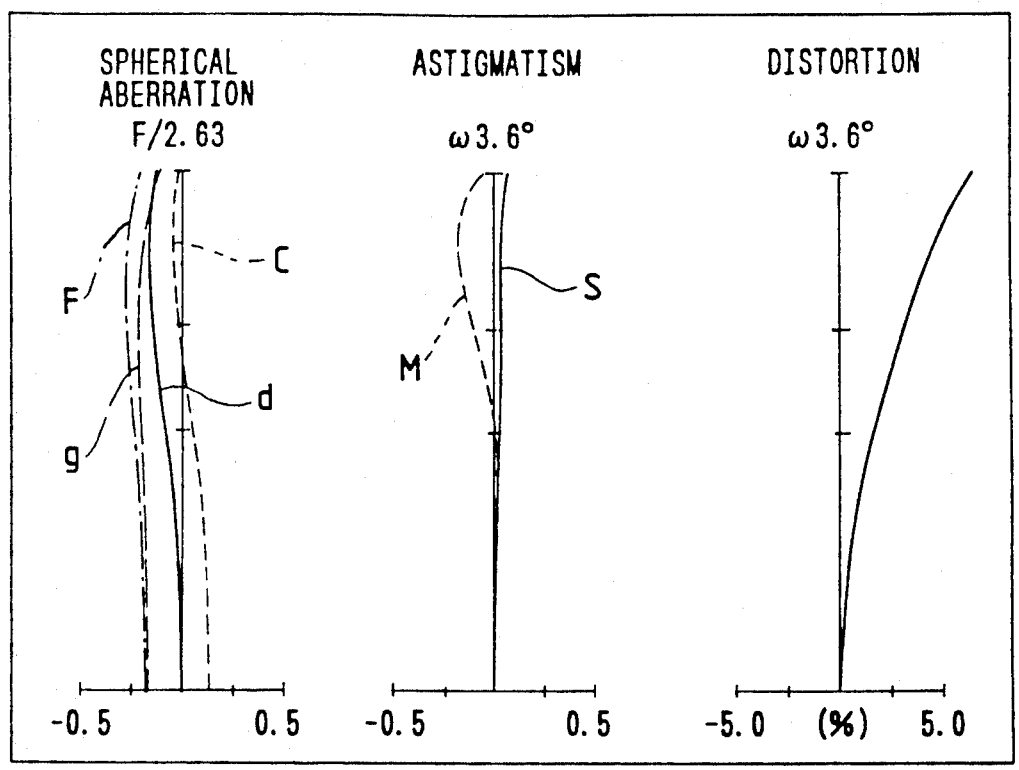
Figure 23:
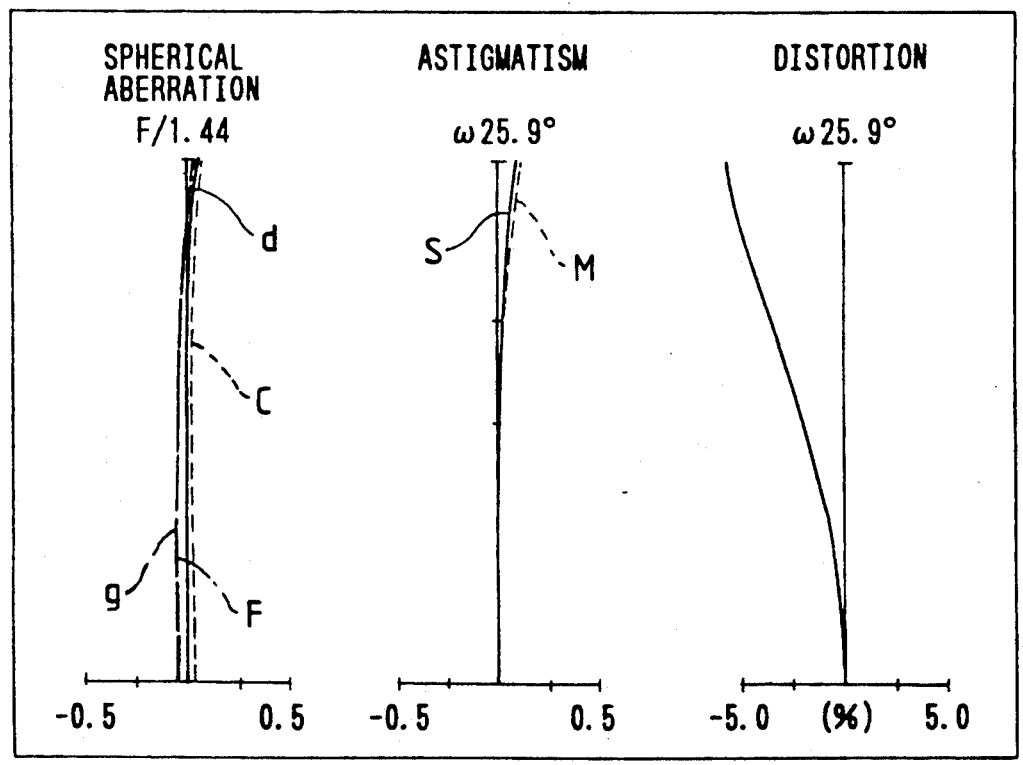
FIG. 23, FIG. 24 and FIG. 25 show graphs illustrating aberration characteristics at the wide position, intermediate focal length and tele position of the Embodiment 2 of the present invention.
Figure 24:
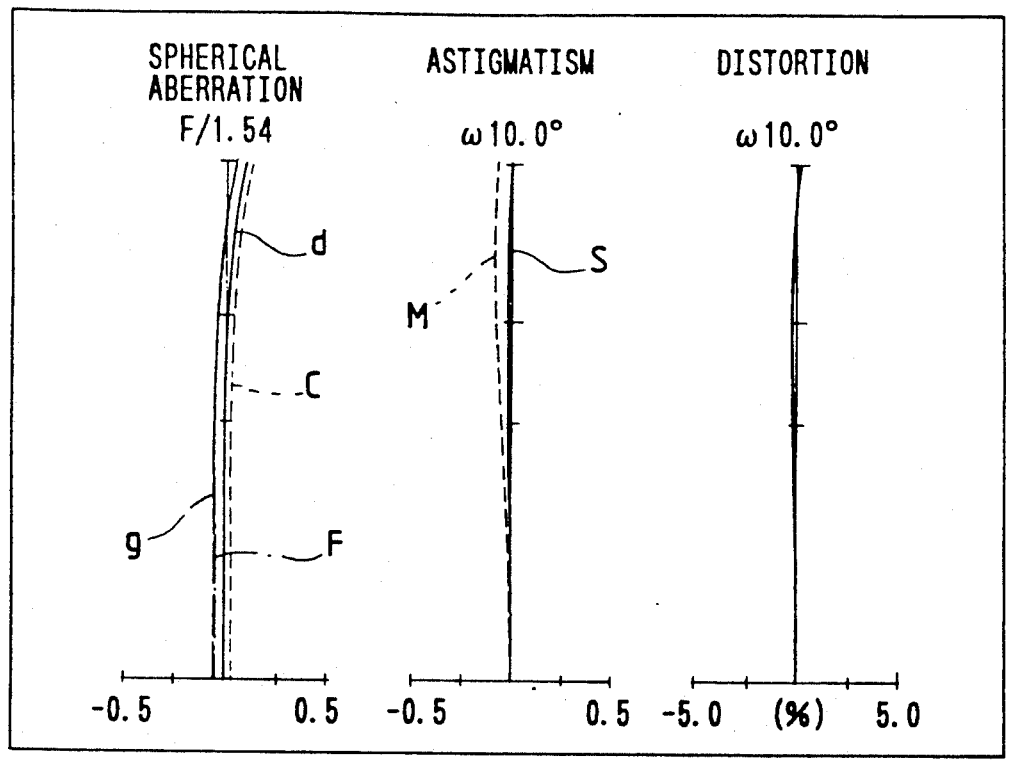
Figure 25:
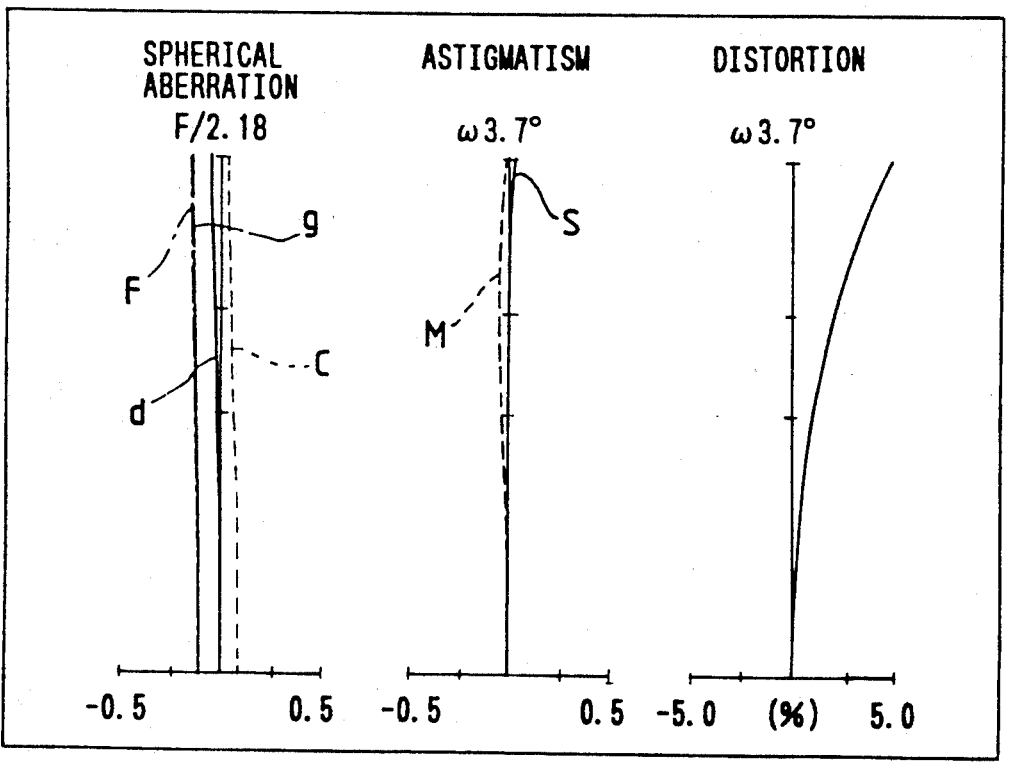
Figure 26:
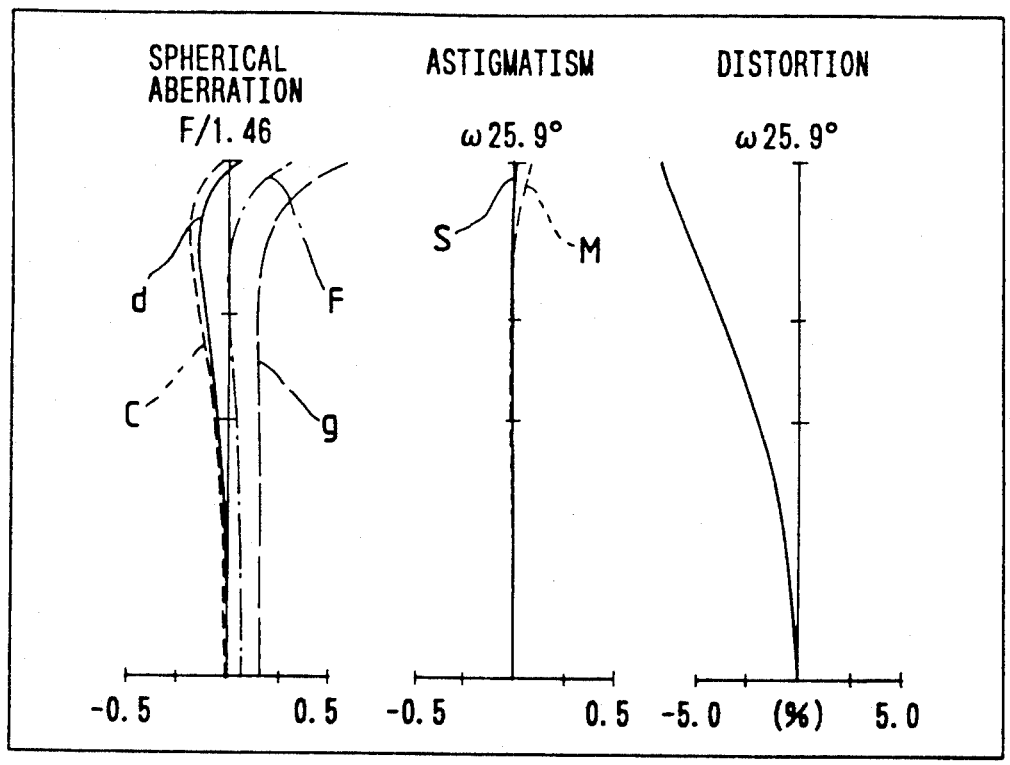
FIG. 26, FIG. 27 and FIG. 28 show curves illustrating aberration characteristics at the wide position, intermediate focal length and tele position respectively of the Embodiment 3 of the present invention.
Figure 27:
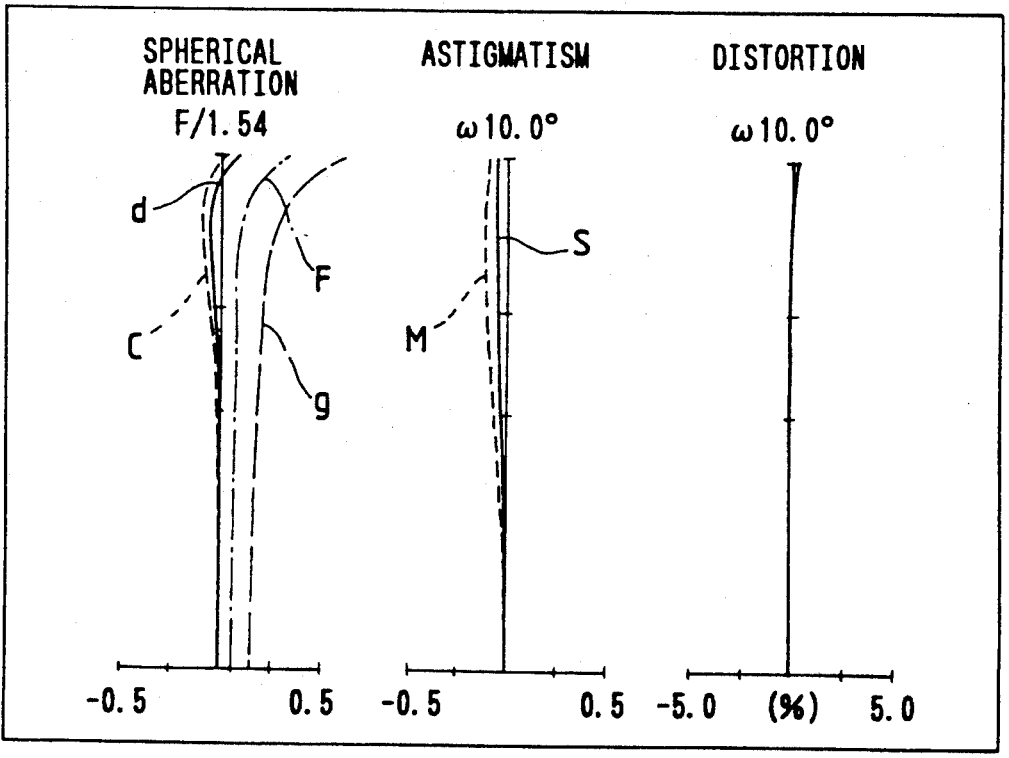
Figure 28:
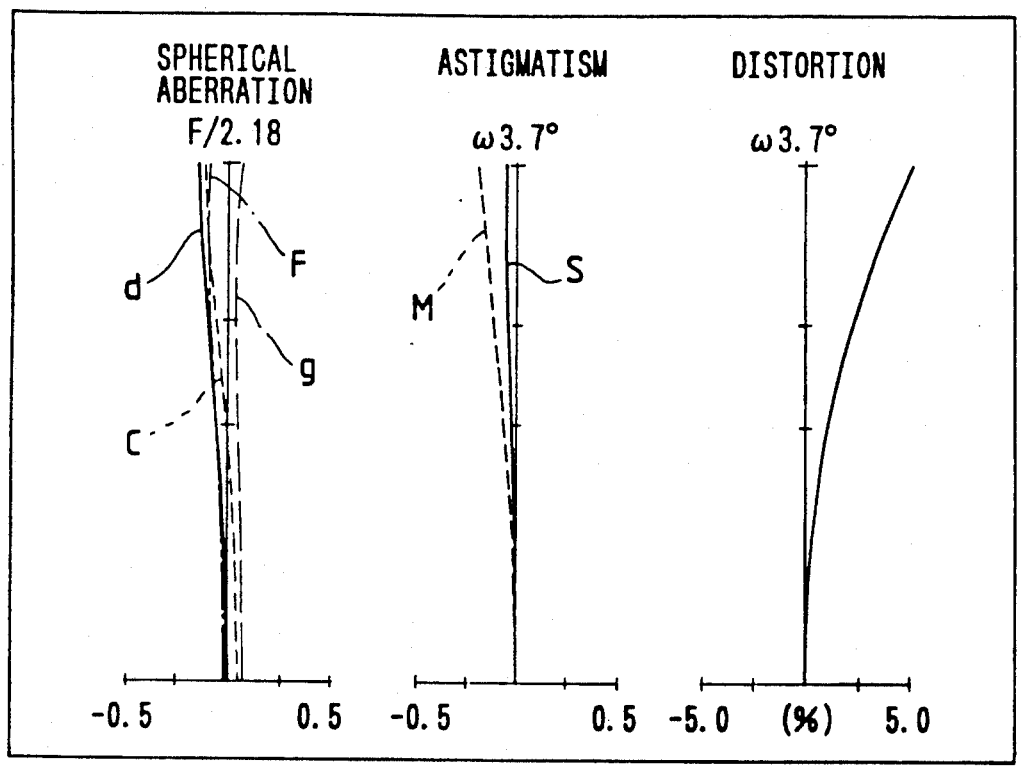
Figure 29:
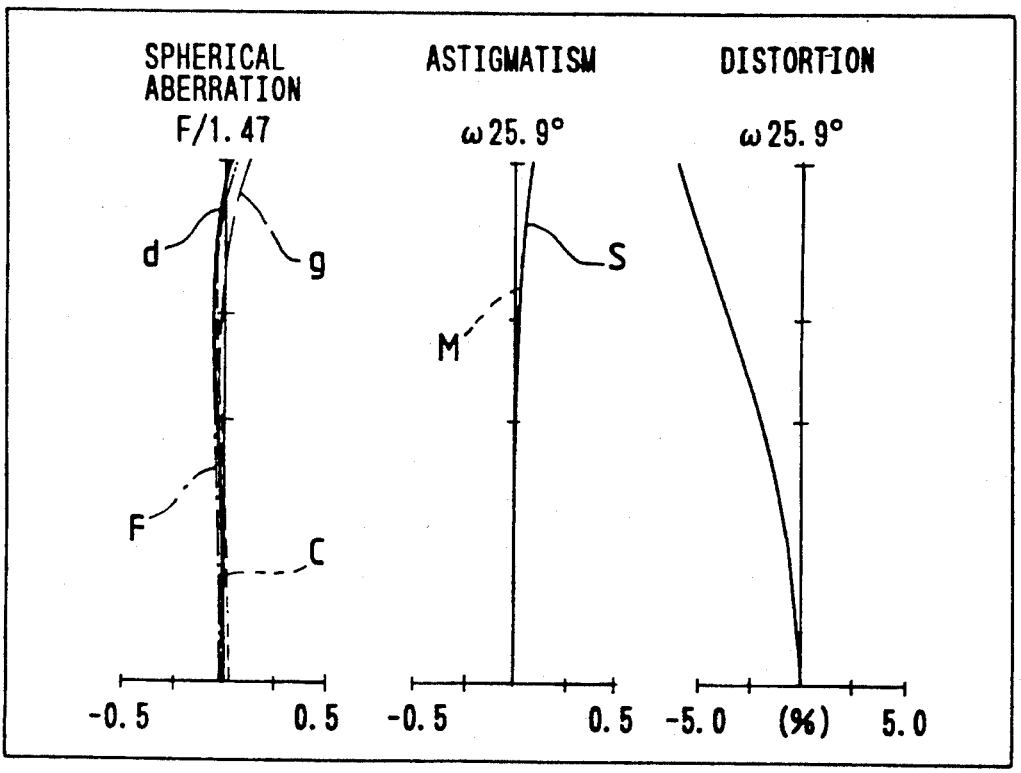
FIG. 29, FIG. 30 and FIG. 31 show curves illustrating aberration characteristics at the wide position, intermediate focal length and tele position respectively of the Embodiment 4 of the present invention.
Figure 30:
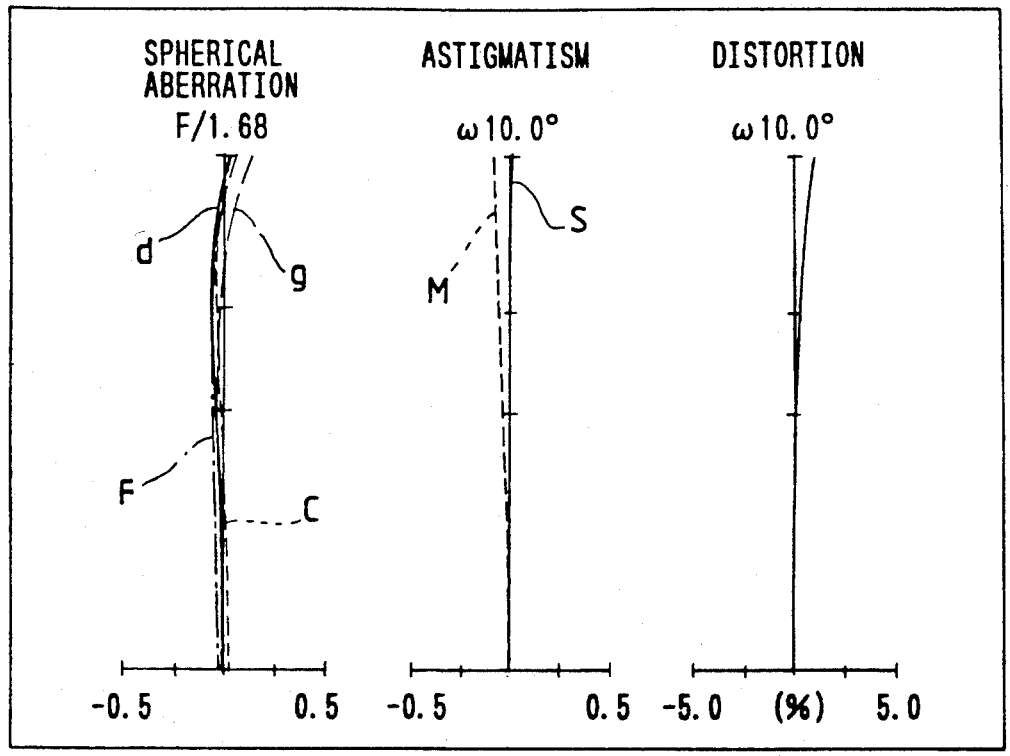
Figure 31:
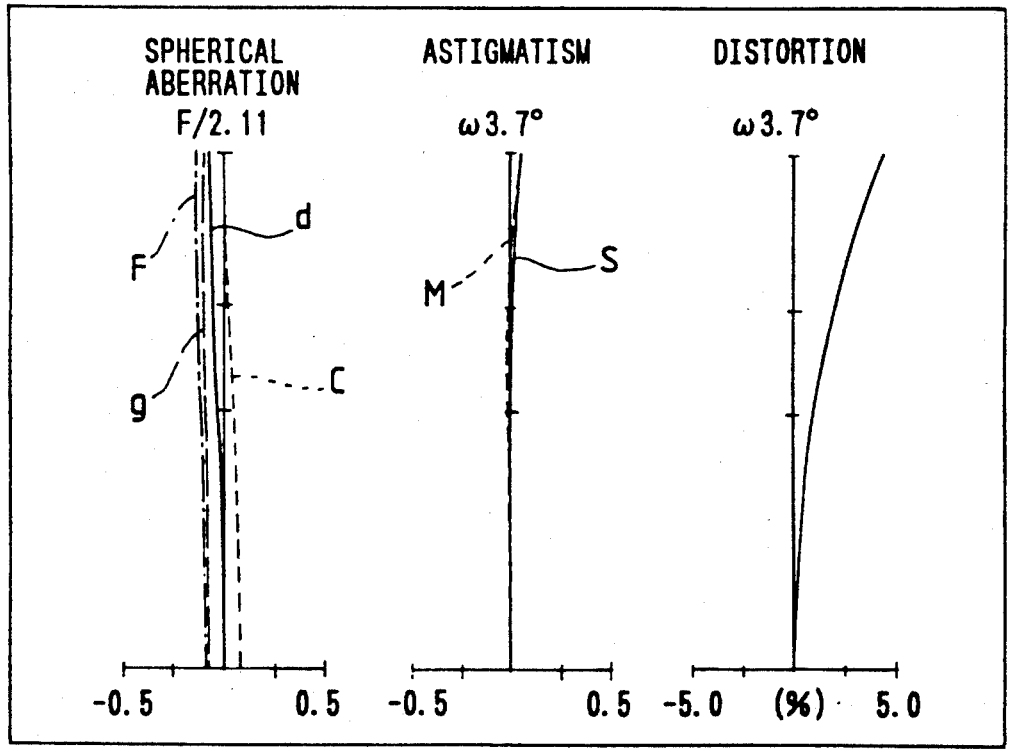
Figure 32:
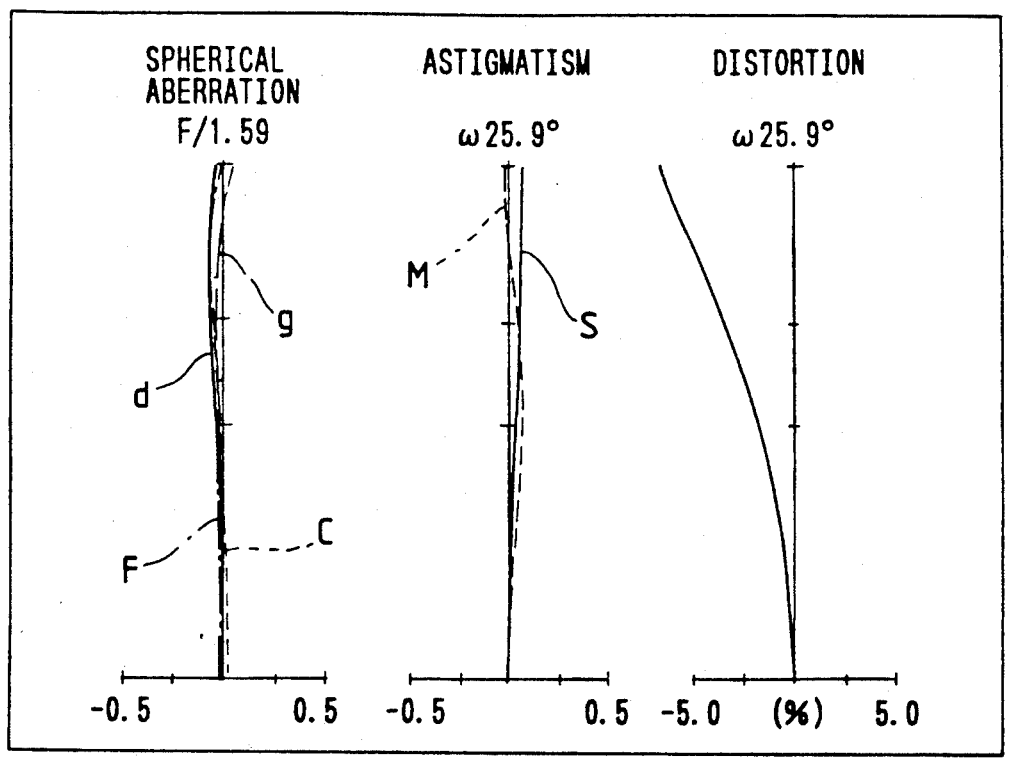
FIG. 32, FIG. 33 and FIG. 34 show graphs visualizing aberration characteristics at the wide position, intermediate focal length and tele position respectively of the Embodiment 5 of the present invention.
Figure 33:
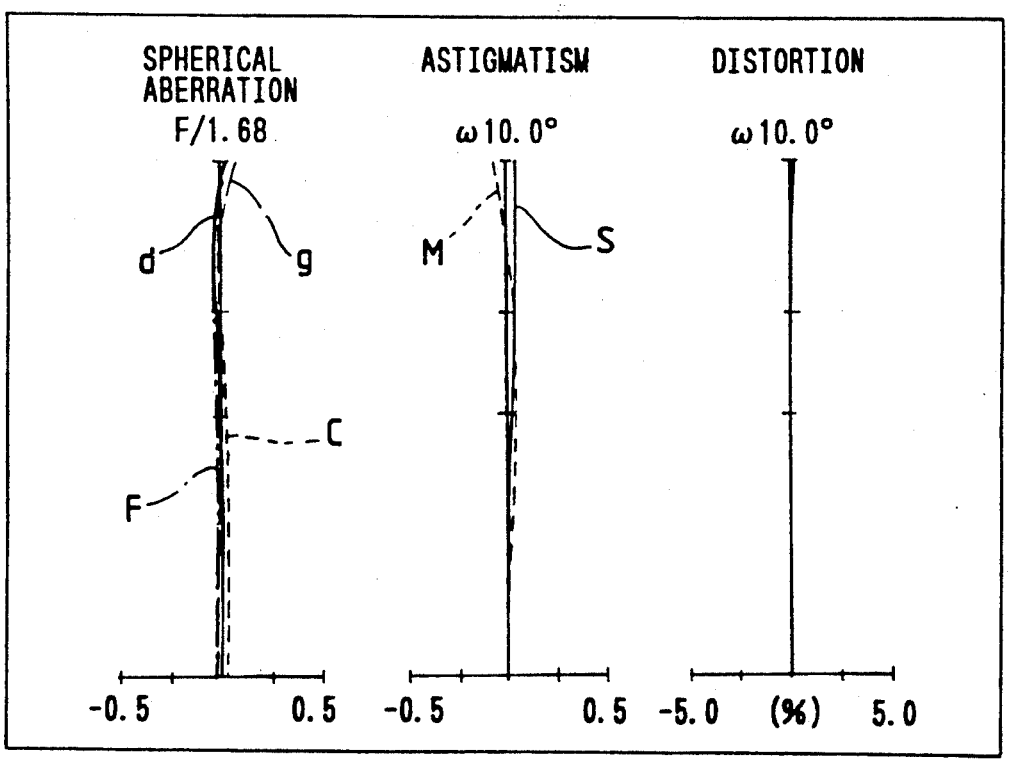
Figure 34:
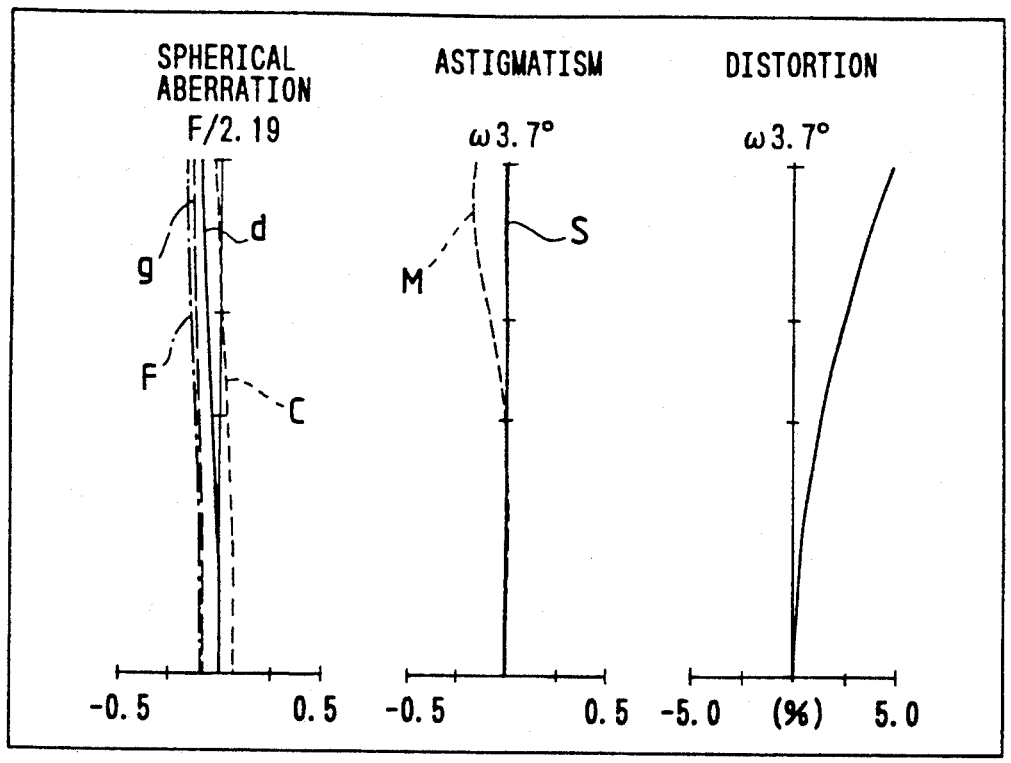
Figure 35:
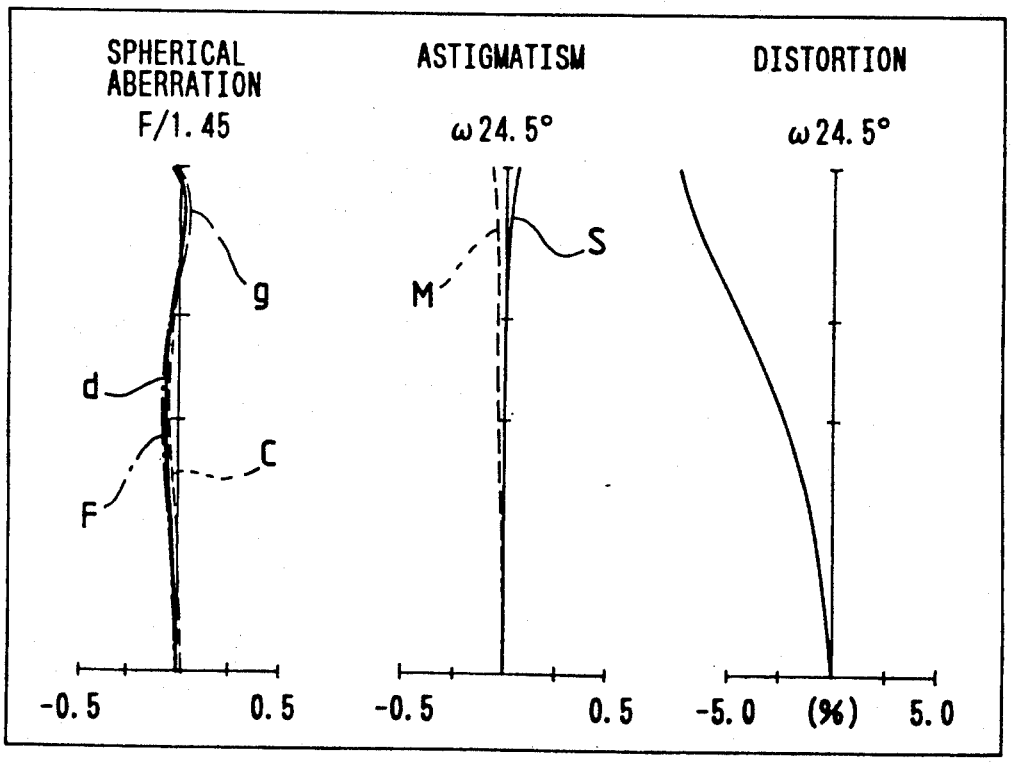
FIG. 35, FIG. 36 and FIG. 37 show curves visualizing aberration characteristics at the wide position, intermediate focal length and tele position respectively of the Embodiment 6 of the present invention.
Figure 36:
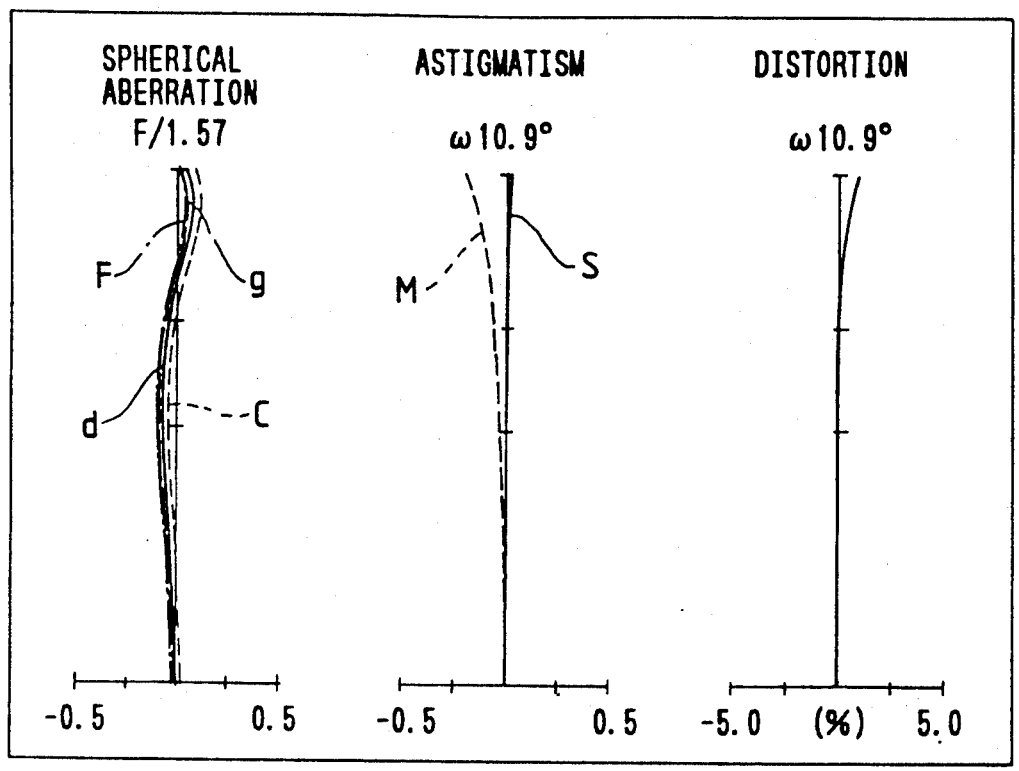
Figure 37:
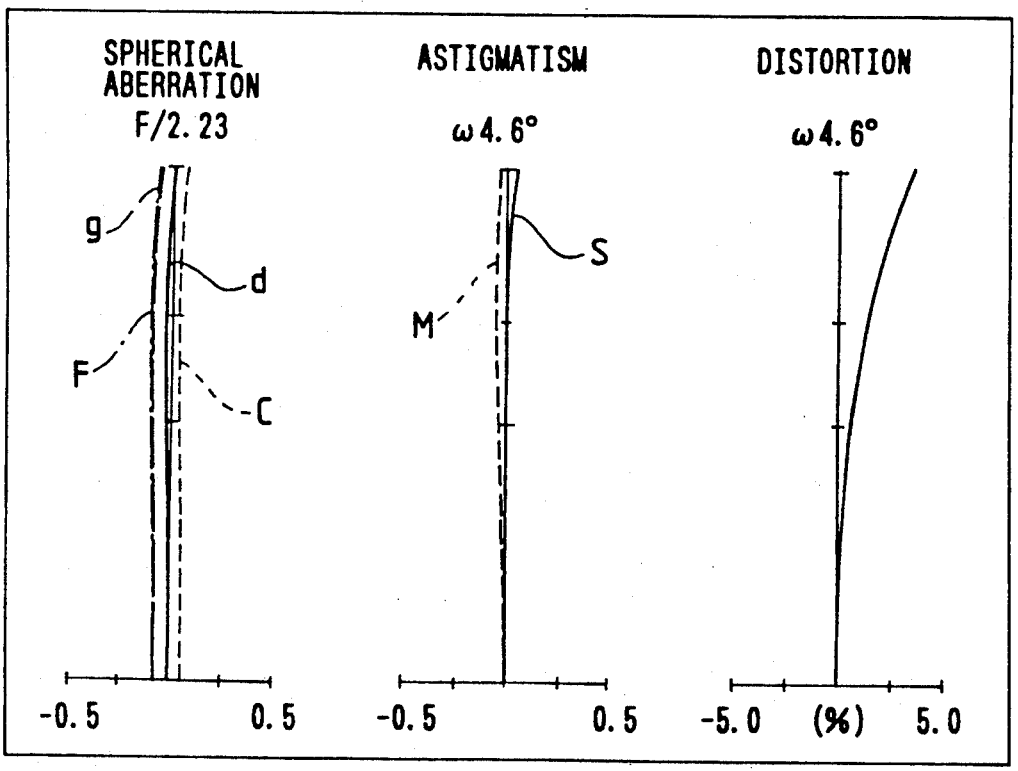
Figure 38:
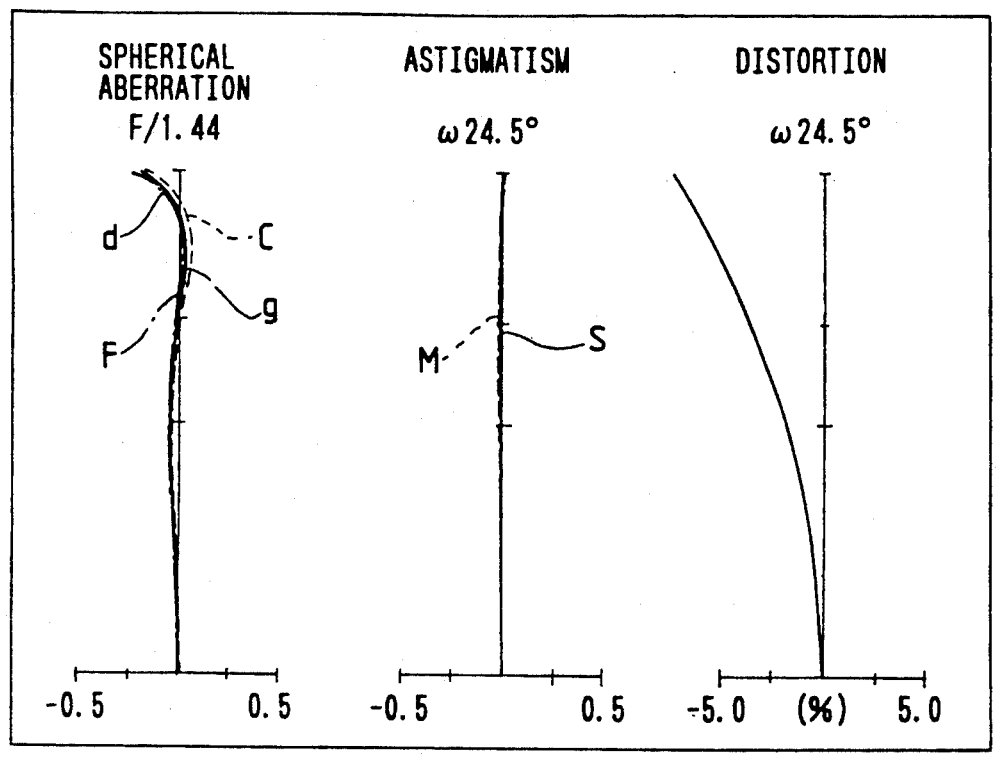
FIG. 38, FIG. 39 and FIG. 40 show graphs illustrating aberration characteristics at the wide position, intermediate foal length and tele position respectively of the Embodiment 7 of the present invention.
Figure 39:
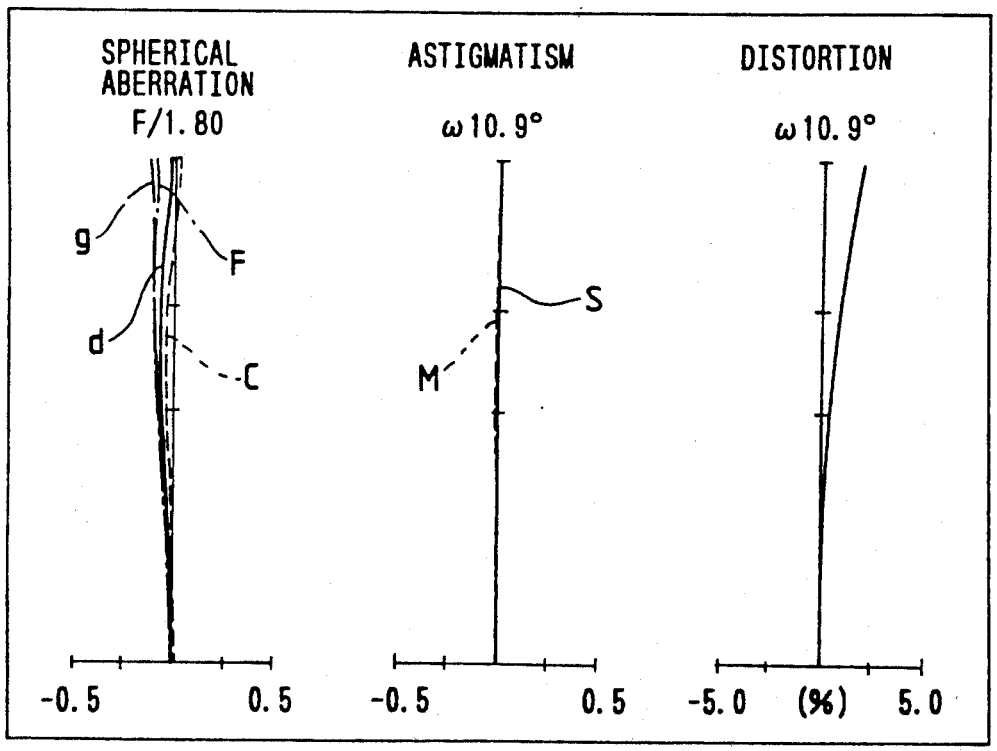
Figure 40:
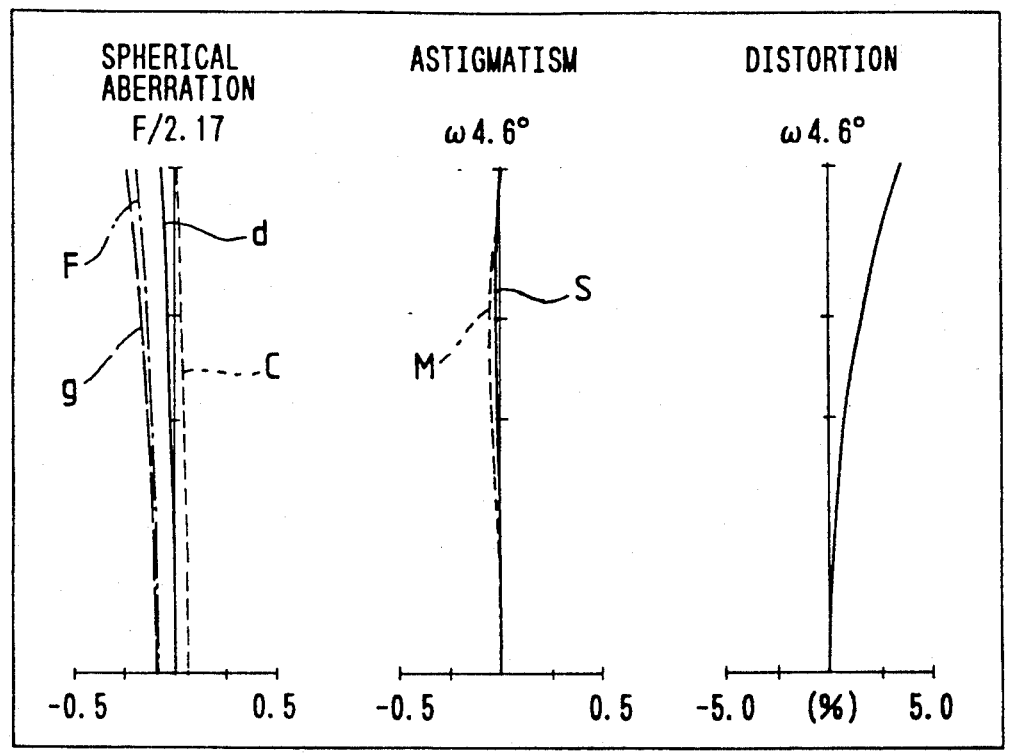
Figure 41:
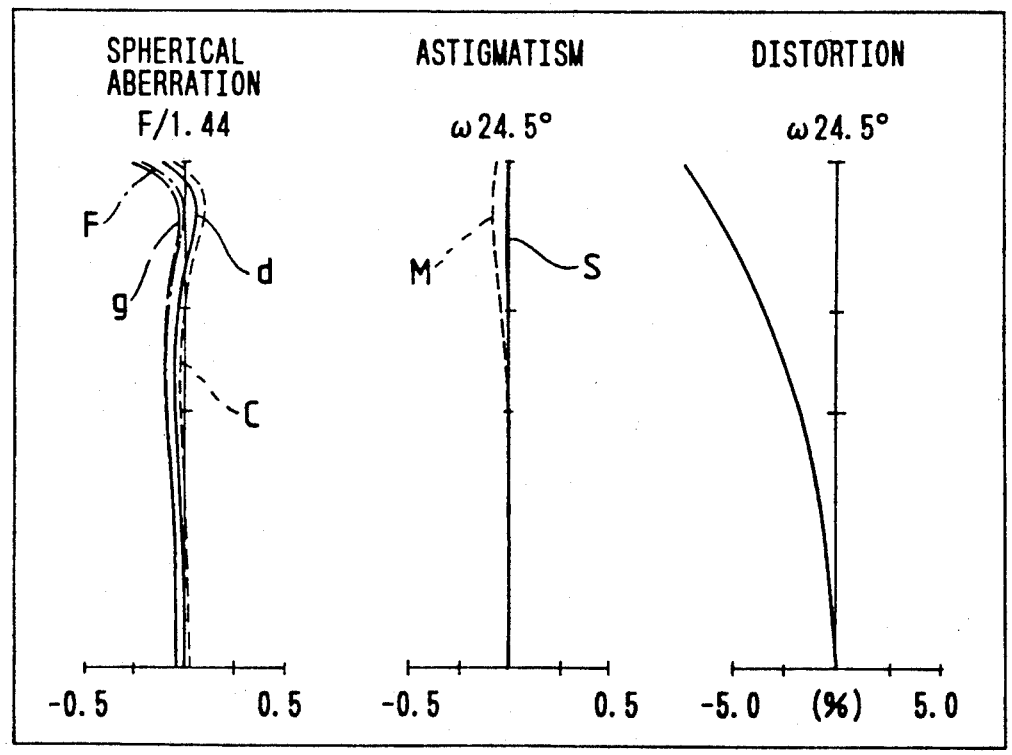
FIG. 41, FIG. 42 and FIG. 43 show graphs illustrating aberration characteristics at the wide position, intermediate focal length and tele position respectively of the Embodiment 8 of the present invention.
Figure 42:
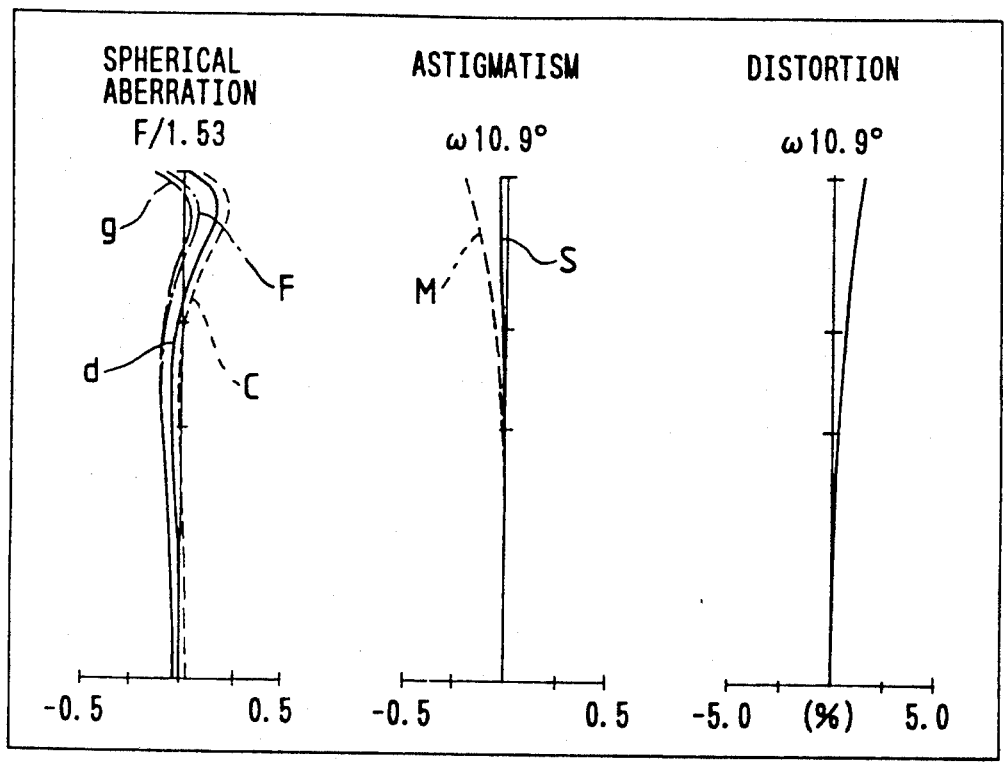
Figure 43:
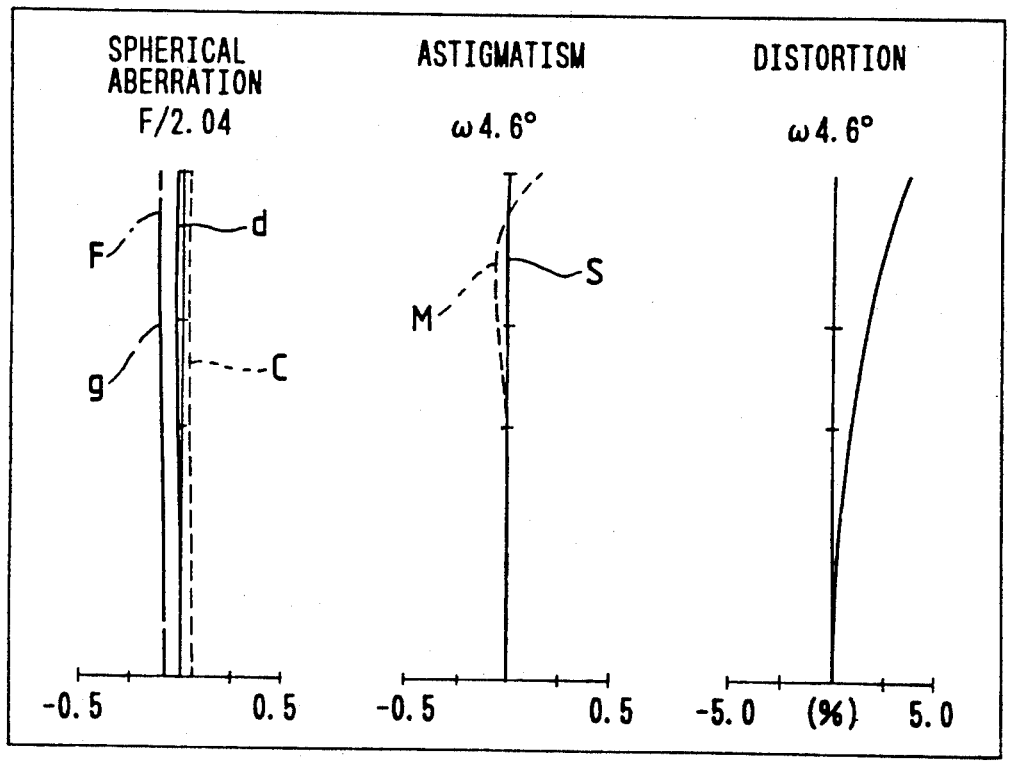
Figure 46:
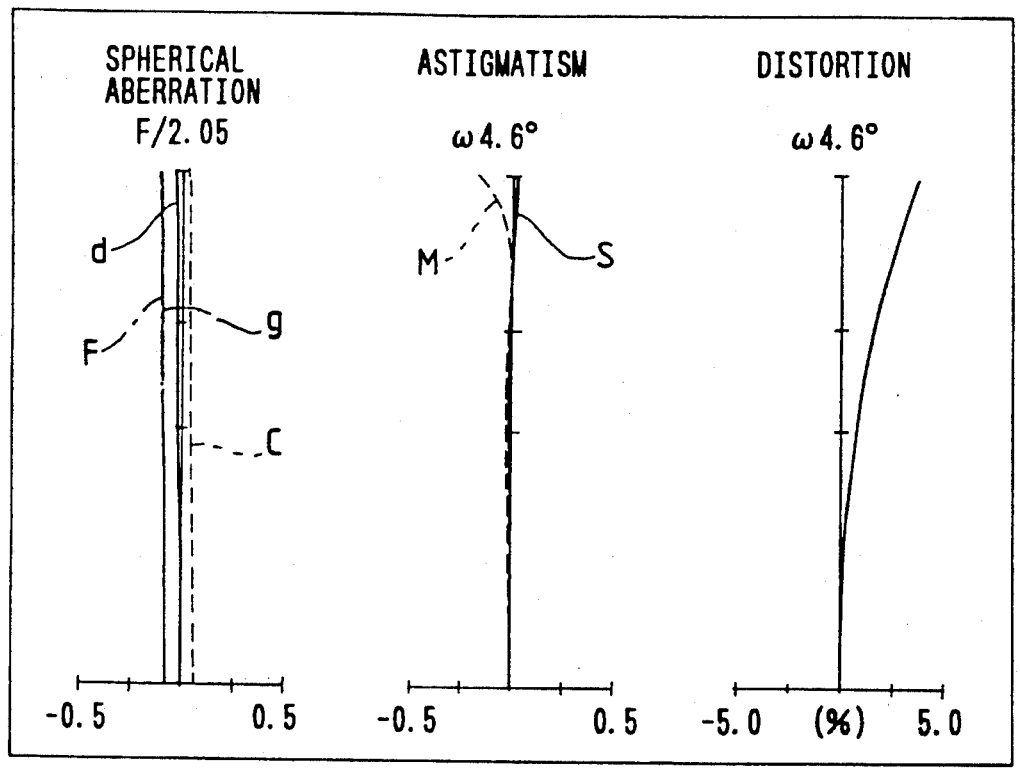
Figure 47:
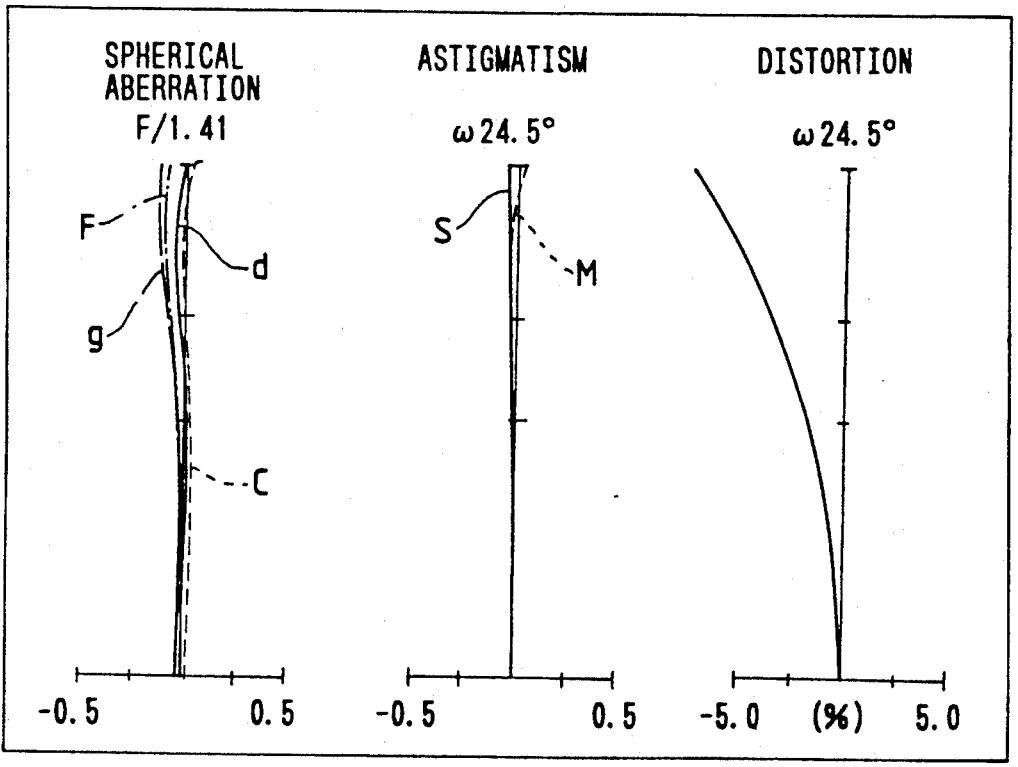
FIG. 47, FIG. 48 and FIG. 49 show graphs visualizing aberration characteristics at the wide position, intermediate focal length and tele position respectively of the Embodiment 10 of the present invention.
Figure 48:
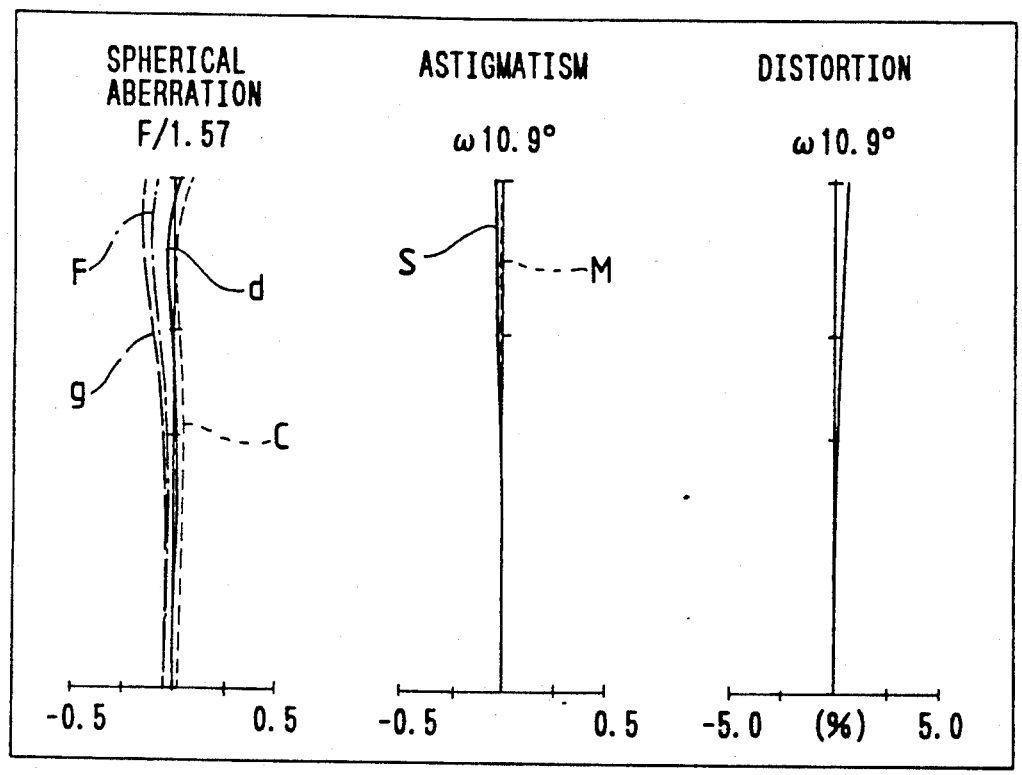
Figure 49:
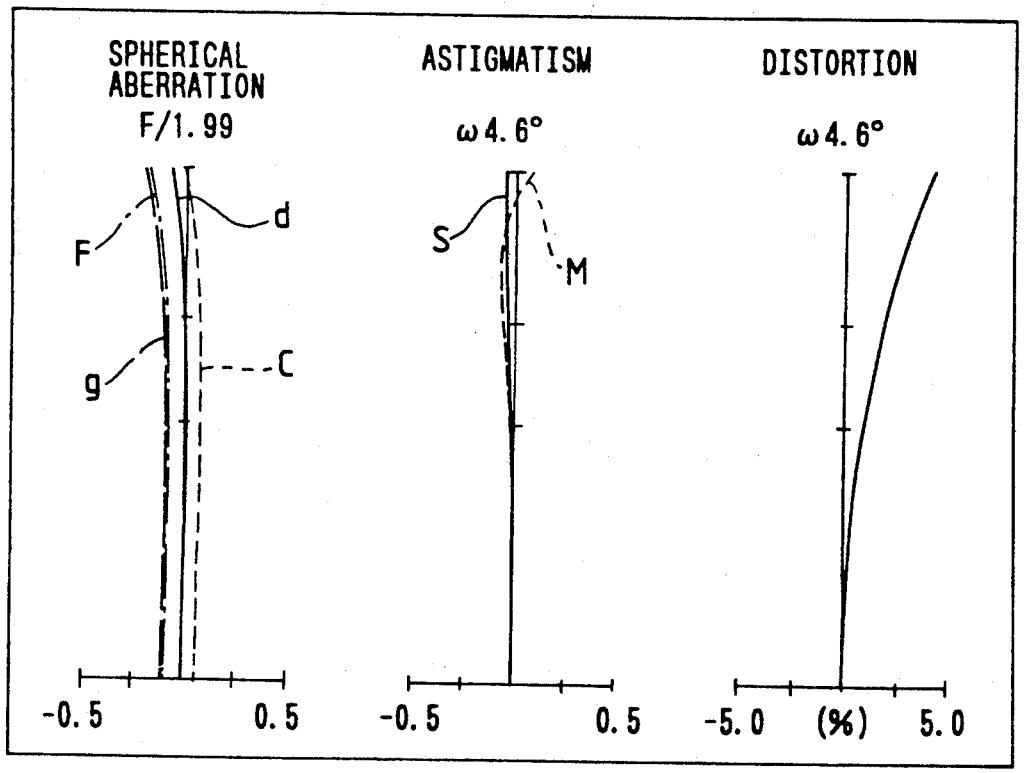
Figure 50:
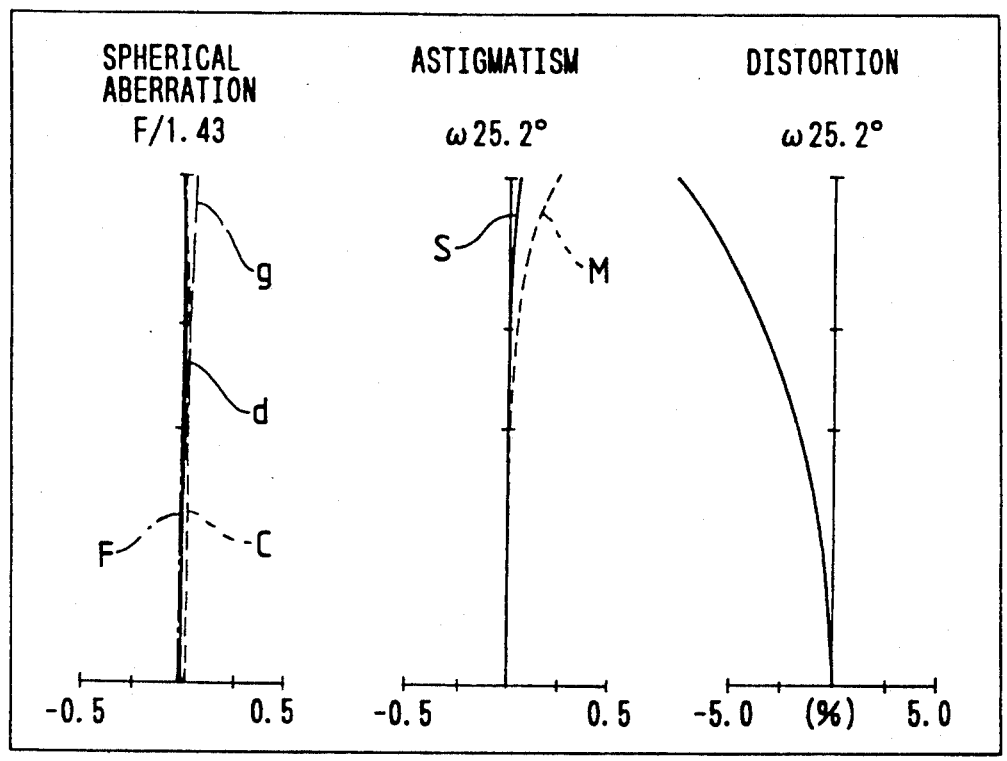
FIG. 50, FIG. 51 and FIG. 52 show curves visualizing aberration characteristics at the wide position, intermediate focal length and tele position respectively of the Embodiment 11 of the present invention.
Figure 51:
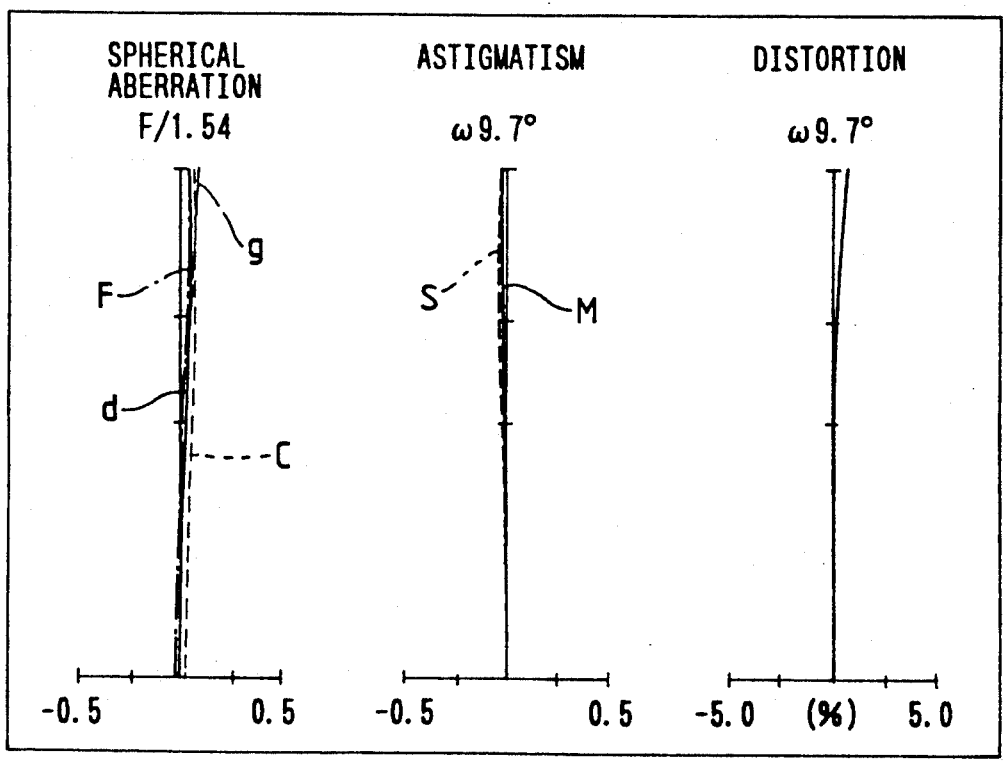
Figure 52:
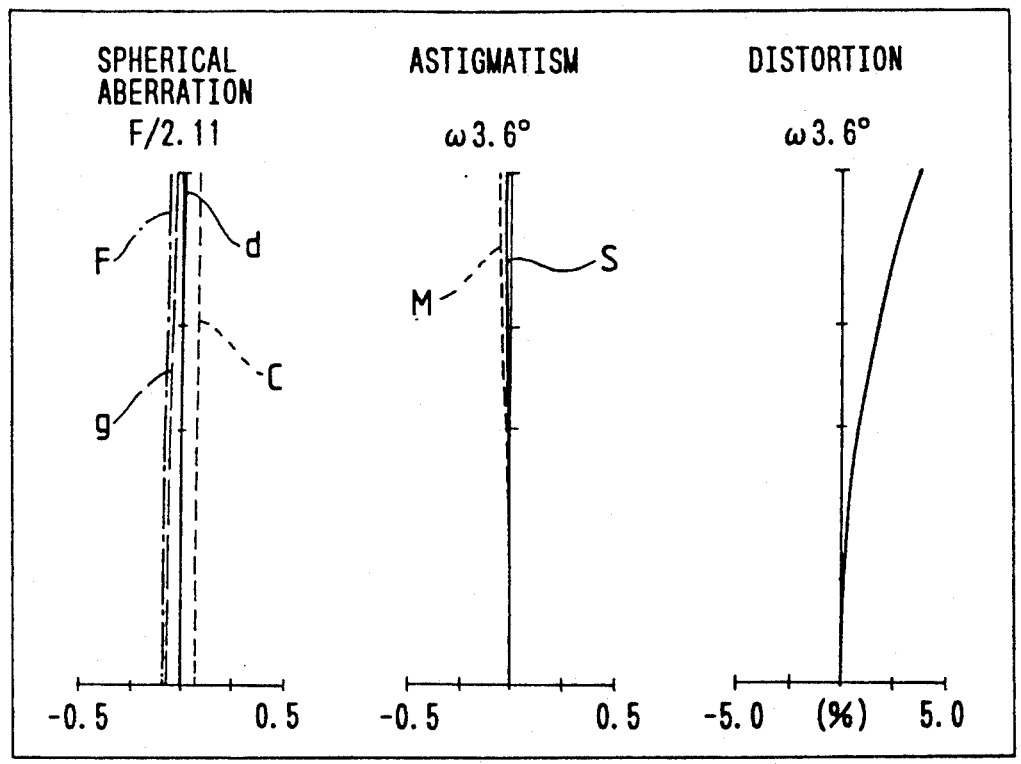
Figure 53:
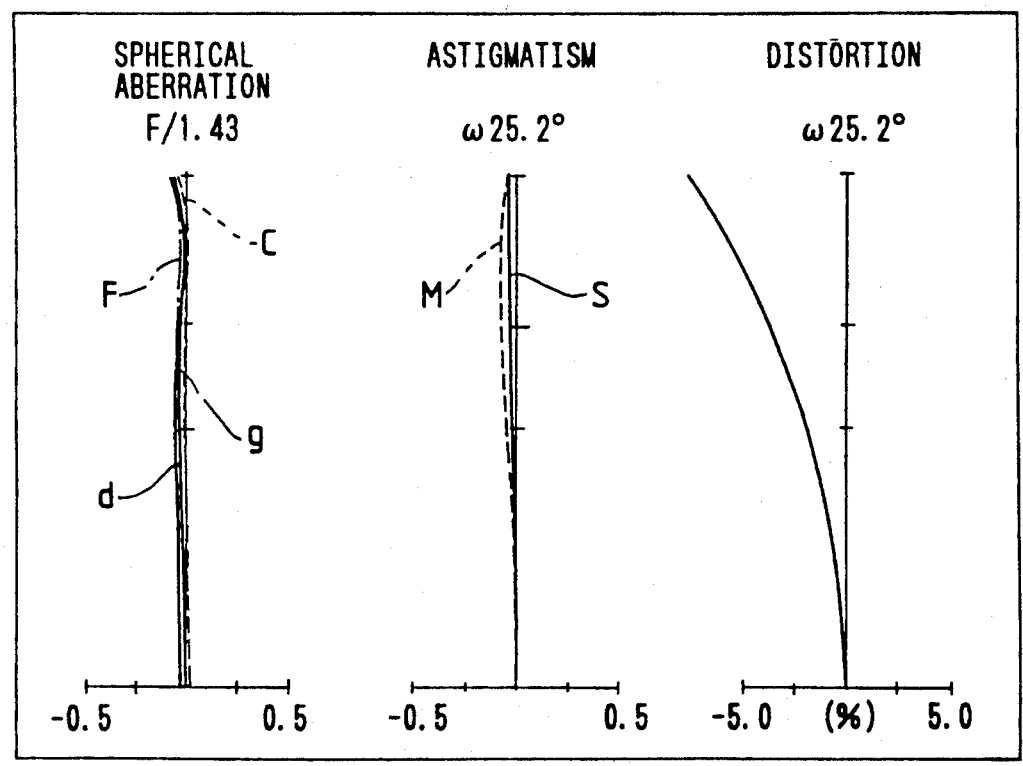
FIG. 53, FIG. 54 and FIG. 55 show graphs visualizing aberration characteristics at the wide position, intermediate focal length and tele position respectively of the Embodiment 12 of the present invention.
Figure 54:
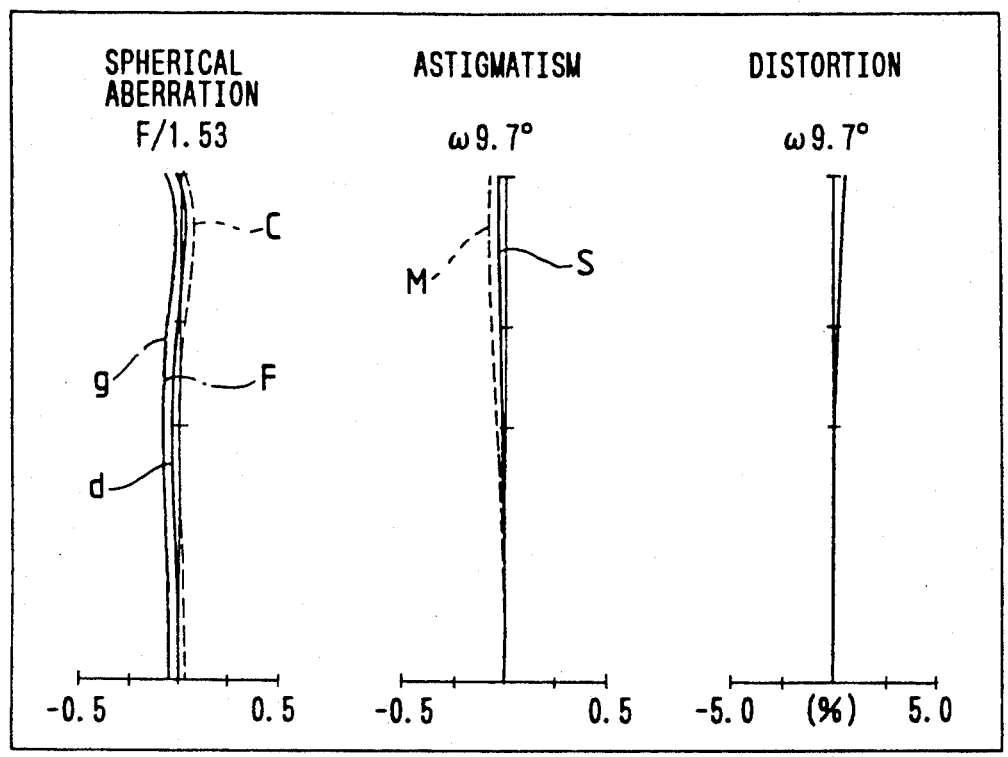
Figure 55:
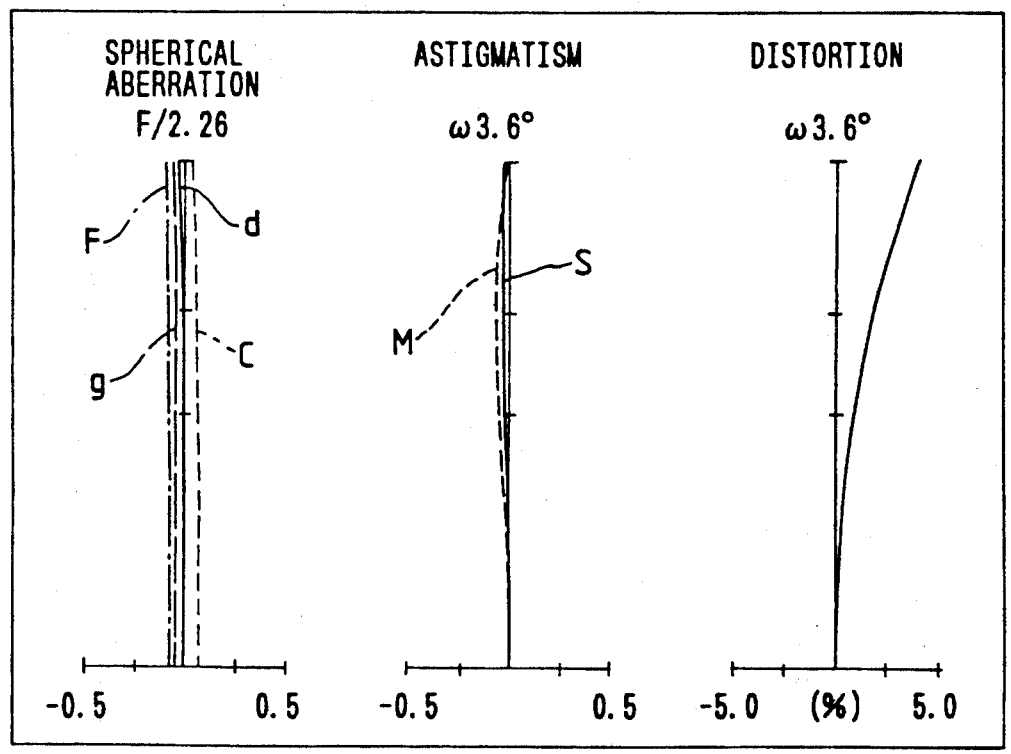
Figure 56:
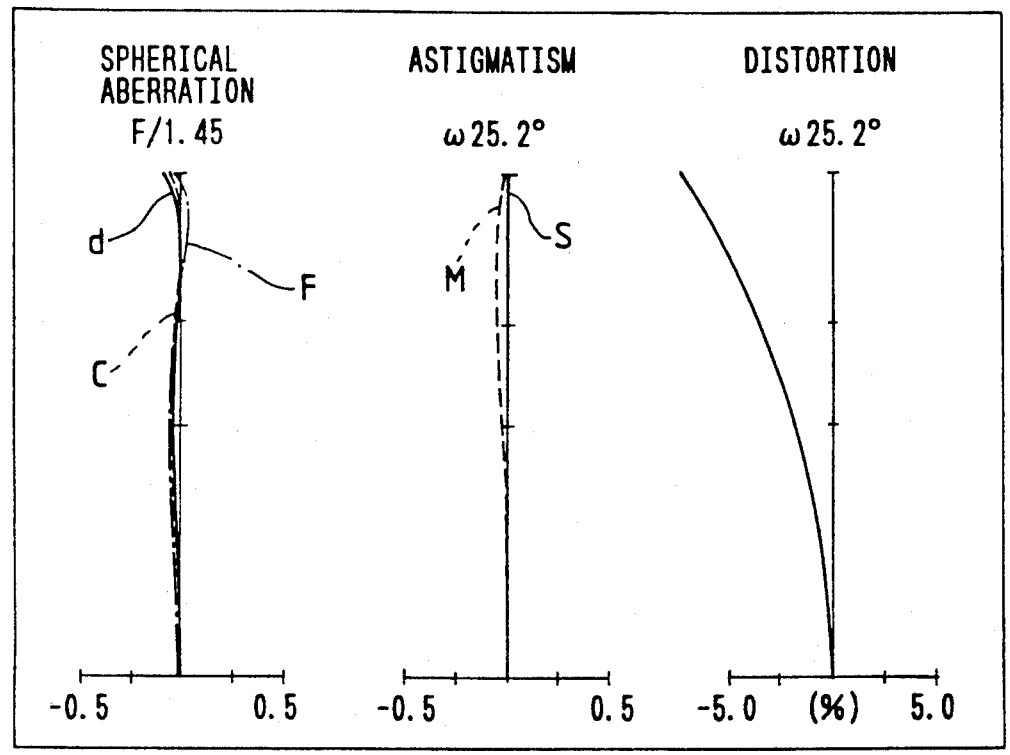
FIG. 56, FIG. 57 and FIG. 58 show graphs illustrating aberration characteristics at the wide position, intermediate focal length and tele position respectively of the Embodiment 13 of the present invention.
Figure 57:
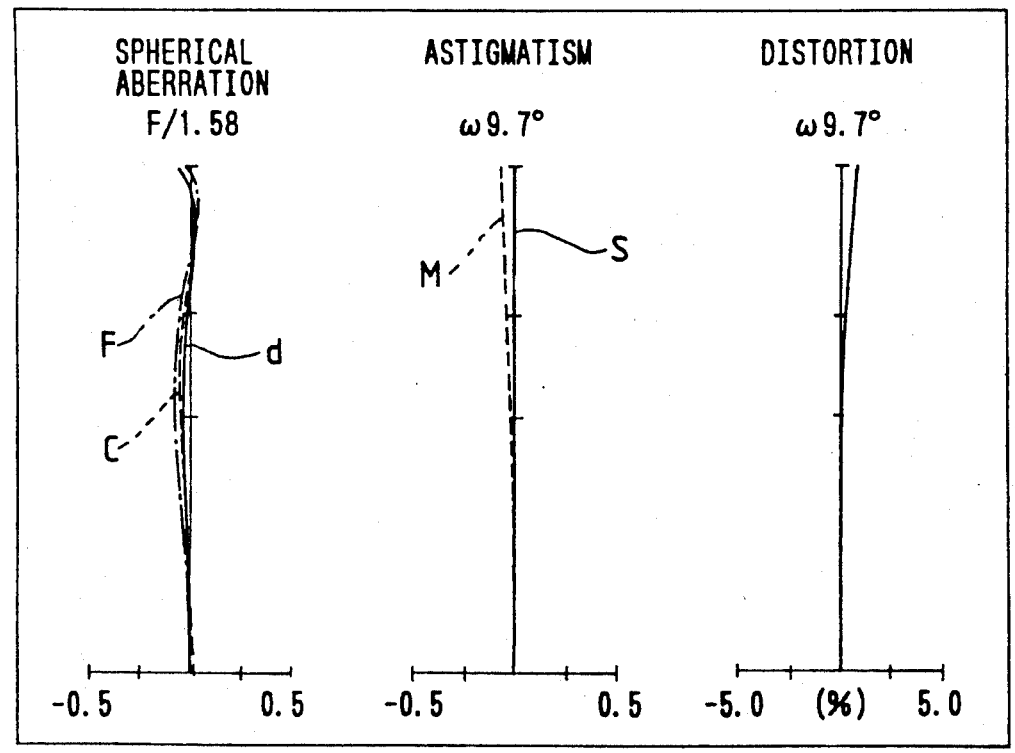
Figure 58:
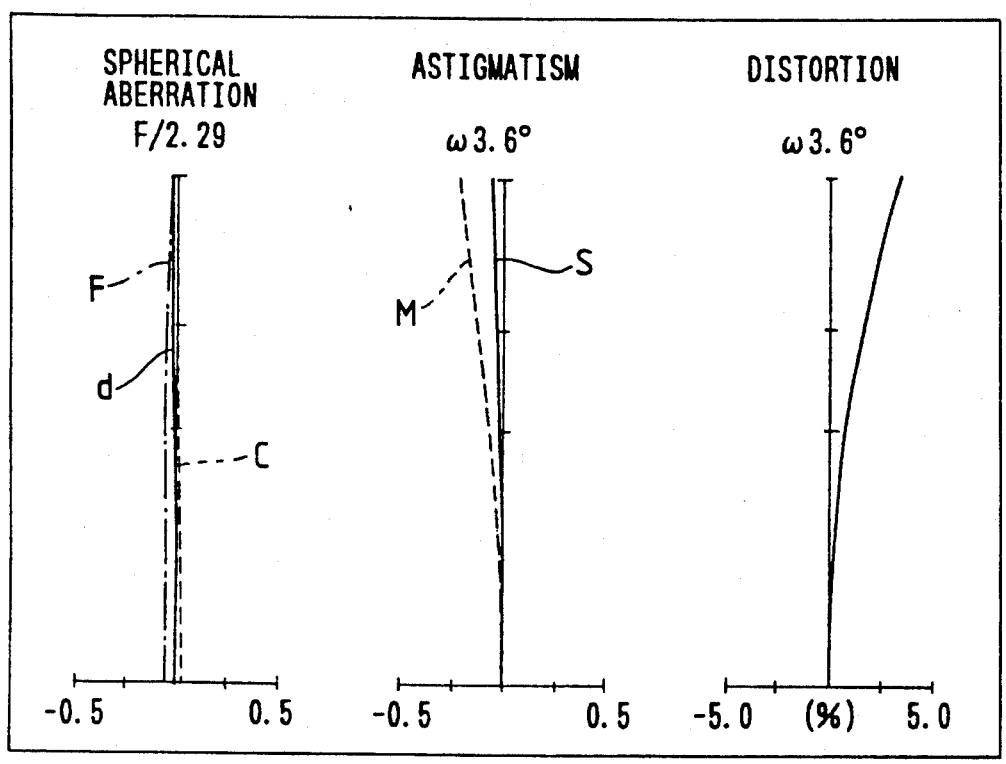
Figure 59:
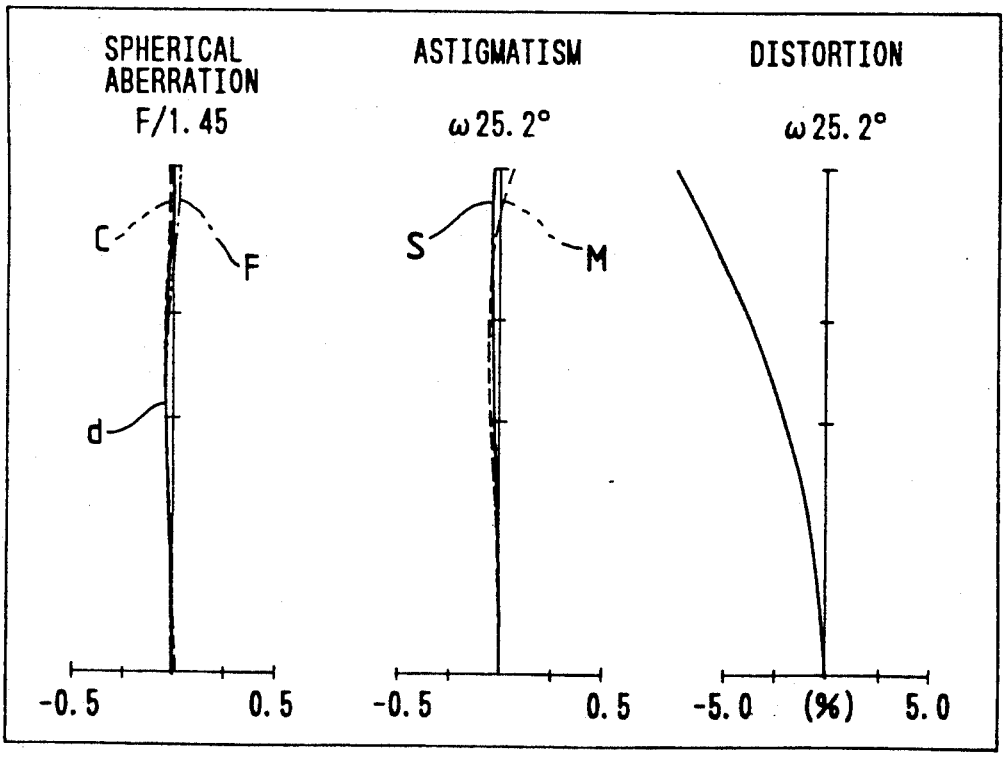
FIG. 59, FIG. 60 and FIG. 61 show graphs illustrating aberration characteristics at the wide position, intermediate focal length and tele position respectively of the Embodiment 14 of the present invention.
Figure 60:
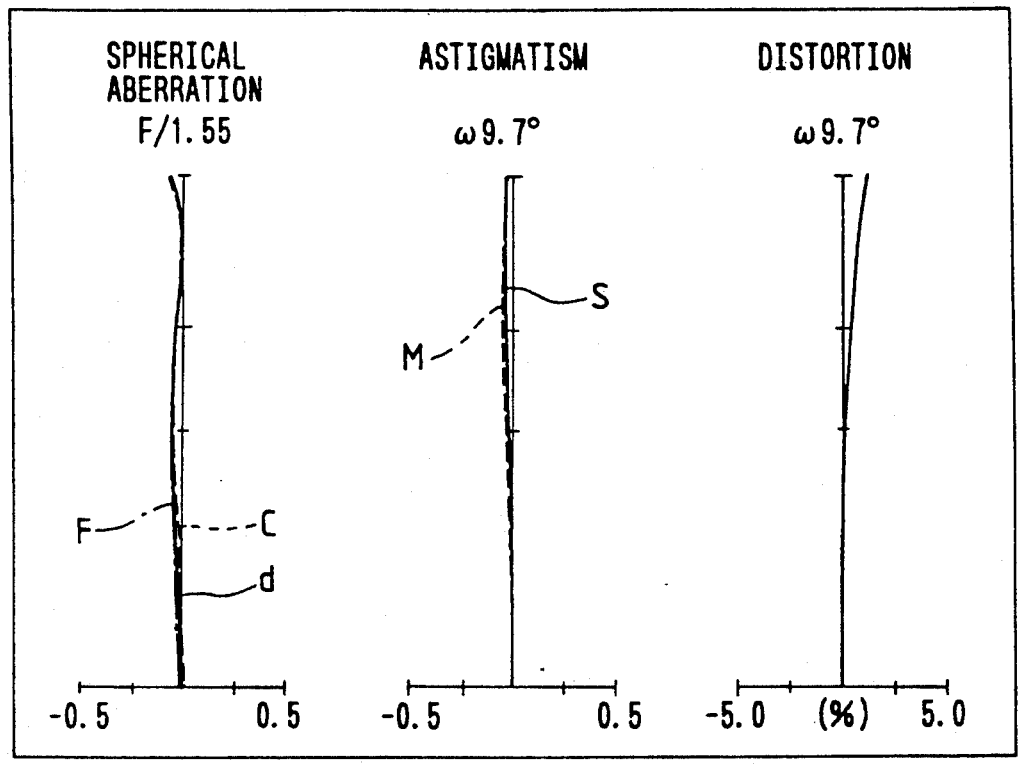
Figure 61:
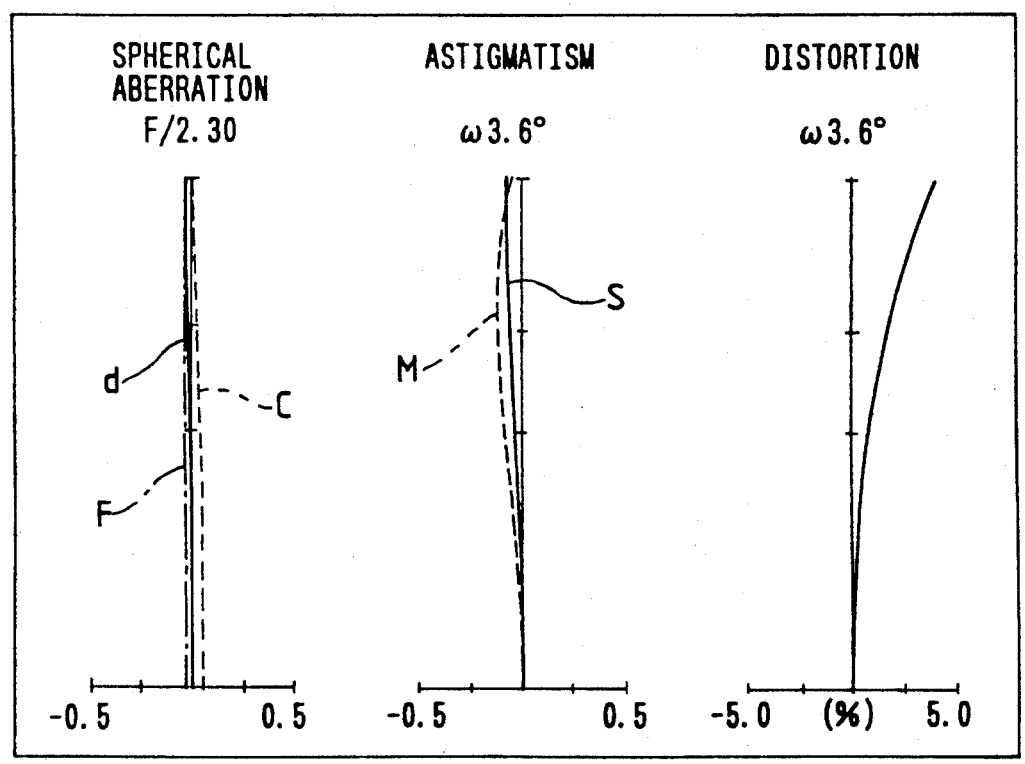
Figure 62:
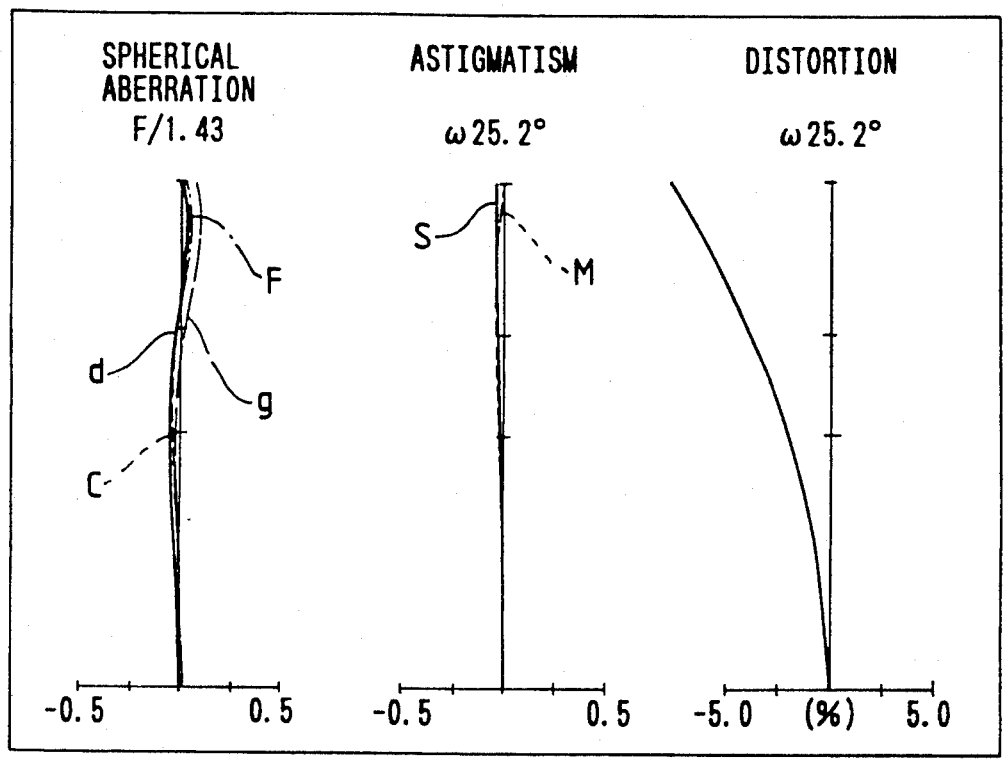
FIG. 62, FIG. 63 and FIG. 64 show curves visualizing aberration characteristics at the wide position, intermediate focal length and tele position respectively of the Embodiment 15 of the present invention.
Figure 63:
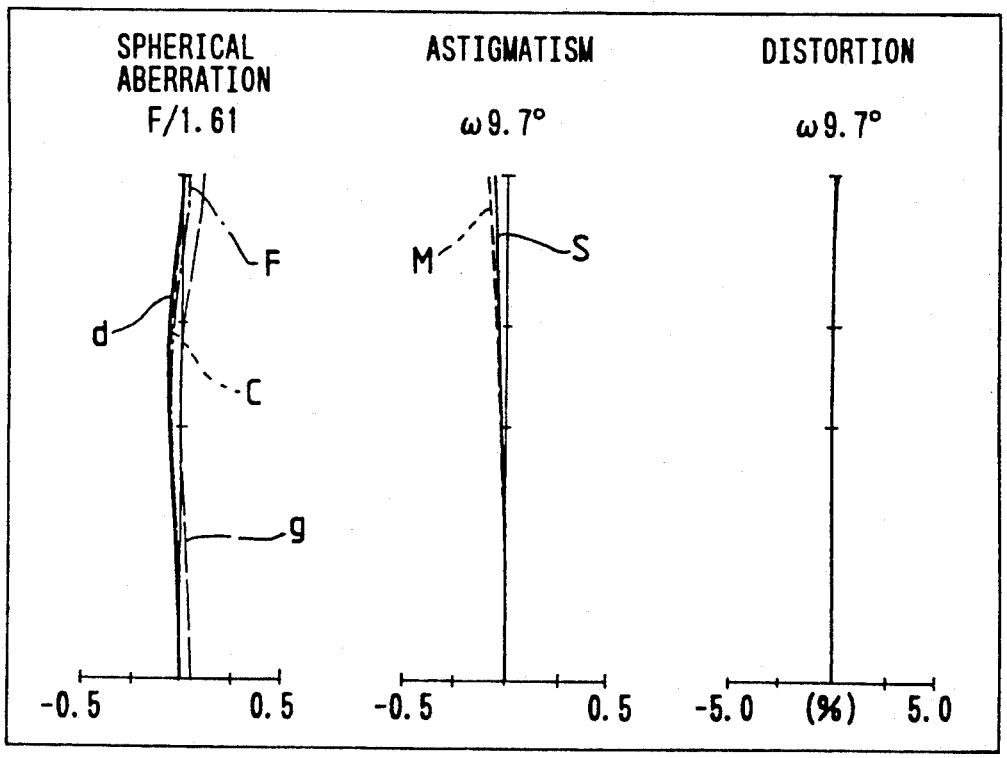
Figure 64:
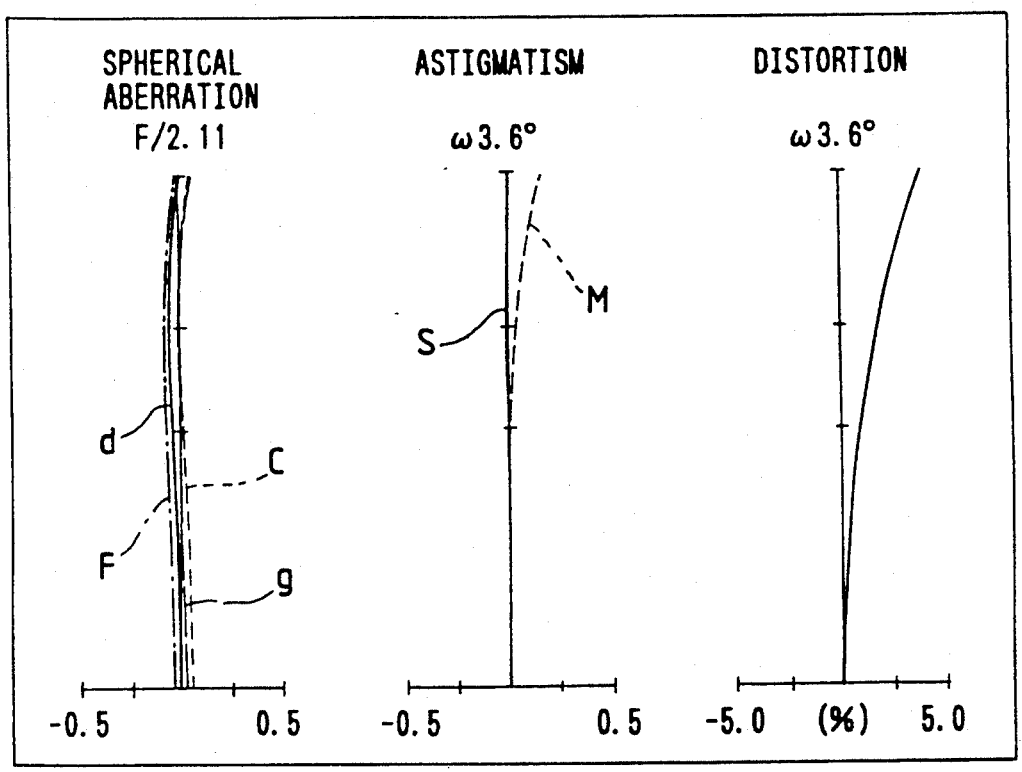
Figure 65:
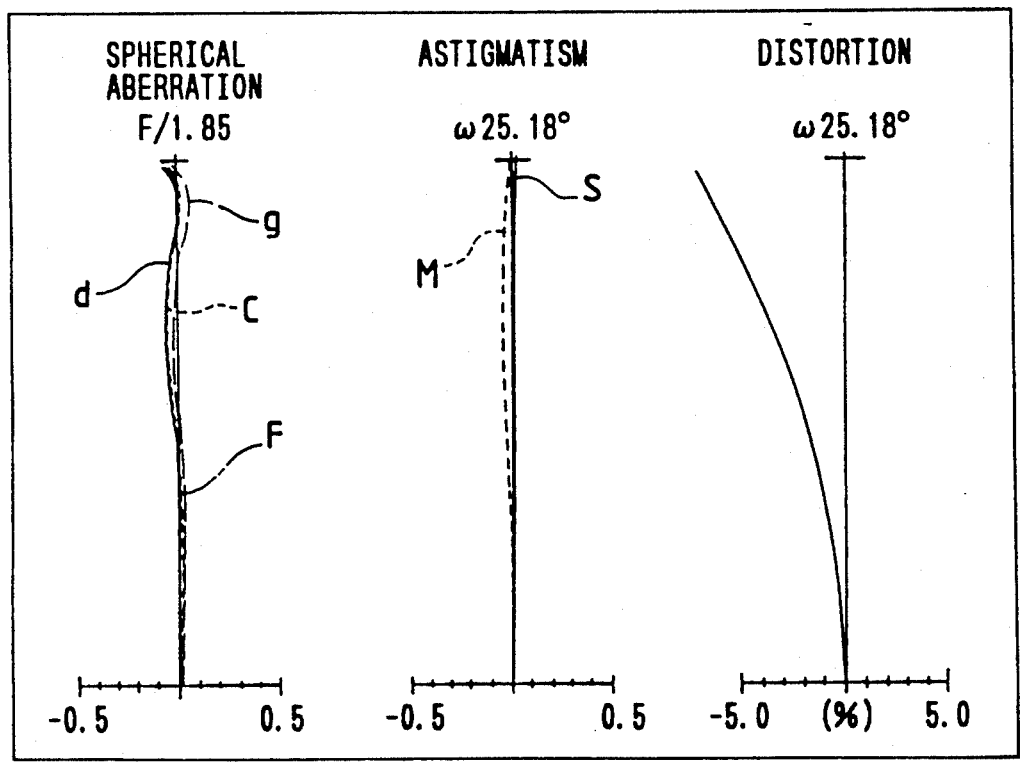
FIG. 65, FIG. 66 and FIG. 67 show curves illustrating aberration characteristics at the wide position, intermediate focal length and tele position respectively of the Embodiment 16 of the present invention.
Figure 66:
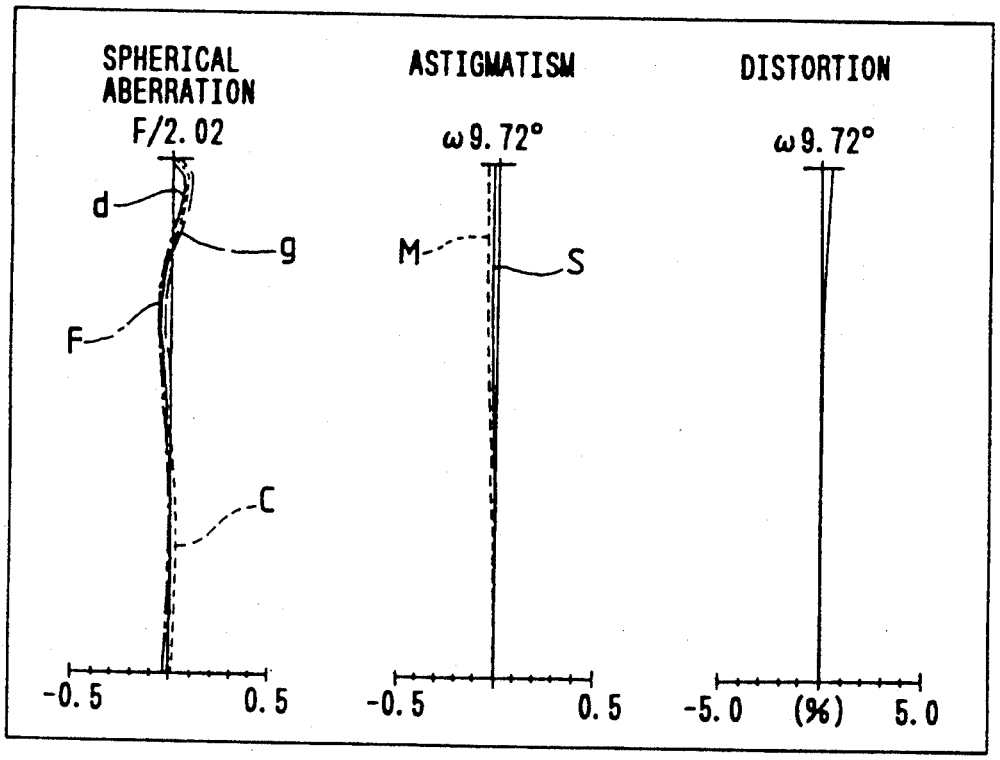
Figure 67:
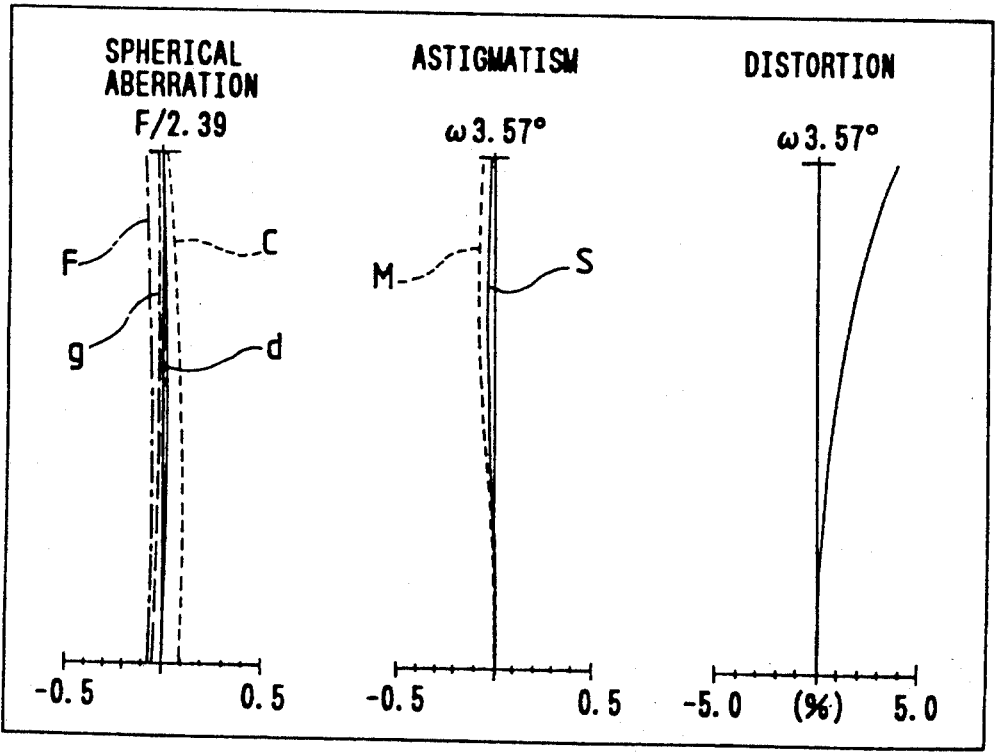
Figure 68:
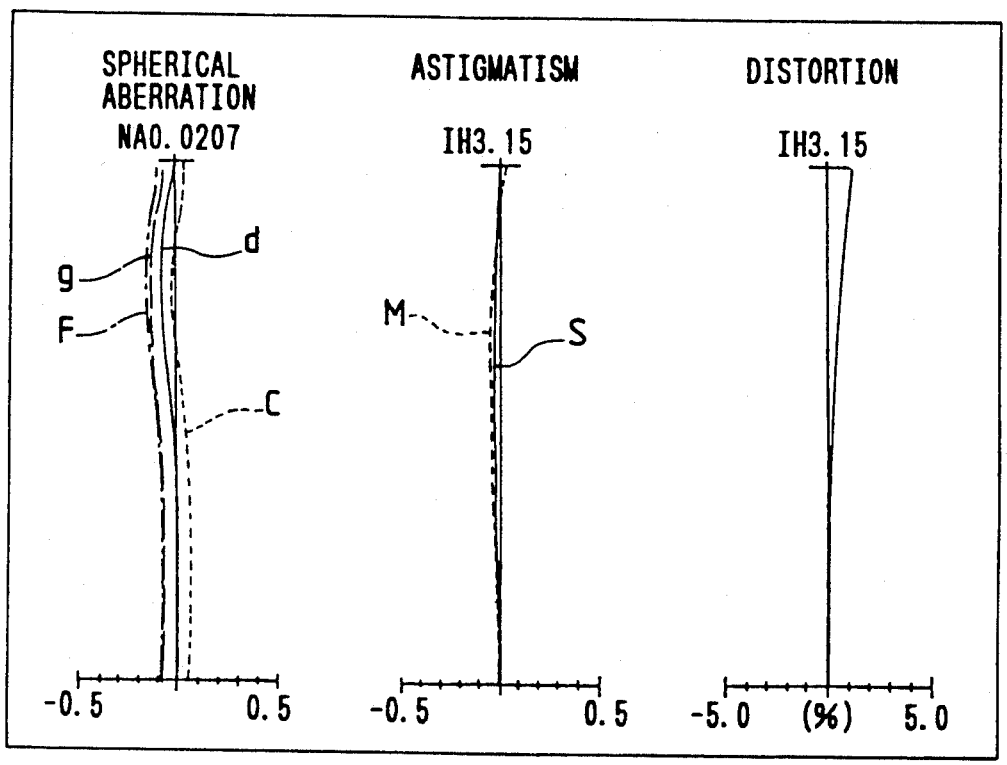
FIG. 68 shows graphs illustrating aberration characteristics at the tele position of the Embodiment 16 of the present invention when it is focused on an object located at a short distance.
Figure 69:
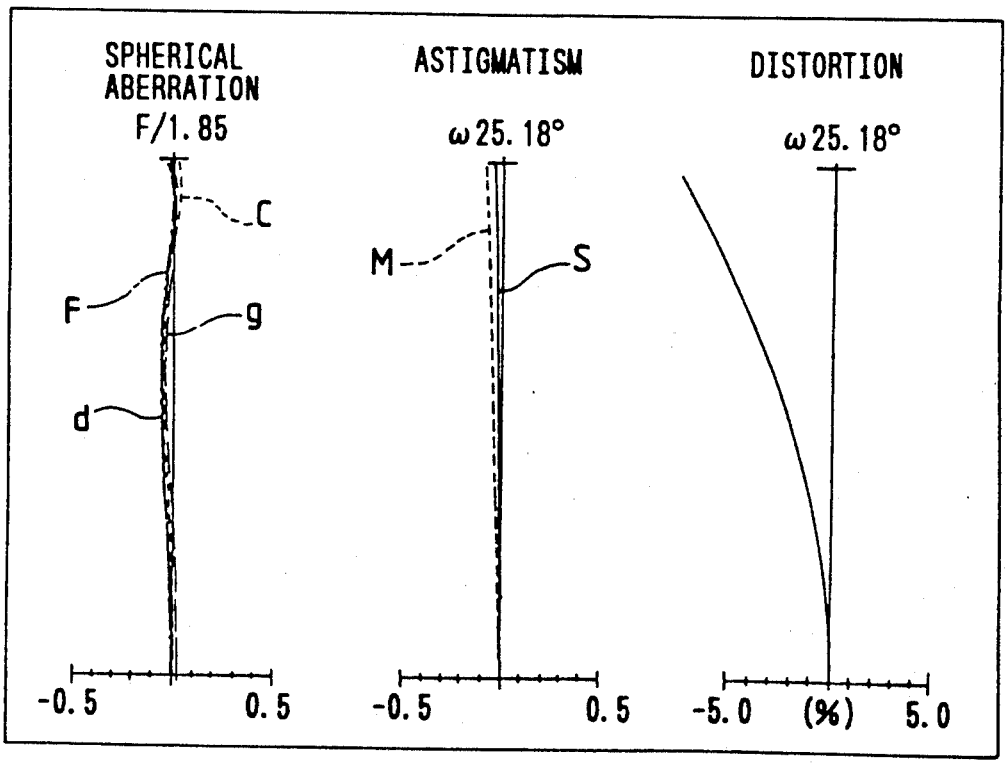
FIG. 69, FIG. 70 and FIG. 71 show graphs illustrating aberration characteristics at the wide position, intermediate focal length and tele position respectively of the Embodiment 17 of the present invention when it is focused on an object located an infinite distance.
Figure 70:
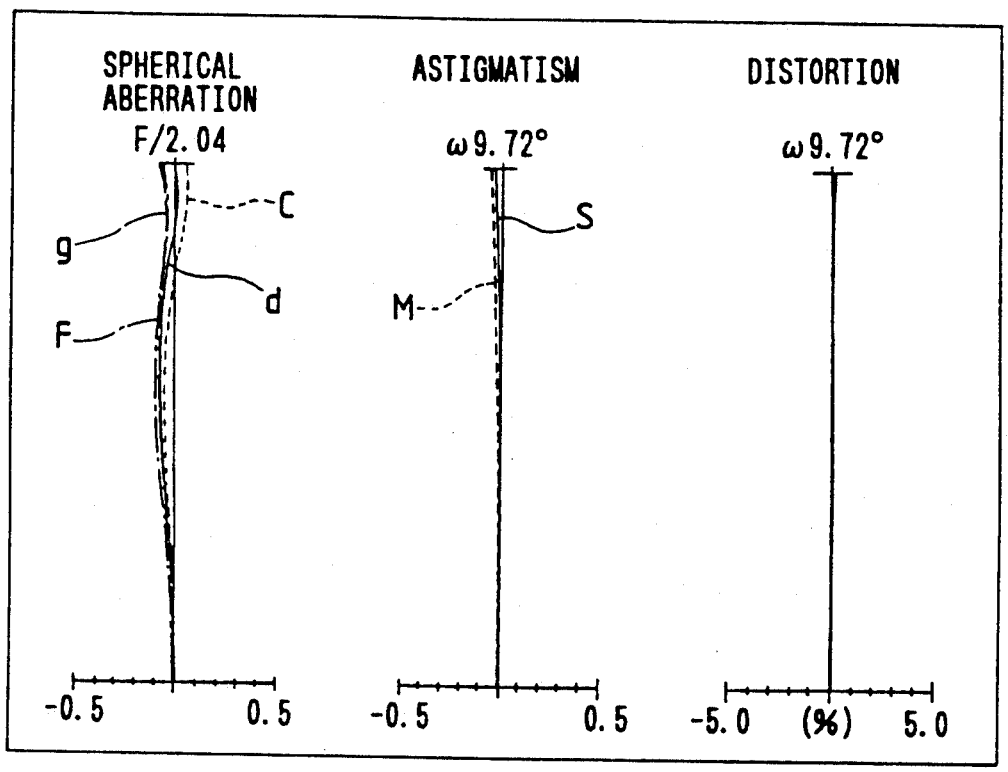
Figure 71:
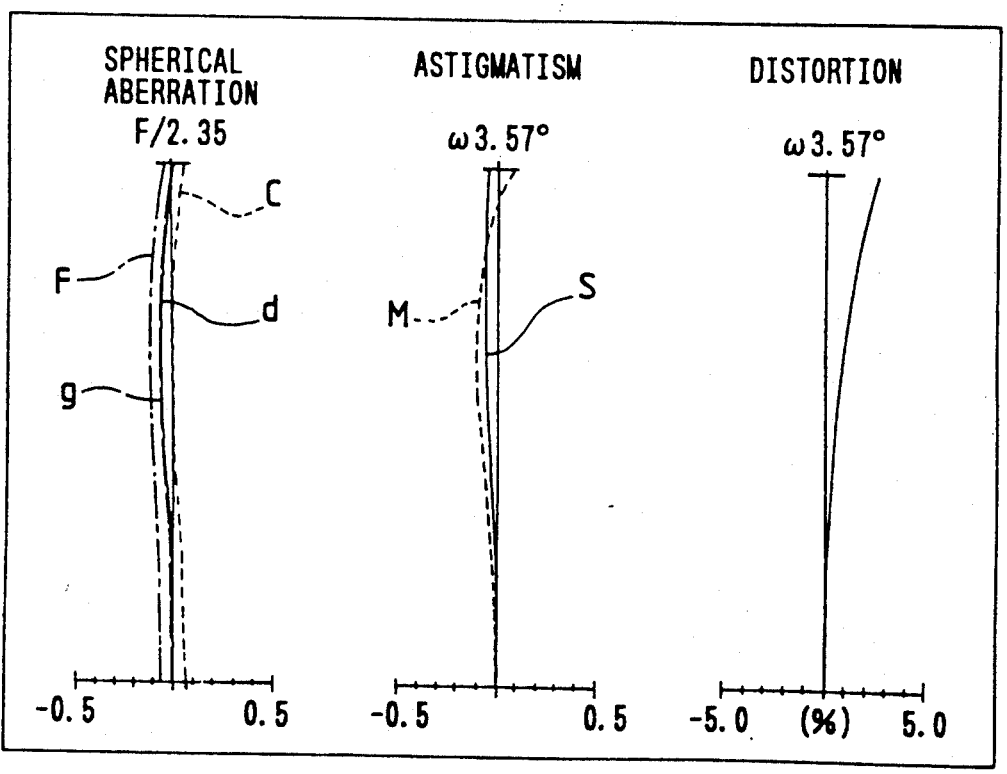
Figure 72:
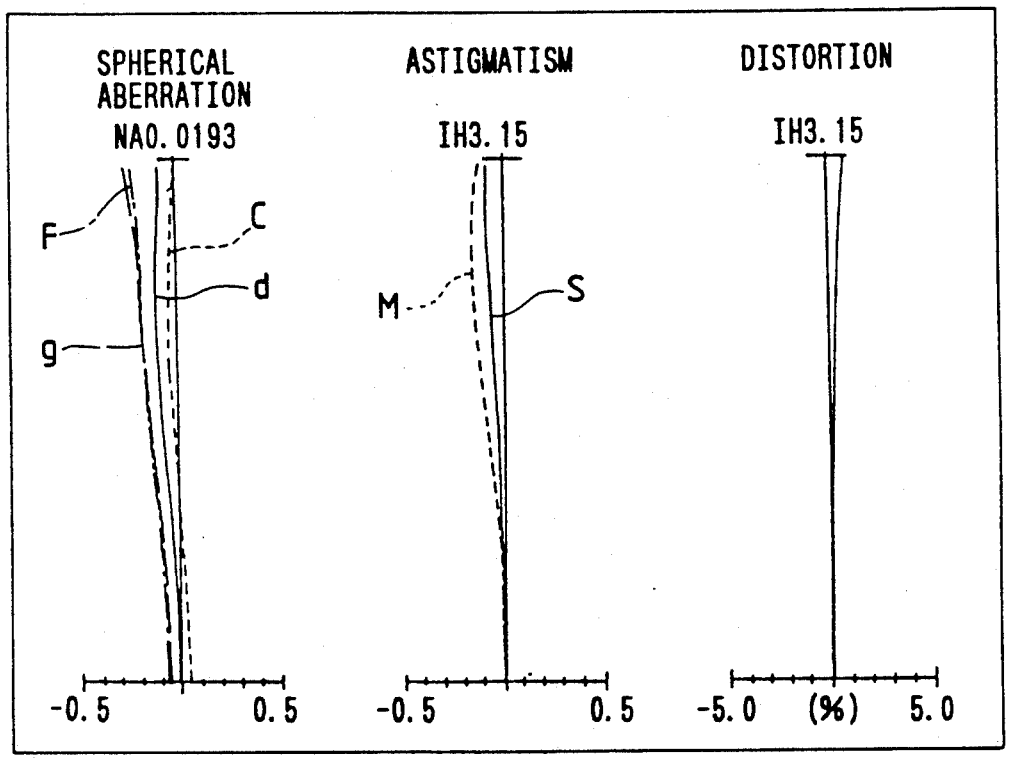
FIG. 72 shows curves illustrating aberration characteristics at the tele position of the Embodiment 17 of the present invention when it is focused on an object located at a short distance.
Figure 73:
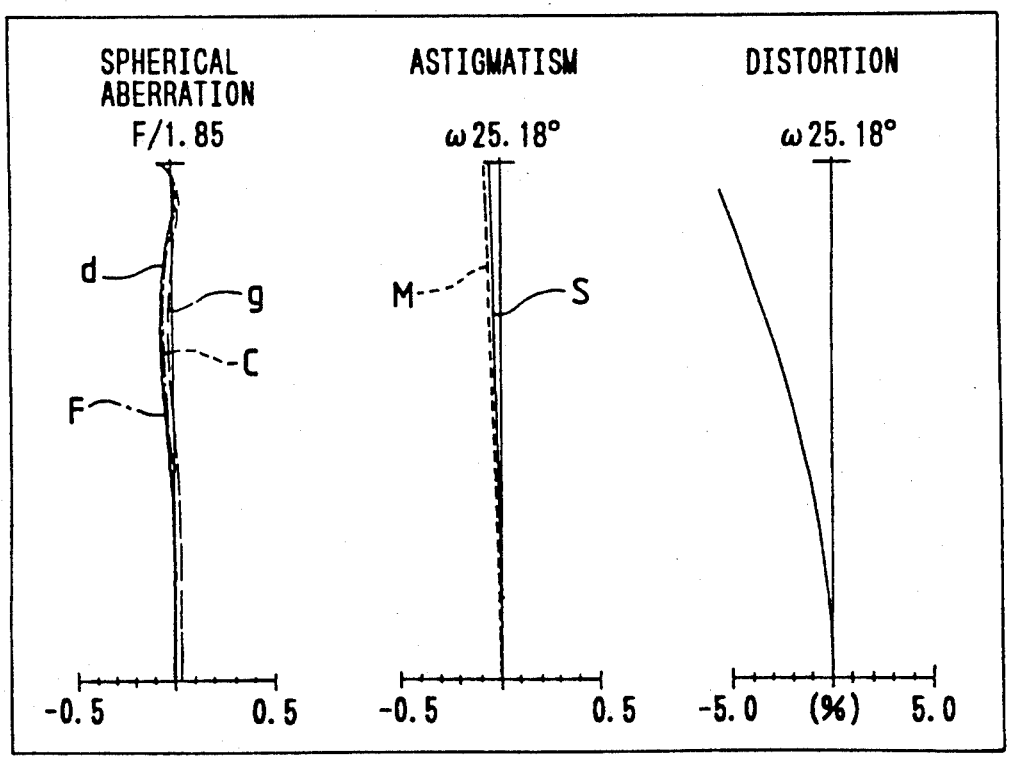
FIG. 73, FIG. 74 and FIG. 75 show curves visualizing aberration characteristics at the wide position, intermediate focal length and tele position respectively of the Embodiment 18 of the present invention when it is focused on an object located at infinite distance.
Figure 74:
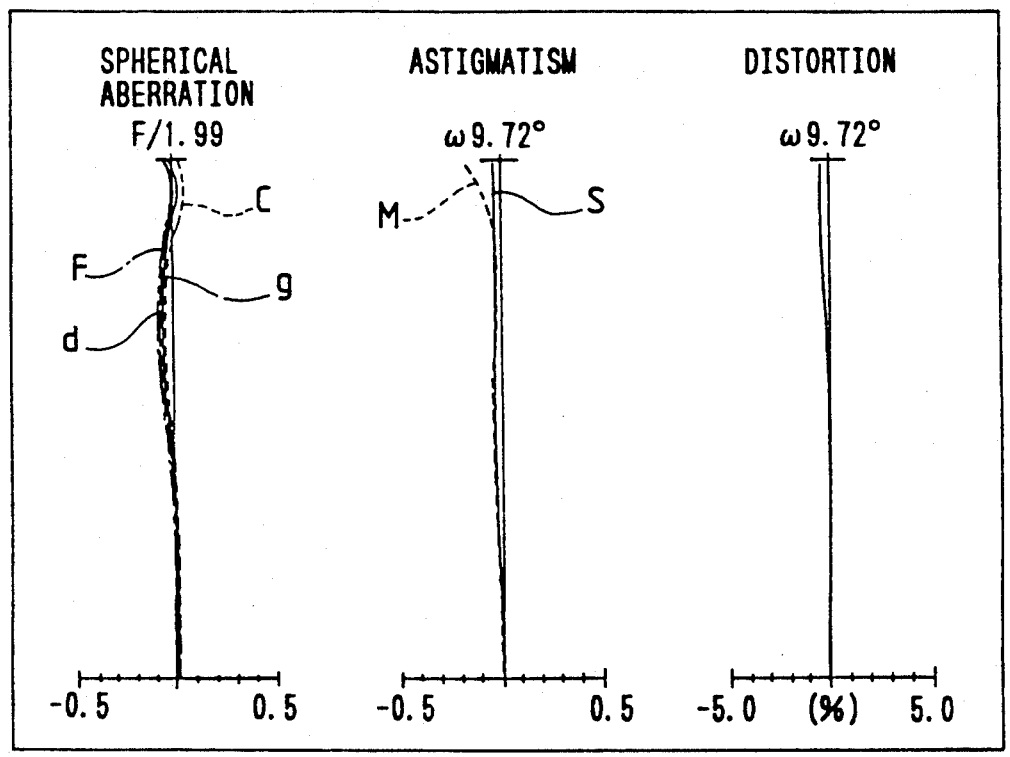
Figure 75:
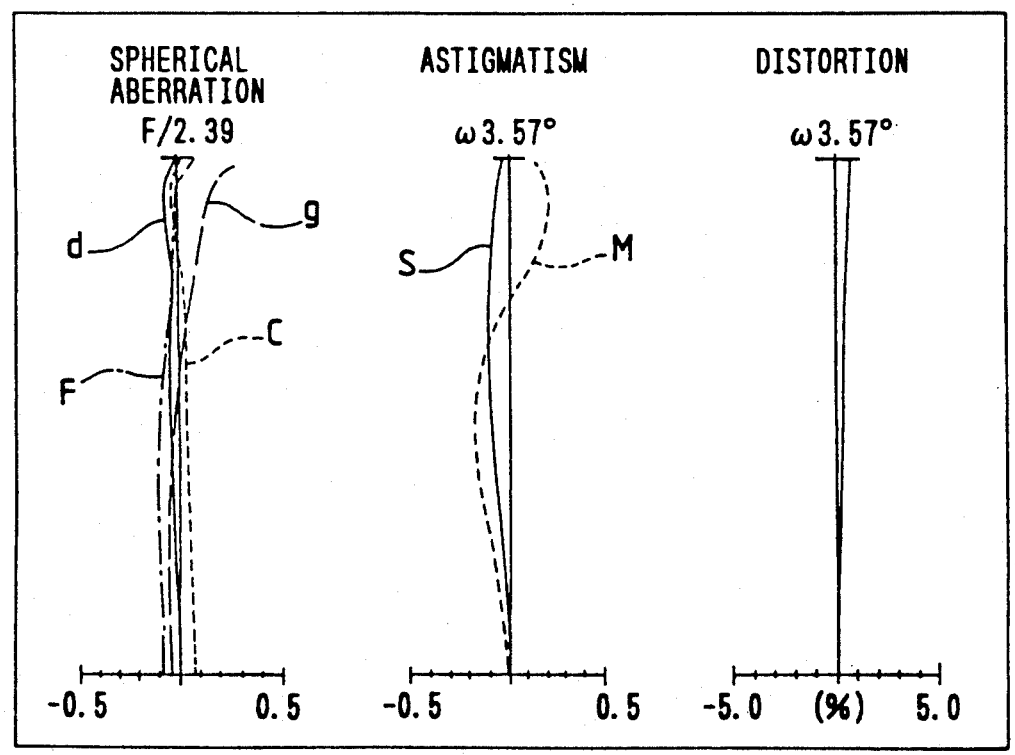
Figure 76:
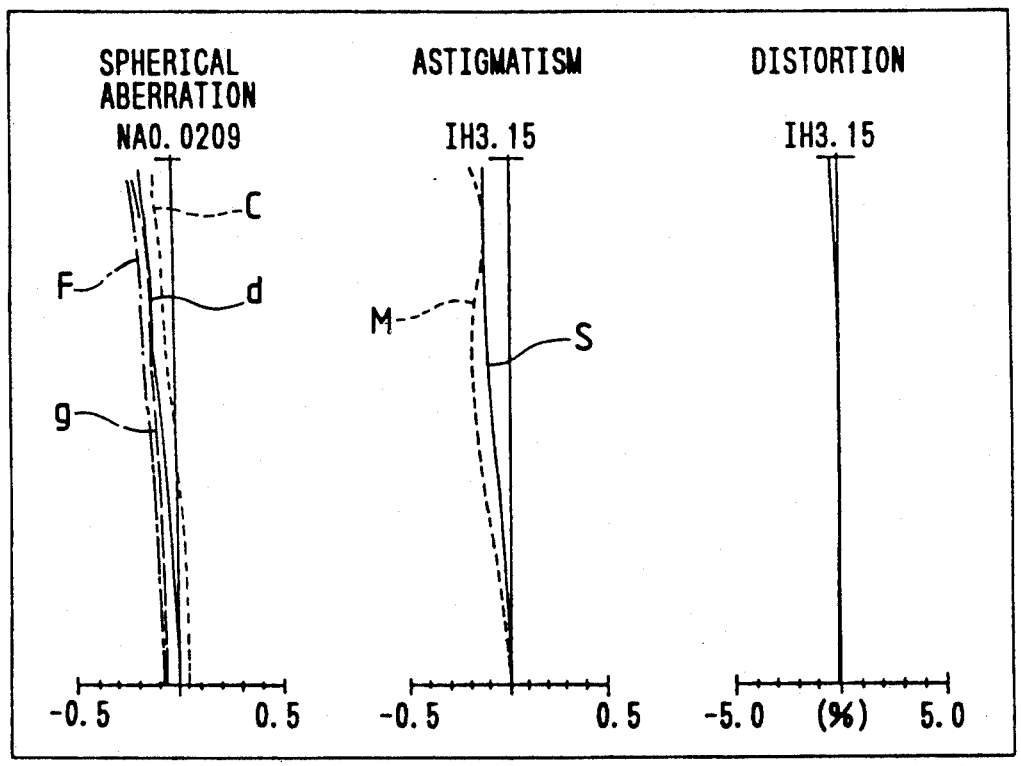
FIG. 76 shows curves illustrating aberration characteristics at the tele position of the Embodiment 18 of the present invention when it is focused on an object located at a short distance.
Figure 77:
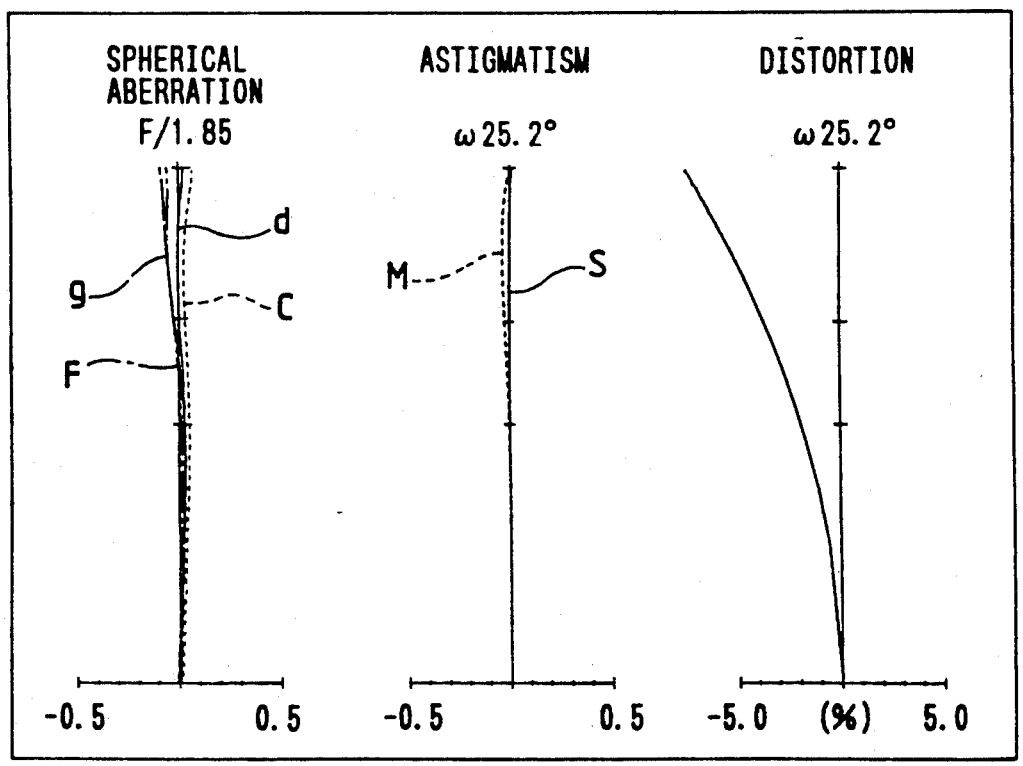
FIG. 77, FIG. 78 and FIG. 79 show graphs illustrating aberration characteristics at the wide position, intermediate focal length and tele position respectively of the Embodiment 19 of the present invention when it is focused on an object located at infinite distance.
Figure 78:
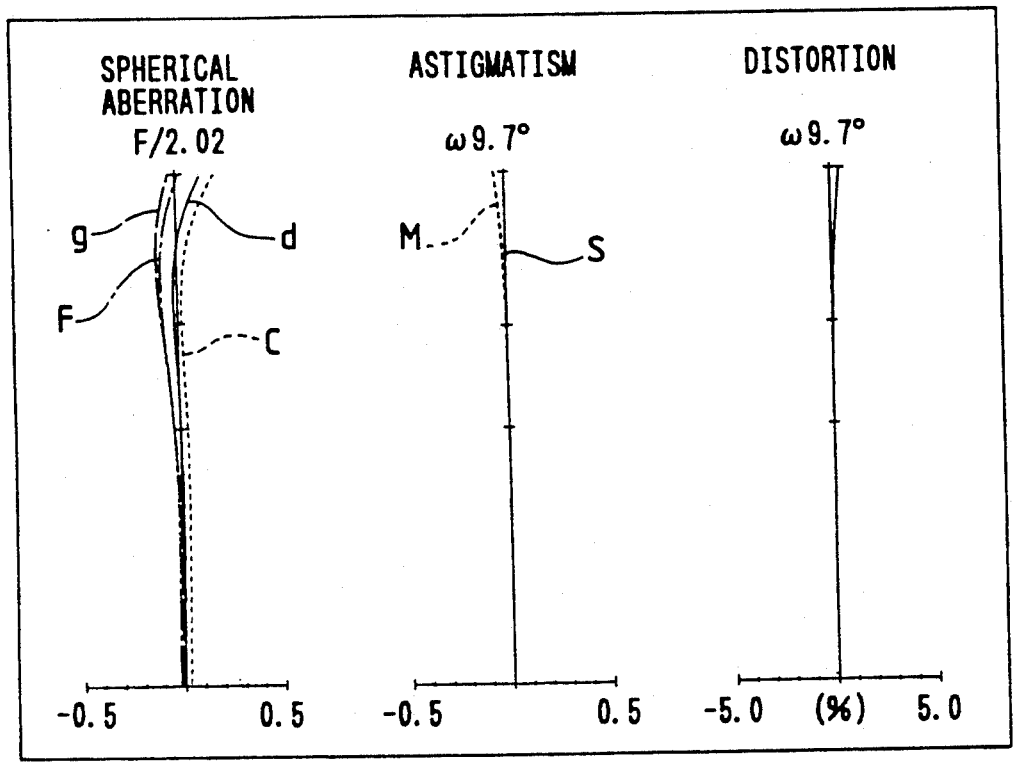
Figure 79:
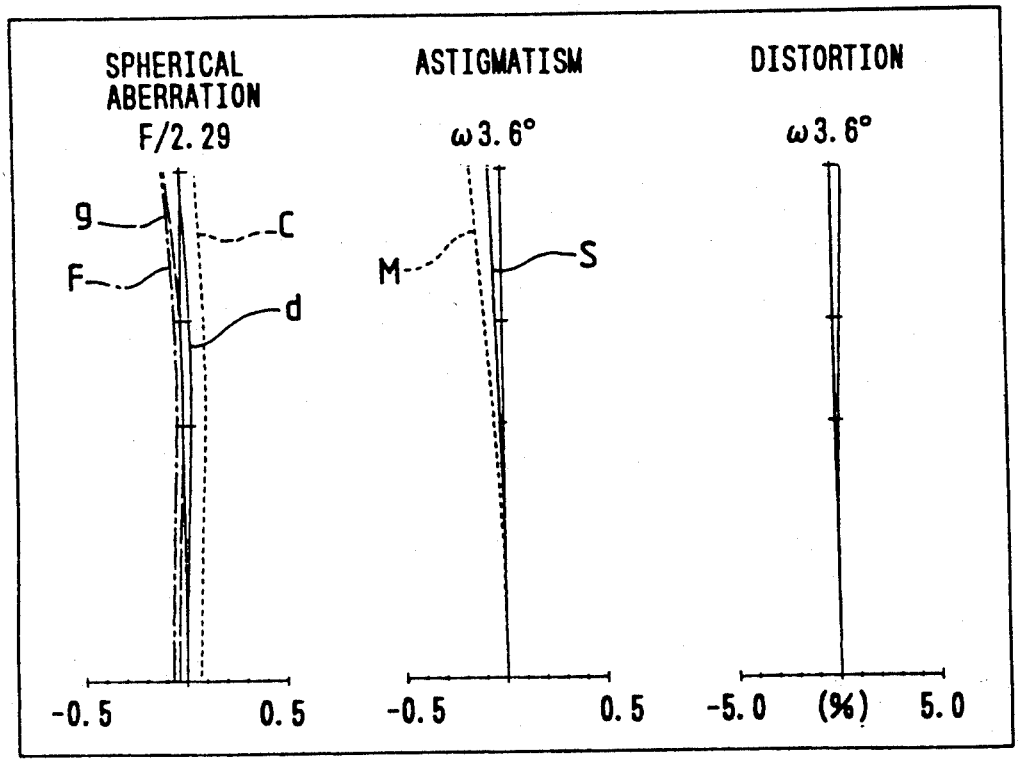
Figure 80:
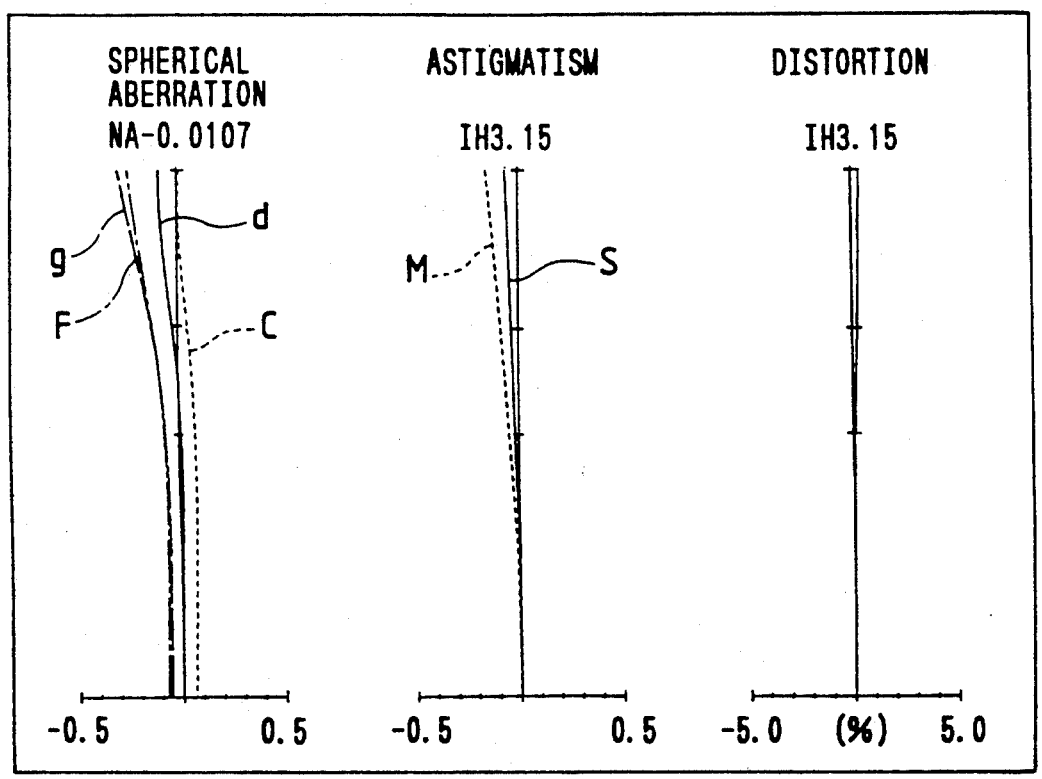
FIG. 80 shows curves visualizing aberration characteristics at the tele position of the Embodiment 19 of the present invention when it is focused on an object located at a short distance.

The Embodiment 19 has the composition visualized in FIG. 19, wherein the third lens unit consists of a positive lens element and a negative lens element, whereas the fourth lens unit is composed of a positive lens element. The object side surface ($r_{12}$) of the third lens unit is an aspherical surface.

When the direction of the optical axis is taken as the x axis and the direction perpendicular to the optical axis is taken as the y axis, the shapes of the aspherical surfaces used in the embodiments are expressed by the following formula:

$$x = \frac{y^2/r}{1 + \sqrt{1 - P(y/r)^2}} + \Sigma A_{2i} y^{2i}$$

wherein the reference symbol r represents the radius of curvature on an aspherical surface of interest as measured in the vicinity of the optical axis, the reference symbol P denotes conic constant and the reference symbol $A_{2i}$ designates the aspherical surface coefficient.

Further, refractive index distribution of the graded refractive index lens used in the Embodiments is expressed by the following formula:

$$n(r) = N_0 + N_1 r^2 + N_2 r^4 + N_3 r^6 + \ldots$$

wherein the reference symbol $N_0$ represents refractive index of the portion located on the optical axis, the reference symbol r designates distance as measured from the optical axis in the radial direction, and the reference symbols $N_1$, $N_2$, ... denote the refractive index distribution coefficients.

We claim:

1. A vari-focal lens system comprising, in order from the object side,
   a vari-focal subsystem comprising a first lens unit having a positive refractive power and a second lens unit having a negative refractive power; and
   an imaging subsystem comprising a third lens unit having a positive refractive power, and a fourth lens unit having a positive refractive power and being movable during the variation of local length mainly for correcting deviation of the image position;
   said third lens unit consisting of two to four lens components including a positive lens component on the object side and having a convex surface on the object side, and a negative lens component having a concave surface on the image side,
   said fourth lens unit consisting of two or a smaller number of positive lens components, and
   at least one of the lens surfaces in said imaging subsystem being an aspherical surface having refractive power weakened as the portions of said aspherical surface are farther from the optical axis.

2. A vari-focal lens system according to claim 1 adapted to be focused by moving said fourth lens unit along the optical axis.

3. A vari-focal lens system according to claim 1 satisfying the conditions (1), (2) and (3) listed below:

$$0.55 < f_I/\{f_T(f_W \cdot f_T)^{\frac{1}{2}}\}^{\frac{1}{2}} < 1.35 \tag{1}$$

$$0.4 < f_{III}/(f_W \cdot f_T)^{\frac{1}{2}} 2.5 \tag{2}$$

$$-0.5 < HH_{II\text{-}III}/(f_W \cdot f_T)^{\frac{1}{2}} < 0.25 \tag{3}$$

wherein the reference symbols $f_W$ and $f_T$ represent the focal lengths of the vari-focal lens system as a whole at the wide position and the tele position respectively, the reference symbols $f_I$ and $f_{III}$ designate the focal lengths of the first lens unit and the third lens unit respectively, and the reference symbol $HH_{II\text{-}III}$ denotes the distance as measured between the principal points of the second lens unit and the third lens unit at the tele position.

4. A vari-focal lens system according to claim 3 wherein said third lens unit comprises a negative lens component arranged on the image side.

5. A vari-focal lens system according to claim 4 wherein said third lens unit and said fourth lens unit satisfy the conditions (4), (5) and (6) mentioned below:

$$0.3 < R_{31}/(N_{31} - 1)(f_W \cdot f_T)^{\frac{1}{2}} < 2.0 \tag{4}$$

$$0.2 < R_{36}/(N_{33} - 1)(f_W \cdot f_T)^{\frac{1}{2}} < 1.6 \tag{5}$$

$$0.25 < (D_{III} + D_{IV})/(f_W \cdot f_T)^{\frac{1}{2}} 1.5 \tag{6}$$

wherein the reference symbols $R_{31}$ and $R_{36}$ represent the radii of curvature on the object side surface and the image side surface respectively of said third lens unit, the reference symbols $D_{III}$ and $D_{IV}$ designate the total thickness of the third lens unit and that of the fourth lens unit respectively, and the reference symbols $N_{31}$ and $N_{33}$ denote the refractive indices of the lens component arranged on the object side and the lens component arranged on the image side respectively in the third lens unit.

6. A vari-focal lens system according to claim 4 wherein said third lens unit and said fourth lens unit satisfy the conditions (7) through (10) mentioned below:

$$1.0 \times 10^{-3} < D_{FT}/f_T^2 < 7.0 \times 10^{-3} \quad (7)$$

$$-1.8 < (R_{31}+R_{32})/(R_{31}-R_{32}) < -0.1 \quad (8)$$

$$0.2 < (R_{35}+R_{36})/(R_{35}-R_{36}) < 3.5 \quad (9)$$

$$0.6 < R_{41}/R_{36} < 2.4 \quad (10)$$

wherein the reference symbols $R_{31}$ and $R_{32}$ represent the radii of curvature on the object side surface and the image side surface respectively of the lens component arranged on the object side in the third lens unit, the reference symbols $R_{35}$ and $R_{36}$ designate the radii of curvature on the object side surface and the image side surface respectively of the lens component arranged on the image side in the third lens unit, the reference symbol $R_{41}$ denotes the radius of curvature on the object side surface of the fourth lens unit, and the reference symbol $D_{FT}$ represents the distance as measured between the third lens unit and the fourth lens unit at the tele position.

7. A vari-focal lens system according to claim 4 wherein said aspherical surface satisfies the following conditions (11) and (12):

$$(11) \quad -1.0 \times 10^{-4} < \Delta x / \sqrt{f_W \cdot f_T} < 0 \quad (y = 0.182 y_1)$$

$$(12) \quad -2.5 \times 10^{-2} < \Delta x / \sqrt{f_W \cdot f_T} < 0 \quad (y = 0.437 y_1)$$

wherein the reference symbol $\Delta x$ represents the departure of said aspherical surface from the reference sphere thereof, the reference symbol y designates the distance as measured from the optical axis to a portion of interest on said aspherical surface and the reference symbol $y_1$ denotes a value expressed as $$\sqrt{f_W \cdot f_T}/F$$

(the reference symbol F represents the F number of the vari-focal lens system at the wide position).

8. A vari-focal lens system according to claim 1 wherein said third lens unit consist of, in the order from the object side, a positive lens component having a convex surface on the object side, two positive lens components and a negative lens component having a concave surface on the image side, and said fourth lens unit consists of a positive lens component.

9. A vari-focal lens system according to claim 1 wherein said third lens unit consists of, in the order from the object side, a positive lens component having a convex surface on the object side, a positive lens component and a negative lens component having a concave surface on the image side, and said fourth lens unit consists of a positive lens component having an aspherical surface.

10. A vari-focal lens system according to claim 1 wherein said third lens unit consists of, in the order from the object side, a positive lens component having a convex object side surface designed as an aspherical surface having curvature lowered as the portions of said aspherical surface are farther from the optical axis, a positive lens component and a negative lens component having a concave surface on the image side, and said fourth lens unit consists of a positive lens component.

11. A vari-focal lens system according to claim 1 wherein said third lens unit consists of, in the order from the object side, a positive lens component having a convex object side surface designed as an aspherical surface having curvature lowered as the portions of said aspherical surface are farther from the optical axis and a negative lens component having a concave surface on the image side, and said fourth lens unit consists of a positive lens component.

12. A vari-focal lens system according to claim 1 wherein said third lens unit consists of, in the order from the object side, a positive lens component having a convex surface on the object side, a negative lens component having a concave surface on the image side and a positive lens component, and said fourth lens unit consists of a positive lens component having an aspherical surface.

13. A vari-focal lens system according to claim 1 wherein said third lens unit consists of, in the order from the object side, a positive lens component having a convex surface on the object side, a positive lens component and a negative lens component having a concave surface on the image side, and said fourth lens unit consists of two positive lens components, and said imaging subsystem comprises an aspherical surface.

14. A vari-focal lens system according to claim 1 satisfying the following condition (1'):

$$(1') \quad 0.2 < |f_{II}|/\sqrt{f_W \cdot f_T} < 0.7$$

wherein the reference symbols $f_W$ and $f_T$ represent the focal lengths of the vari-focal lens system as a whole at the wide position and the tele position respectively, and the reference symbol $f_{II}$ designates the focal length of said second lens unit.

15. A vari-focal lens system according to claim 1 satisfying the following condition (2'):

$$(2') \quad 0.3 < f_{IV}/\sqrt{f_W \cdot f_T} < 1.2$$

wherein the reference symbols $f_W$ and $f_T$ represent the focal lengths of the vari-focal lens system as a whole at the wide position and tele position respectively, and the reference symbol $f_{IV}$ deisgnates the focal length of said fourth lens unit.

16. A vari-focal lens system according to claim 1 satisfying the following condition (3'):

$$(3') \quad -1.0 < H_{III}/\sqrt{f_W \cdot f_T} < 0$$

wherein the reference symbols $f_W$ and $f_T$ represent the focal lengths of the vari-focal lens system as a whole at the wide position and the tele position respectively, and the reference symbol $HH_{II\text{-}III}$ designates the distance as measured between the principal points of the second lens unit and the third lens unit at the tele position.

17. A vari-focal lens system comprising, in the order from the object side,
 a first lens unit having a positive refractive power and kept stationary during variation of focal length;

a second lens unit having a negative refractive power, movable during the variation of focal length and having a vari-focal function;

a third lens unit having a positive refractive power and kept stationary during the variation of focal length; and a fourth lens unit having a positive refractive power, movable during the variation of focal length and having a function mainly to correct deviation of image position;

said third lens unit consisting of two to four lens components including a positive lens component arranged on the object side and having a convex surface on the object side, and a negative lens component, said fourth lens unit consisting of two or a smaller number of positive lens components, and said fourth lens unit comprising at least one aspherical surface having refractive power weakened as the portions of said aspherical surface are farther from the optical axis.

18. A vari-focal lens system according to claim 17 wherein said fourth lens unit satisfies the following condition:

$$-1.8 < (R_1 + R_2)/(R_1 - R_2) < -0.1$$

wherein the reference symbols $R_1$ and $R_2$ represent the radii of curvature on the object side surface and the image side surface respectively of the lens component having said aspherical surface in the fourth lens unit.

19. A vari-focal lens system according to claim 17 wherein said negative lens component is arranged on the image side of said positive lens component.

20. A vari-focal lens system according to claim 17 wherein the two lens component arranged on the image side in said third lens unit are a positive lens component having a strongly convex surface on the object side and a negative lens component having a strongly concave surface on the image side.

* * * * *